(12) United States Patent
Ogita et al.

(10) Patent No.: US 10,982,146 B2
(45) Date of Patent: Apr. 20, 2021

(54) LIQUID CRYSTAL COMPOSITION, LIQUID CRYSTAL ELEMENT, AND USE OF LIQUID CRYSTAL COMPOSITION IN LIQUID CRYSTAL ELEMENT

(71) Applicants: JNC CORPORATION, Tokyo (JP); JNC PETROCHEMICAL CORPORATION, Tokyo (JP)

(72) Inventors: Kazuhiro Ogita, Chiba (JP); Fumitaka Kondo, Chiba (JP); Yoshiharu Hirai, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 137 days.

(21) Appl. No.: 16/214,153

(22) Filed: Dec. 10, 2018

(65) Prior Publication Data

US 2019/0225886 A1    Jul. 25, 2019

(30) Foreign Application Priority Data

Jan. 25, 2018 (JP) .............................. JP2018-010928

(51) Int. Cl.
*C09K 19/30* (2006.01)
*C09K 19/56* (2006.01)
(Continued)

(52) U.S. Cl.
CPC .............. *C09K 19/56* (2013.01); *C09K 19/04* (2013.01); *C09K 19/3003* (2013.01);
(Continued)

(58) Field of Classification Search
CPC .................................................... C09K 19/30
See application file for complete search history.

(56) References Cited

U.S. PATENT DOCUMENTS 3,660,505 A    5/1972 Starnes, Jr.
10,377,949 B2 *  8/2019 Fujita ................. C09K 19/3068
(Continued)

FOREIGN PATENT DOCUMENTS

JP    57-165328    10/1982
JP    H02503441    10/1990
(Continued)

OTHER PUBLICATIONS

Machine Translation of KR20090055492A (2020) (Year: 2020).*

*Primary Examiner* — Chanceity N Robinson
(74) *Attorney, Agent, or Firm* — JCIPRNET

(57) ABSTRACT

A liquid crystal composition including liquid crystalline compounds, polymerizable compounds, and dichroic dyes in which the polymerizable compound includes at least one compound represented by Formula (1), $$R^{11}\text{-MES-Sp}^{11}\text{-P}^{11} \qquad (1)$$

in Formula (1), $R^{11}$ is an alkyl group having 1 to 15 carbon atoms; MES is a mesogenic group having at least one ring, and in the ring in MES, at least one hydrogen atom is optionally substituted with $-\text{Sp}^{11}\text{-P}^{11}$; $\text{Sp}^{11}$ is a single bond or an alkylene group having 1 to 10 carbon atoms, and in this alkylene group, at least one $-\text{CH}_2-$ is optionally substituted with $-\text{O}-$, $-\text{CO}-$, $-\text{COO}-$, $-\text{OCO}-$, or $-\text{OCOO}-$, and at least one $-(\text{CH}_2)_2-$ is optionally substituted with $-\text{CH}=\text{CH}-$ or $-\text{C}\equiv\text{C}-$, and in these groups, at least one hydrogen atom is optionally substituted with a polymerizable group; $P^{11}$ is a polymerizable group or a polar group, or a group having both polymerization and polarity.

31 Claims, 2 Drawing Sheets

(51) Int. Cl.
*C09K 19/34* (2006.01)
*C09K 19/60* (2006.01)
*G02F 1/1333* (2006.01)
*C09K 19/32* (2006.01)
*C09K 19/04* (2006.01)
*G02F 1/137* (2006.01)
*C09K 19/12* (2006.01)

(52) U.S. Cl.
CPC .......... *C09K 19/3066* (2013.01); *C09K 19/32* (2013.01); *C09K 19/3402* (2013.01); *C09K 19/601* (2013.01); *G02F 1/133365* (2013.01); *C09K 2019/0425* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/3422* (2013.01); *G02F 1/13725* (2013.01); *G02F 2001/13775* (2013.01)

(56) References Cited

U.S. PATENT DOCUMENTS

| | | |
|---|---|---|
| 2016/0108318 A1 | 4/2016 | Archetti et al. |
| 2017/0174993 A1* | 6/2017 | Saito ................. C09K 19/3001 |
| 2017/0306237 A1* | 10/2017 | Morimoto ............... C09B 35/34 |

FOREIGN PATENT DOCUMENTS

| | | | | |
|---|---|---|---|---|
| JP | 07-101900 | | 4/1995 | |
| JP | 2006-199941 | | 8/2006 | |
| JP | 2016523997 | | 8/2016 | |
| KR | 20090055492 A | * | 6/2009 | |
| WO | WO-2015060056 A1 | * | 4/2015 | ....... G02F 1/133365 |

* cited by examiner

LIQUID CRYSTAL COMPOSITION, LIQUID CRYSTAL ELEMENT, AND USE OF LIQUID CRYSTAL COMPOSITION IN LIQUID CRYSTAL ELEMENT

CROSS-REFERENCE TO RELATED APPLICATION

This application claims the priority of Japan patent application serial no. 2018-010928, filed on Jan. 25, 2018. The entirety of the above-mentioned patent application is hereby incorporated by reference herein and made a part of this specification.

BACKGROUND

Technical Field

The disclosure relates to a liquid crystal composition and a liquid crystal element, and more specifically, to a liquid crystal composition including a polymerizable compound having an acryloyloxy group substituted with a polar group such as a hydroxyalkyl group and a dichroic dye, and a liquid crystal element including the composition.

Description of Related Art

Liquid crystal display elements are classified into phase change (PC), twisted nematic (TN), super twisted nematic (STN), electrically controlled birefringence (ECB), optically compensated bend (OCB), in-plane switching (IPS), vertical alignment (VA), fringe field switching (FFS), and field-induced photo-reactive alignment (FPA) based on operation modes of liquid crystal molecules. Liquid crystal display elements are classified into a passive matrix (PM) and an active matrix (AM) based on an element drive scheme. PMs are classified into static and multiplex matrixes. AMs are classified into a thin film transistor (TFT), and a metal insulator metal (MIM). TFTs are classified into those of amorphous silicon and polysilicon (polycrystalline silicon). The latter is classified into a high temperature type and a low temperature type according to a production process. Liquid crystal display elements are classified into a reflective type that uses natural light, a transmissive type that uses a backlight, and a semi-transmissive type that uses both natural light and a backlight based on a light source.

A liquid crystal display element contains a liquid crystal composition having a nematic phase. This composition has appropriate characteristics. It is possible to obtain an AM element having favorable characteristics by improving characteristics of this composition. The relationship between these two characteristics is summarized in the following Table 1. Characteristics of the composition will be further described based on commercially available AM elements. A temperature range of the nematic phase is related to a temperature range in which the element can be used. A preferable upper limit temperature of the nematic phase is about 70° C. or higher, and a preferable lower limit temperature of the nematic phase is about −10° C. or lower. The viscosity of the composition is related to a response time of the element. In order to display a moving image with elements, a short response time is preferable. A shorter response time is desirable even if it is only by 1 millisecond. Therefore, a lower viscosity in the composition is preferable. A lower viscosity at low temperatures is more preferable.

TABLE 1

Characteristics of compositions and AM elements

| Number | Characteristics of composition | Characteristics of AM element |
|---|---|---|
| 1 | Wide temperature range of a nematic phase | Wide temperature range in which the element can be used |
| 2 | Low viscosity[1] | Short response time |
| 3 | Appropriate optical anisotropy | Large contrast ratio |
| 4 | Large positive or negative dielectric anisotropy | Low threshold voltage, low power consumption, and large contrast ratio |
| 5 | Large specific resistance | High voltage holding ratio and large contrast ratio |
| 6 | Stable with respect to ultraviolet radiation and heat | Long lifespan |
| 7 | Large elastic constant | Large contrast ratio and short response time |

[1]The time taken for a composition to be inserted into a liquid crystal display element can be shortened The optical anisotropy of the composition is related to a contrast ratio of the element. According to a mode of the element, large optical anisotropy or small optical anisotropy, that is, appropriate optical anisotropy is necessary. A product ($\Delta n \times d$) of the optical anisotropy ($\Delta n$) of the composition and the cell gap (d) of the element is designed to maximize the contrast ratio. An appropriate product value depends on the type of operation mode. This value is about 0.45 μm in an element in a mode such as TN. This value is a range of about 0.30 μm to about 0.40 μm in an element in a VA mode and is a range of about 0.20 m to about 0.30 μm in an element in an IPS mode or an FFS mode. In these cases, in an element having a small cell gap, a composition having large optical anisotropy is preferable. Large dielectric anisotropy in the composition contributes to a low threshold voltage, low power consumption, and a large contrast ratio in the element. Therefore, large positive or negative dielectric anisotropy is preferable. A large specific resistance in the composition contributes to a high voltage holding ratio and a large contrast ratio in the element. Therefore, a composition having a large specific resistance not only at room temperature in an initial stage but also at a temperature close to an upper limit temperature of the nematic phase is preferable. A composition having a large specific resistance not only at room temperature but also at a temperature close to an upper limit temperature of the nematic phase after long term use is preferable. The stability of the composition with respect to ultraviolet radiation and heat is related to a lifespan of the element. When this stability is higher, the lifespan of the element is longer. Such a characteristic is preferable for an AM element used in a liquid crystal projector and a liquid crystal television.

In a polymer sustained alignment (PSA) type liquid crystal display element, a liquid crystal composition containing a polymer is used. First, a composition to which a small amount of a polymerizable compound is added is inserted into the element. Next, ultraviolet rays are emitted to the composition while a voltage is applied between substrates of the element. The polymerizable compound is polymerized and forms a polymer network structure in the composition. In this composition, since it is possible to control alignment of liquid crystal molecules according to the polymer, a response time of the element is shortened and image burn is lessened. Such effects of the polymer can be expected for elements having modes such as TN, ECB, OCB, IPS, VA, FFS, and FPA.

In general purpose liquid crystal display elements, vertical alignment of liquid crystal molecules is achieved using a polyimide alignment film. On the other hand, in liquid crystal display elements having no alignment film, a liquid crystal composition containing a polar compound and a polymer is used. First, a composition in which a small amount of a polar compound and a small amount of a polymerizable compound are added is inserted into the element. Here, liquid crystal molecules are aligned according to an action of the polar compound. Next, ultraviolet rays are emitted to the composition while a voltage is applied between substrates of the element. Here, the polymerizable compound is polymerized and stabilizes alignment of liquid crystal molecules. In this composition, since it is possible to control alignment of liquid crystal molecules according to the polar compound and the polymer, a response time of the element is shortened and image burn is lessened. In addition, in elements having no alignment film, a process of forming an alignment film is unnecessary. Since there is no alignment film, a reduction in electrical resistance of the element due to an interaction between the alignment film and the composition does not occur. Such an effect caused by a combination of the polar compound and the polymer can be expected for elements having modes such as TN, ECB, OCB, IPS, VA, FFS, and FPA.

Liquid crystal elements also have applications other than as liquid crystal display elements. For example, liquid crystal elements can be used for a smart window and the like. Further, in Patent Document 1, a device using a liquid crystal composition containing a liquid crystalline compound, a dichroic dye, and an organic compound having an anchor group is described. However, this device controls transmittance by using transition from a liquid crystal phase to an isotropic phase due to a change in the temperature, and does not control transmittance by an electric field.

PATENT DOCUMENTS

[Patent Document 1] Published Japanese Translation No. 2016-523997 of the PCT International Publication

SUMMARY

One aspect of the disclosure is to provide a liquid crystal composition containing a dichroic dye and a polymerizable compound having a polar group. Another aspect is to provide a liquid crystal composition that enables vertical alignment of liquid crystal molecules by an action of a polymer produced from the polymerizable compound. Another aspect is to provide a liquid crystal element in a guest host (GH) mode containing such a composition. Still another aspect is to provide a liquid crystal composition that has at least one characteristic among characteristics such as a high upper limit temperature of a nematic phase, a low lower limit temperature of a nematic phase, a low viscosity, appropriate optical anisotropy, large negative dielectric anisotropy, a large specific resistance, high stability with respect to ultraviolet radiation, and high stability with respect to heat. Still another aspect is to provide a liquid crystal composition having an appropriate balance between at least two of these characteristics. Still another aspect is to provide a liquid crystal display element containing such a composition. Still another aspect is to provide an element having characteristics such as a short response time, a high voltage holding ratio, a low threshold voltage, a large contrast ratio, and a long lifespan.

The disclosure is a liquid crystal composition including one or more liquid crystalline compounds, one or more polymerizable compounds, and one or more dichroic dyes. In the liquid crystal composition, the polymerizable compound includes at least one compound selected from among the group of compounds represented by Formula (1).

[Chem. 1]

$$R^{11}\text{-MES-Sp}^{11}\text{-}P^{11} \quad (1)$$

in Formula (1), $R^{11}$ is an alkyl group having 1 to 15 carbon atoms, and in this alkyl group, at least one $-CH_2-$ is optionally substituted with $-O-$ or $-S-$, and at least one $-(CH_2)_2-$ is optionally substituted with $-CH=CH-$ or $-C\equiv C-$, and in these groups, at least one hydrogen atom is optionally substituted with a halogen atom;

MES is a mesogenic group having at least one ring, and in the ring in MES, at least one hydrogen atom is optionally substituted with $-Sp^{11}\text{-}P^{11}$;

$Sp^{11}$ is a single bond or an alkylene group having 1 to 10 carbon atoms, and in this alkylene group, at least one $-CH_2-$ is optionally substituted with $-O-$, $-CO-$, $-COO-$, $-OCO-$, or $-OCOO-$, and at least one $-(CH_2)_2-$ is optionally substituted with $-CH=CH-$ or $-C\equiv C-$, and in these groups, at least one hydrogen atom is optionally substituted with a halogen atom, and in these groups, at least one hydrogen atom is optionally substituted with a group selected from among groups represented by Formula (1a);

[Chem. 2]

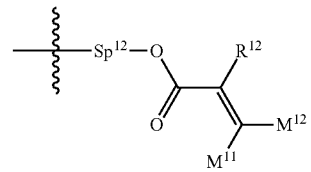

(1a)

in Formula (1a), $Sp^{12}$ is a single bond or an alkylene group having 1 to 10 carbon atoms, and in $Sp^{12}$, at least one $-CH_2-$ is optionally substituted with $-O-$, $-CO-$, $-COO-$, $-OCO-$, or $-OCOO-$, at least one $-(CH_2)_2-$ is optionally substituted with $-CH=CH-$ or $-C\equiv C-$, and at least one hydrogen atom is optionally substituted with a halogen atom;

$M^{11}$ and $M^{12}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and $R^{12}$ is an alkyl group having 1 to 15 carbon atoms, and in this $R^{12}$, at least one $-CH_2-$ is optionally substituted with $-O-$ or $-S-$, and at least one $-(CH_2)_2-$ is optionally substituted with $-CH=CH-$ or $-C\equiv C-$, and at least one hydrogen atom is optionally substituted with a halogen atom;

in Formula (1), $P^{11}$ may be a group represented by Formula (1b) when none of hydrogen atoms is substituted with a group selected from among groups represented by Formula (1a) in $Sp^{11}$.

[Chem. 3]

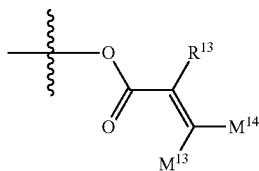

(1b)

in Formula (1b),
$M^{13}$ and $M^{14}$ independently represent a hydrogen atom, a halogen atom, an alkyl group having 1 to 5 carbon atoms, or an alkyl group having 1 to 5 carbon atoms in which at least one hydrogen atom is substituted with a halogen atom;
$R^{13}$ is a group selected from among groups represented by Formula (1c), Formula (1d), and Formula (1e);

[Chem. 4]

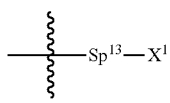

(1c)

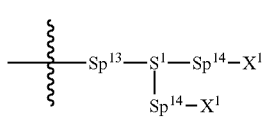

(1d)

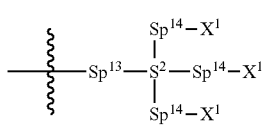

(1e)

in Formula (1c), Formula (1d), and Formula (1e),
$Sp^{13}$ and $Sp^{14}$ independently represent a single bond or an alkylene group having 1 to 10 carbon atoms, and in this alkylene group, at least one —$CH_2$— is optionally substituted with —O—, —NH—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom;
$S^1$ is >CH— or >N—;
$S^2$ is >C< or >Si<;
$X^1$ independently represent —OH, —$NH_2$, —$OR^{14}$, —$N(R^{14})_2$, a group represented by Formula (x1), —COOH, —SH, —$B(OH)_2$, or a group represented by —$Si(R^{14})_3$, and here, $R^{14}$ independently represent a hydrogen atom or an alkyl group having 1 to 10 carbon atoms, and in this alkyl group, at least one —$CH_2$— is optionally substituted with —O—, at least one —$(CH_2)_2$— is optionally substituted with —CH=CH—, and in these groups, at least one hydrogen atom is optionally substituted with a halogen atom, and w in Formula (x1) is 1, 2, 3 or 4;

[Chem. 5]

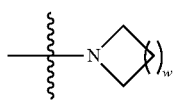

(x1)

in Formula (1), when at least one hydrogen atom is substituted with a group selected from among groups represented by Formula (1a) in $Sp^{11}$, or when none of hydrogen atoms is substituted with a group selected from among groups represented by Formula (1a) in $Sp^{11}$ and $P^{11}$ is not a group represented by Formula (1b), $P^{11}$ may be a group selected from among groups represented by Formula (1f) and Formula (1g);

[Chem. 6]

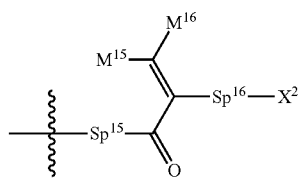

(1f)

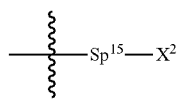

(1g)

in Formulae (1f) and (1g),
$Sp^{15}$ is a single bond or an alkylene group having 1 to 10 carbon atoms, and in this $Sp^{15}$, at least one —$CH_2$— is optionally substituted with —O—, —NH—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom;
$Sp^{16}$ is a single bond or an alkylene group having 1 to 10 carbon atoms, and in this $Sp^{16}$, at least one —$CH_2$— is optionally substituted with —O—, —NH—, —CO—, —COO—, —OCO—, or —OCOO—, and at least one —$(CH_2)_2$— is optionally substituted with —CH=CH— or —C≡C—, and at least one hydrogen atom is optionally substituted with a halogen atom;
$M^{15}$ and $M^{16}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and
$X^2$ is —OH, —$NH_2$, —$OR^{15}$, —$N(R^{15})_2$, —COOH, —SH, —$B(OH)_2$, or —$Si(R^{15})_3$, and here, $R^{15}$ independently represent a hydrogen atom or an alkyl group having 1 to 10 carbon atoms, and in this $R^{15}$, at least one -$CH_2$— is optionally substituted with —O—, at least one —$(CH_2)_2$— is optionally substituted with —CH=CH—, and at least one hydrogen atom is optionally substituted with a halogen atom;
in Formula (1),
when at least one hydrogen atom in the ring in MES is substituted with -$Sp^{11}$-$P^{11}$, in the ring in MES, at least one -$Sp^{11}$-$P^{11}$ may be a group selected from among groups represented by Formula (1h);

[Chem. 7]

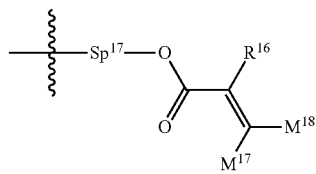

(1h)

in Formula (1h),

Sp$^{17}$ is a single bond or an alkylene group having 1 to 10 carbon atoms, and in this Sp$^{17}$, at least one —CH$_2$— is optionally substituted with —O—, —CO—, —COO—, —OCO—, or —OCOO—, and at least one —(CH$_2$)$_2$— is optionally substituted with —CH=CH— or —C≡C—, and at least one hydrogen atom is optionally substituted with a halogen atom;

M$^{17}$ and M$^{18}$ independently represent a hydrogen atom, a halogen atom, an alkyl group having 1 to 5 carbon atoms, or an alkyl group having 1 to 5 carbon atoms in which at least one hydrogen atom is substituted with a halogen atom;

R$^{16}$ is an alkyl group having 1 to 15 carbon atoms, and in this R$^{16}$, at least one —CH$_2$— is optionally substituted with —O— or —S—, at least one —(CH$_2$)$_2$— is optionally substituted with —CH=CH— or —C≡C—, and at least one hydrogen atom is optionally substituted with a halogen atom.

DESCRIPTION OF THE EMBODIMENTS

Figure 1:
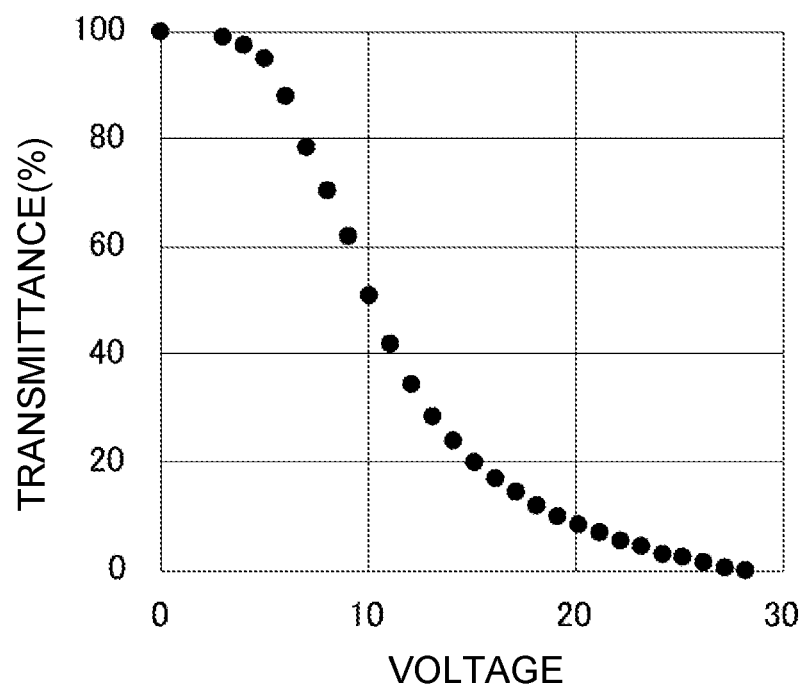
FIG. 1 is a graph showing a relationship between a voltage and a transmittance when a voltage is applied to an element obtained in Example 1.

One advantage of the disclosure is a liquid crystal composition containing a polymerizable compound having a polar group. Another advantage is a liquid crystal composition that enables vertical alignment of liquid crystal molecules by an action of a polymer produced from the polymerizable compound. Still another advantage is a liquid crystal element in a GH mode containing such a composition. Still another advantage is a liquid crystal composition that has at least one characteristic among characteristics such as a high upper limit temperature of a nematic phase, a low lower limit temperature of a nematic phase, a low viscosity, appropriate optical anisotropy, large negative dielectric anisotropy, a large specific resistance, high stability with respect to ultraviolet radiation, and high stability with respect to heat. Still another advantage is a liquid crystal composition having an appropriate balance between at least two of these characteristics. Still another advantage is a liquid crystal display element containing such a composition. Still another advantage is an element having characteristics such as a short response time, a high voltage holding ratio, a low threshold voltage, a large contrast ratio, and a long lifespan.

The terms used herein are used as follows. The terms "liquid crystal composition," and "liquid crystal display element," or "liquid crystal element" may be abbreviated as a "composition" and an "element." A "liquid crystal display element" generally refers to a liquid crystal display panel and a liquid crystal display module. A "liquid crystalline compound" generally refers to a compound having a liquid crystal phase such as a nematic phase or a smectic phase and a compound which does not have a liquid crystal phase and is added in order to adjust characteristics of a composition such as a temperature range of a nematic phase, a viscosity, and dielectric anisotropy. The liquid crystalline compound has a six-membered ring such as 1,4-cyclohexylene and 1,4-phenylene and has a rod-like molecular structure. A "polymerizable compound" is a compound that is added to form a polymer in the composition.

The liquid crystal composition may be prepared by mixing a plurality of liquid crystalline compounds. Additives such as an optically active compound, an antioxidant, a UV absorber, a dye, an antifoaming agent, a polymerizable compound, a polymerization initiator, a polymerization inhibitor, and a polar compound may be added to this liquid crystal composition as necessary. The liquid crystalline compound and additives are mixed according to known procedures. If additives are added, a proportion (content) of the liquid crystalline compound is expressed as a weight percentage (weight %) based on a weight of the liquid crystal composition excluding the additives. A proportion (an amount added) of additives is expressed as a weight percentage (parts by weight) based on the weight of the liquid crystal composition excluding the additives (for example, a total weight of a first component and a second component is set to 100 parts by weight). A weight parts per million (ppm) may be used. Proportions of a polymerization initiator and a polymerization inhibitor are otherwise expressed on the basis of a weight of a polymerizable compound.

An "upper limit temperature of a nematic phase" may be abbreviated as an "upper limit temperature." A "lower limit temperature of a nematic phase" may be abbreviated as a "lower limit temperature." The expression "a specific resistance is large" means that a composition has a large specific resistance not only at room temperature in an initial stage but also at a temperature close to an upper limit temperature and thus, after it is used for a long time, it has a large specific resistance not only at room temperature but also at a temperature close to an upper limit temperature. The expression "a voltage holding ratio is high" means that an element has a high voltage holding ratio not only at room temperature in an initial stage but also at a temperature close to an upper limit temperature, and thus, after it is used for a long time, it has a high voltage holding ratio not only at room temperature but also at a temperature close to an upper limit temperature. Characteristics of compositions and elements may be examined before and after an aging test (including an accelerated deterioration test). The expression "increasing dielectric anisotropy" means that a value increases positively when a composition has positive dielectric anisotropy, and means that a value increases negatively when a composition has negative dielectric anisotropy.

The compound represented by Formula (1) may be abbreviated as "Compound (1). At least one compound selected from among the group of compounds represented by Formula (1) may be abbreviated as "Compound (1)." "Compound (1)" refers to one compound represented by Formula (1), a mixture of two compounds, or a mixture of three or more compounds. These rules apply to compounds represented by other formulae. The expression "at least one 'A'" means that the number of 'A' is arbitrary. The expression "at least one 'A' is optionally substituted with 'B' means that, when the number of 'A' is 1, the position on 'A' is arbitrary and when the number of 'A' is two or more, the positions thereon can be selected without limitation. These rules also apply to the expression "at least one 'A' is substituted with 'B'".

In chemical formulae in compounds, for example, the symbol of a terminal group R$^3$ is used for a plurality of compounds. In these compounds, two groups represented by any two R$^3$ groups may be the same as or different from each other. For example, there may be a case in which R$^3$ of Compound (2-1) is an ethyl group and R$^3$ of Compound (2-2) is an ethyl group. There may also be a case in which R³ of Compound (2-1) is an ethyl group and R³ of Compound (2-2) is a propyl group. These rules also apply to symbols of other terminal groups. In Formula (2), when b is 2, there are two rings C. In this compound, two rings represented by two rings C may be the same as or different from each other. These rules also apply to any two rings C when b is greater than 2. These rules also apply to other symbols. These rules also apply to the case of two -Sp⁴-P² in Compound (4-27).

Symbols such as A¹, A², A³, A⁴, B¹, B², B³, B⁴, C, D, E, F, G, J, K, and P surrounded by a hexagon correspond to rings such as ring A¹, ring A², ring A³, ring A⁴, ring B¹, ring B², ring B³, ring B⁴, ring C, ring D, ring E, ring F, ring G, ring J, ring K, and ring P and indicate a ring such as a six-membered ring or a condensed ring. An oblique line crossing this hexagon indicates that any hydrogen atom on the ring is optionally substituted with a group such as -Sp³-P¹. A suffix such as 'j' indicates the number of groups substituted. When the suffix 'j' is 0, there is no such substitution. When the suffix 'j' is 2 or more, there are a plurality of -Sp³-P¹ on the ring J. The plurality of groups represented by -Sp³-P¹ may be the same as or different from each other.

2-Fluoro-1,4-phenylene refers to the following two divalent groups. In the chemical formulae, fluorine may be leftward (L) or rightward (R). These rules also apply to an asymmetric divalent group that is formed by removing two hydrogen atoms from a ring such as tetrahydropyran-2,5-diyl. These rules also apply to a divalent bond group such as carbonyloxy (—COO— or —OCO—).

[Chem. 8]

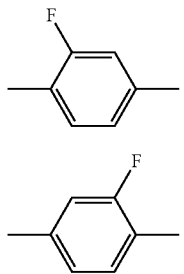

(L)

(R)

The expression "at least one —CH₂— is optionally substituted with —O—" is used in this specification. In this case, —CH₂—CH₂—CH₂— may be converted into —O—CH₂—O— when non-adjacent —CH₂— are substituted with —O—. However, adjacent —CH₂— may not be substituted with —O—. This is because, in this substitution, —O—O—CH₂-(peroxide) is formed. That is, the expression means both "one —CH₂— is optionally substituted with —O—" and "at least two non-adjacent —CH₂— are optionally substituted with —O—." These rules apply not only to substitution with —O— but also substitution with a divalent group such as —CH=CH— and —COO—. In Formula (1), R¹¹ is an alkyl group having 1 to 15 carbon atoms. The number of carbon atoms in this alkyl group can increase according to this type of substitution. In such a case, the maximum number of carbon atoms is 30. These rules apply not only to a monovalent group such as R¹¹ but also to a divalent group such as an alkylene group.

An alkyl group of the liquid crystalline compound is linear or branched, and does not contain a cyclic alkyl group. A linear alkyl group is preferable to a branched alkyl group. This similarly applies to terminal groups such as an alkoxy group and an alkenyl group. Regarding the configuration of 1,4-cyclohexylene, generally, the trans type is preferable to the cis type. A halogen refers to fluorine, chlorine, bromine, or iodine. A preferable halogen is fluorine or chlorine. A more preferable halogen is fluorine.

The disclosure includes the following items.

Item 1. A liquid crystal composition including one or more liquid crystalline compounds, one or more polymerizable compounds, and one or more dichroic dyes, and in which the polymerizable compound includes at least one compound selected from among the group of compounds represented by Formula (1):

[Chem. 9]

in Formula (1),
R¹¹ is an alkyl group having 1 to 15 carbon atoms, and in this alkyl group, at least one —CH₂— is optionally substituted with —O— or —S—, and at least one —(CH₂)₂— is optionally substituted with —CH=CH— or —C≡C—, and in these groups, at least one hydrogen atom is optionally substituted with a halogen atom;
MES is a mesogenic group having at least one ring, and in the ring in MES, at least one hydrogen atom is optionally substituted with -Sp¹¹-P¹¹;
Sp¹¹ is a single bond or an alkylene group having 1 to 10 carbon atoms, and in this alkylene group, at least one —CH₂— is optionally substituted with —O—, —CO—, —COO—, —OCO—, or —OCOO—, and at least one —(CH₂)₂— is optionally substituted with —CH=CH— or —C≡C—, and in these groups, at least one hydrogen atom is optionally substituted with a halogen atom, and in these groups, at least one hydrogen atom is optionally substituted with a group selected from among groups represented by Formula (1a);

[Chem. 10]

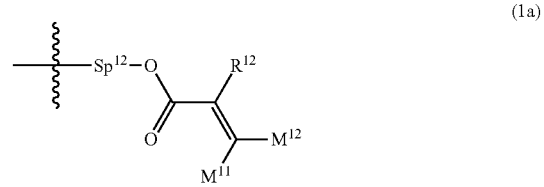

in Formula (1a),
Sp¹² is a single bond or an alkylene group having 1 to 10 carbon atoms, and in this Sp¹², at least one —CH₂— is optionally substituted with —O—, —CO—, —COO—, —OCO—, or —OCOO—, and at least one —(CH₂)₂— is optionally substituted with —CH=CH— or —C≡C—, and at least one hydrogen atom is optionally substituted with a halogen atom;
M¹¹ and M¹² independently represent a hydrogen atom, a halogen atom, an alkyl group having 1 to 5 carbon atoms, or an alkyl group having 1 to 5 carbon atoms in which at least one hydrogen atom is substituted with a halogen atom; and
R¹² is an alkyl group having 1 to 15 carbon atoms, and in this R¹², at least one —CH₂— is optionally substituted with —O— or —S—, and at least one —(CH$_2$)$_2$— is optionally substituted with —CH=CH— or —C≡C—, and at least one hydrogen atom is optionally substituted with a halogen atom;

in Formula (1),

P$^{11}$ may be a group represented by Formula (1b) when none of hydrogen atoms is substituted with a group selected from among groups represented by Formula (1a) in Sp$^{11}$.

[Chem. 11]

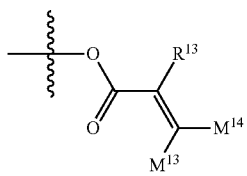

(1b)

in Formula (1b),

M$^{13}$ and M$^{14}$ independently represent a hydrogen atom, a halogen atom, an alkyl group having 1 to 5 carbon atoms, or an alkyl group having 1 to 5 carbon atoms in which at least one hydrogen atom is substituted with a halogen atom;

R$^{13}$ is a group selected from among groups represented by Formula (1c), Formula (1d), and Formula (1e);

[Chem. 12]

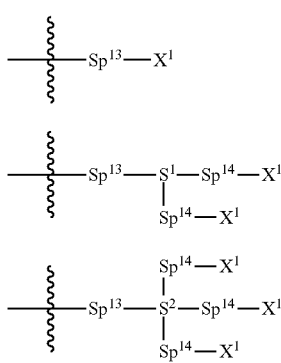

(1c)

(1d)

(1e)

in Formula (1c), Formula (1d), and Formula (1e),

Sp$^{13}$ and Sp$^{14}$ independently represent a single bond or an alkylene group having 1 to 10 carbon atoms, and in this alkylene group, at least one —CH$_2$— is optionally substituted with —O—, —NH—, —CO—, —COO—, —OCO—, or —OCOO—, and at least one —(CH$_2$)$_2$— is optionally substituted with —CH=CH— or —C≡C—, and in these groups, at least one hydrogen atom is optionally substituted with a halogen atom;

S$^1$ is >CH— or >N—;

S$^2$ is >C< or >Si<;

X$^1$ independently represent —OH, —NH$_2$, —OR$^{14}$, —N(R$^{14}$)$_2$, a group represented by Formula (x1), —COOH, —SH, —B(OH)$_2$, or a group represented by —Si(R$^{14}$)$_3$, and here, R$^{14}$ independently represent a hydrogen atom or an alkyl group having 1 to 10 carbon atoms, and in this alkyl group, at least one —CH$_2$— is optionally substituted with —O—, at least one —(CH$_2$)$_2$— is optionally substituted with —CH=CH—, and in these groups, at least one hydrogen atom is optionally substituted with a halogen atom, and w in Formula (x1) is 1, 2, 3 or 4;

[Chem. 13]

(x1)

in Formula (1), when at least one hydrogen atom is substituted with a group selected from among groups represented by Formula (1a) in Sp$^{11}$, or when none of hydrogen atoms is substituted with a group selected from among groups represented by Formula (1a) in Sp$^{11}$ and P$^{11}$ is not a group represented by Formula (1b), P$^{11}$ may be a group selected from among groups represented by Formula (1f) and Formula (1g);

[Chem. 14]

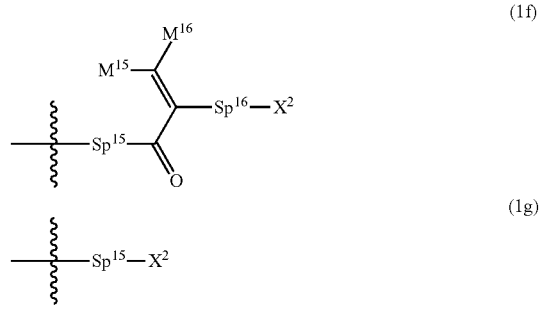

(1f)

(1g)

in Formulae (1f) and (1g),

Sp$^{15}$ is a single bond or an alkylene group having 1 to 10 carbon atoms, and in this Sp$^{15}$, at least one —CH$_2$— is optionally substituted with —O—, —NH—, —CO—, —COO—, —OCO—, or —OCOO—, and at least one —(CH$_2$)$_2$— is optionally substituted with —CH=CH— or —C≡C—, and in these groups, at least one hydrogen atom is optionally substituted with a halogen atom; Sp$^{16}$ is a single bond or an alkylene group having 1 to 10 carbon atoms, and in this Sp$^{16}$, at least one —CH$_2$— is optionally substituted with —O—, —NH—, —CO—, —COO—, —OCO—, or —OCOO—, at least one —(CH$_2$)$_2$— is optionally substituted with —CH=CH— or —C≡C—, and at least one hydrogen atom is optionally substituted with a halogen atom;

M$^{15}$ and M$^{16}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and X$^2$ is —OH, —NH$_2$, —OR$^{15}$, —N(R$^{15}$)$_2$, —COOH, —SH, —B(OH)$_2$, or —Si(R$^{15}$)$_3$, and here, R$^{15}$ independently represent a hydrogen atom or an alkyl group having 1 to 10 carbon atoms, and in this R$^{15}$, at least one -CH$_2$— is optionally substituted with —O—, at least one —(CH$_2$)$_2$— is optionally substituted with —CH=CH—, and at least one hydrogen atom is optionally substituted with a halogen atom;

in Formula (1),
when at least one hydrogen atom in the ring in MES is substituted with -Sp$^{11}$-P$^{11}$, in the ring in MES, at least one -Sp$^{11}$-P$^{11}$ may be a group selected from among groups represented by Formula (1h);

[Chem. 15]

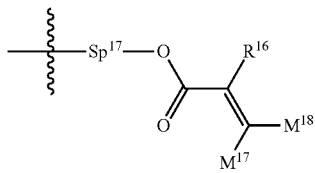

(1h)

in Formula (1h),
Sp$^{17}$ is a single bond or an alkylene group having 1 to 10 carbon atoms, and in this Sp$^{17}$, at least one —CH$_2$— is optionally substituted with —O—, —CO—, —COO—, —OCO—, or —OCOO—, at least one —(CH$_2$)$_2$— is optionally substituted with —CH=CH— or —C≡C—, and at least one hydrogen atom is optionally substituted with a halogen atom;
M$^{17}$ and M$^{18}$ independently represent a hydrogen atom, a halogen atom, an alkyl group having 1 to 5 carbon atoms, or an alkyl group having 1 to 5 carbon atoms in which at least one hydrogen atom is substituted with a halogen atom;
R$^{16}$ is an alkyl group having 1 to 15 carbon atoms, and in this R$^{16}$, at least one —CH$_2$— is optionally substituted with —O— or —S—, at least one —(CH$_2$)$_2$— is optionally substituted with —CH=CH— or —C≡C—, and at least one hydrogen atom is optionally substituted with a halogen atom.

Item 2. The liquid crystal composition according to Item 1,
wherein the polymerizable compound includes at least one compound selected from among the group of compounds represented by Formula (1-1).

[Chem. 16]

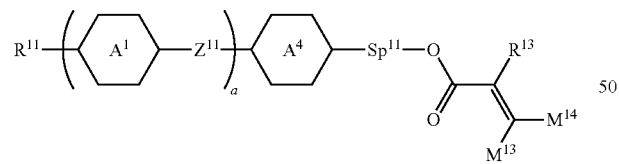

(1-1)

in Formula (1-1),
R$^{11}$ is an alkyl group having 1 to 15 carbon atoms, and in this alkyl group, at least one —CH$_2$— is optionally substituted with —O— or —S—, and at least one —(CH$_2$)$_2$— is optionally substituted with —CH=CH— or —C≡C—, and in these groups, at least one hydrogen atom is optionally substituted with a halogen atom;
ring A$^1$ and ring A$^4$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -Sp$^{11}$-P$^{11}$, and in these groups, at least one hydrogen atom is optionally substituted with a fluorine or chlorine atom;
Z$^{11}$ independently represent a single bond or an alkylene group having 1 to 10 carbon atoms, and in this alkylene group, at least one —CH$_2$— is optionally substituted with —O—, —CO—, —COO—, —OCO—, or —OCOO—, and at least one —(CH$_2$)$_2$— is optionally substituted with —CH=CH— or —C≡C—, and in these groups, at least one hydrogen atom is optionally substituted with a halogen atom;
a is 0, 1, 2, 3, or 4;
Sp$^{11}$ is a single bond or an alkylene group having 1 to 10 carbon atoms, and in this alkylene group, at least one —CH$_2$— is optionally substituted with —O—, —CO—, —COO—, —OCO—, or —OCOO—, and at least one —(CH$_2$)$_2$— is optionally substituted with —CH=CH— or —C≡C—, and in these groups, at least one hydrogen atom is optionally substituted with a halogen atom;
M$^{13}$ and M$^{14}$ independently represent a hydrogen atom, a halogen atom, an alkyl group having 1 to 5 carbon atoms, or an alkyl group having 1 to 5 carbon atoms in which at least one hydrogen atom is substituted with a halogen atom;
R$^{13}$ is a group represented by Formula (1c) or Formula (1d):

[Chem. 17]

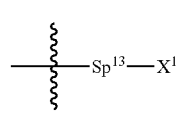

(1c)

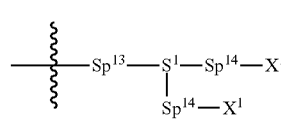

(1d)

in Formula (1c) and Formula (1d),
Sp$^{13}$ and Sp$^{14}$ independently represent a single bond or an alkylene group having 1 to 10 carbon atoms, and in this alkylene group, at least one —CH$_2$— is optionally substituted with —O—, —NH—, —CO—, —COO—, —OCO—, or —OCOO—, and at least one —(CH$_2$)$_2$— is optionally substituted with —CH=CH— or —C≡C—, and in these groups, at least one hydrogen atom is optionally substituted with a halogen atom;
S$^1$ is >CH— or >N—;
X$^1$ independently represent —OH, —NH$_2$, —OR$^{14}$, —N(R$^{14}$)$_2$, a group represented by Formula (x1), —COOH, —SH, —B(OH)$_2$, or a group represented by —Si(R$^{14}$)$_3$, and here, R$^{14}$ independently represent a hydrogen atom or an alkyl group having 1 to 10 carbon atoms, and in this alkyl group, at least one —CH$_2$— is optionally substituted with —O—, at least one —$(CH_2)_2$— is optionally substituted with —CH=CH—, and in these groups, at least one hydrogen atom is optionally substituted with a halogen atom, and w in Formula (x1) is 1, 2, 3 or 4;

[Chem. 18]

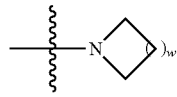

(x1)

Item 3. The liquid crystal composition according to Item 1 or 2,
wherein the polymerizable compound includes at least one compound selected from among the group of compounds represented by Formula (1-2).

[Chem. 19]

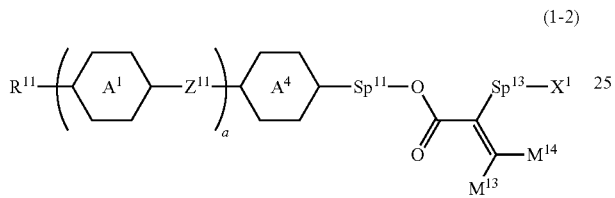

(1-2)

in Formula (1-2),
$R^{11}$ is an alkyl group having 1 to 15 carbon atoms, an alkenyl group having 2 to 15 carbon atoms, an alkoxy group having 1 to 14 carbon atoms, or an alkenyloxy group having 2 to 14 carbon atoms, and in these groups, at least one hydrogen atom is optionally substituted with a fluorine or chlorine atom;
ring $A^1$ and ring $A^4$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -$Sp^{11}$-$P^{11}$, and in these groups, at least one hydrogen atom is optionally substituted with a fluorine or chlorine atom;
$Z^{11}$ independently represent a single bond, —$(CH_2)_2$—, —CH=CH—, —C≡C—, —COO—, —OCO—, —$CF_2O$—, —$OCF_2$—, —$CH_2O$—, —$OCH_2$—, or —CF=CF—;
a is 0, 1, 2, 3, or 4;
$Sp^{11}$ and $Sp^{13}$ independently represent a single bond or an alkylene group having 1 to 10 carbon atoms, and in this alkylene group, at least one —$CH_2$— is optionally substituted with —O—, —COO—, or —OCO—, at least one —$(CH_2)_2$— is optionally substituted with —CH=CH—, and in these groups, at least one hydrogen atom is optionally substituted with a fluorine or chlorine atom;
$M^{13}$ and $M^{14}$ independently represent a hydrogen atom, a fluorine atom, an alkyl group having 1 to 5 carbon atoms, or an alkyl group having 1 to 5 carbon atoms in which at least one hydrogen atom is substituted with a fluorine atom; and
$X^1$ is —OH, —$NH_2$, —$OR^{14}$, —$N(R^{14})_2$, a group represented by Formula (x1), —COOH, —SH, —$B(OH)_2$, or a group represented by —$Si(R^{14})_3$, and here, $R^{14}$ independently represent a hydrogen atom or an alkyl group having 1 to 10 carbon atoms, and in this alkyl group, at least one —$CH_2$— is optionally substituted with —O—, at least one —$(CH_2)_2$— is optionally substituted with —CH=CH—, and in these groups, at least one hydrogen atom is optionally substituted with a fluorine or chlorine atom, and in Formula (x1), w is 1, 2, 3 or 4.

[Chem. 20]

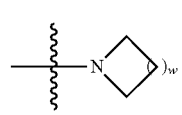

(x1)

Item 4. The liquid crystal composition according to any one of Items 1 to 3, wherein the polymerizable compound includes at least one compound selected from among the group of compounds represented by Formula (1-3) to Formula (1-6).

[Chem. 21]

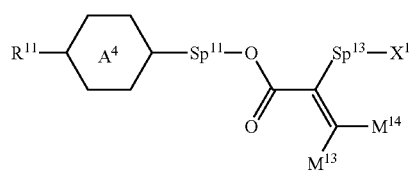

(1-3)

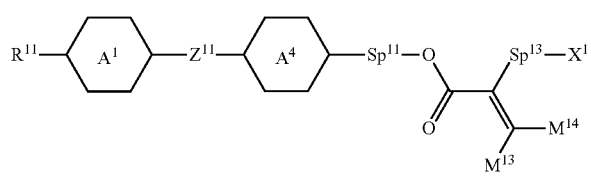

(1-4)

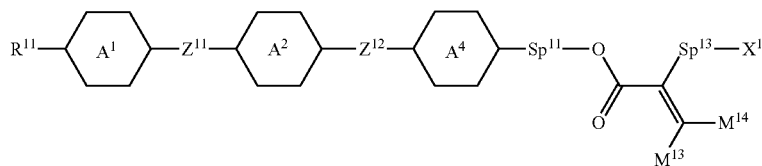

(1-5)

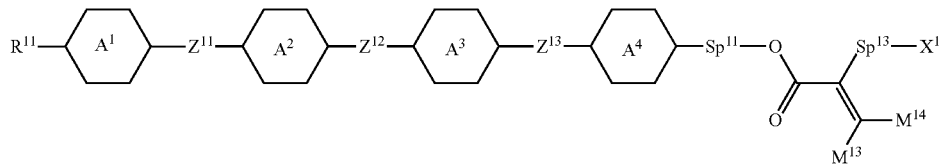

(1-6)

in Formula (1-3) to Formula (1-6), $R^{11}$ is an alkyl group having 1 to 15 carbon atoms, an alkenyl group having 2 to 15 carbon atoms, an alkoxy group having 1 to 14 carbon atoms, or an alkenyloxy group having 2 to 14 carbon atoms, and in these groups, at least one hydrogen atom is optionally substituted with a fluorine atom;

ring $A^1$, ring $A^2$, ring $A^3$, and ring $A^4$ independently represent 1,4-cyclohexylene, 1,4-cyclohexenylene, 1,4-phenylene, naphthalene-2,6-diyl, decahydronaphthalene-2,6-diyl, tetrahydropyran-2,5-diyl, 1,3-dioxane-2,5-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 7 carbon atoms, an alkenyl group having 2 to 7 carbon atoms, or an alkoxy group having 1 to 6 carbon atoms;

$Z^{11}$, $Z^{12}$, and $Z^{13}$ independently represent a single bond, —(CH$_2$)$_2$—, —CH=CH—, —C≡C—, —COO—, —OCO—, —CF$_2$O—, —OCF$_2$—, —CH$_2$O—, —OCH$_2$—, or —CF=CF—;

$Sp^{11}$ and $Sp^{13}$ independently represent a single bond or an alkylene group having 1 to 7 carbon atoms, and in this alkylene group, at least one —CH$_2$— is optionally substituted with —O—, —COO—, or —OCO—, at least one —(CH$_2$)$_2$— is optionally substituted with —CH=CH—, and in these groups, at least one hydrogen atom is optionally substituted with a fluorine atom;

$M^{13}$ and $M^{14}$ independently represent a hydrogen atom, a fluorine atom, a methyl group, an ethyl group, or a trifluoromethyl group; and $X^1$ is —OH, —NH$_2$, —OR$^{14}$, —N(R$^{14}$)$_2$, or a group represented by Formula (x1) or —Si(R$^{14}$)$_3$, and here, $R^{14}$ independently represent a hydrogen atom or alkyl group having 1 to 5 carbon atoms, and in this alkyl group, at least one-CH$_2$— is optionally substituted with —O—, at least one —(CH$_2$)$_2$— is optionally substituted with —CH=CH—, and in these groups, at least one hydrogen atom is optionally substituted with a fluorine atom, and w in Formula (x1) is 1, 2, 3 or 4.

[Chem. 22]

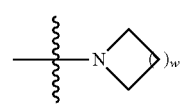

(x1)

Item 5. The liquid crystal composition according to any one of Items 1 to 4, wherein the polymerizable compound includes at least one compound selected from among the group of compounds represented by Formula (1-7) to Formula (1-10).

[Chem. 23]

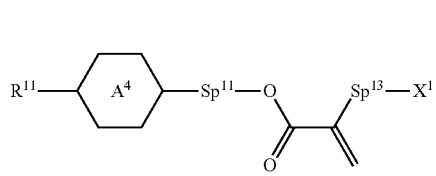 (1-7)   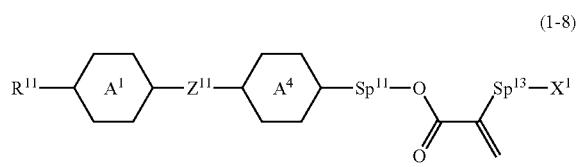 (1-8)

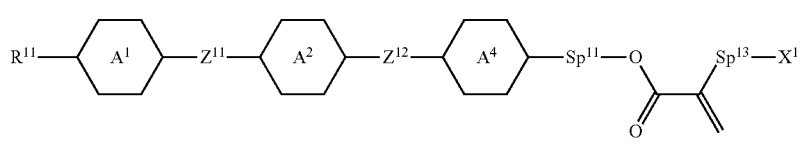

(1-9)

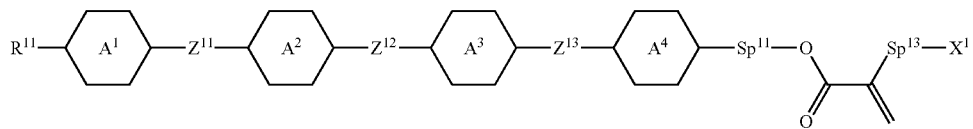

(1-10)

in Formula (1-7) to Formula (1-10),

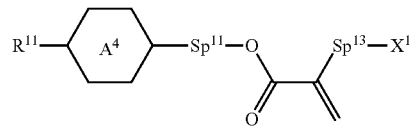

(1-11)

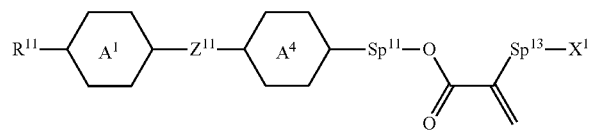

(1-12)

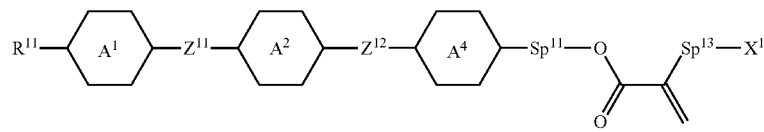

(1-13)

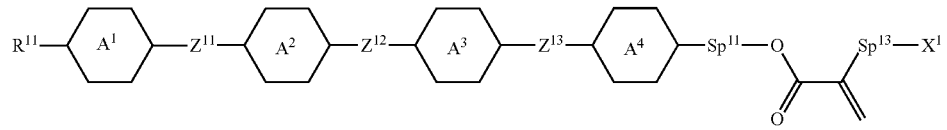

(1-14)

$R^{11}$ is an alkyl group having 1 to 10 carbon atoms, an alkenyl group having 2 to 10 carbon atoms, or an alkoxy group having 1 to 9 carbon atoms, and in these groups, at least one hydrogen atom is optionally substituted with a fluorine atom;

ring $A^1$, ring $A^2$, ring $A^3$, and ring $A^4$ independently represent 1,4-cyclohexylene, 1,4-cyclohexenylene, 1,4-phenylene, tetrahydropyran-2,5-diyl, 1,3-dioxane-2,5-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 5 carbon atoms, an alkenyl group having 2 to 5 carbon atoms, or an alkoxy group having 1 to 4 carbon atoms;

$Z^{11}$, $Z^{12}$, and $Z^{13}$ independently represent a single bond, —(CH$_2$)$_2$—, or —CH=CH—;

Sp$^{11}$ is a single bond or an alkylene group having 1 to 7 carbon atoms, and in this alkylene group, at least one —CH$_2$— is optionally substituted with —O—, and at least one —(CH$_2$)$_2$— is optionally substituted with —CH=CH—;

Sp$^{13}$ is an alkylene group having 1 to 7 carbon atoms, and in this alkylene group, at least one —CH$_2$— is optionally substituted with —O—; and $X^1$ is —OH, —NH$_2$, or —N(R$^{14}$)$_2$, and here, R$^{14}$ independently represent a hydrogen atom or alkyl group having 1 to 5 carbon atoms, and in this alkyl group, at least one —CH$_2$— is optionally substituted with —O—, at least one —(CH$_2$)$_2$— is optionally substituted with —CH=CH—, and in these groups, at least one hydrogen atom is optionally substituted with a fluorine atom.

Item 6. The liquid crystal composition according to any one of Items 1 to 5, wherein the polymerizable compound includes at least one compound selected from among the group of compounds represented by Formula (1-11) to Formula (1-14), in Formula (1-11) to Formula (1-14), $R^{11}$ is an alkyl group having 1 to 10 carbon atoms, an alkenyl group having 2 to 10 carbon atoms, or an alkoxy group having 1 to 9 carbon atoms, and in these groups, at least one hydrogen atom is optionally substituted with a fluorine atom;

ring $A^1$, ring $A^2$, ring $A^3$ and ring $A^4$ independently represent 1,4-cyclohexylene, 1,4-phenylene, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom or alkyl group having 1 to 5 carbon atoms;

$Z^{11}$, $Z^{12}$, and $Z^{13}$ independently represent a single bond or —(CH$_2$)$_2$—;

Sp$^{11}$ is a single bond or an alkylene group having 1 to 5 carbon atoms, and in this alkylene group, at least one —CH$_2$— is optionally substituted with —O—;

Sp$^{13}$ is an alkylene group having 1 to 5 carbon atoms, and in this alkylene group, at least one —CH$_2$— is optionally substituted with —O—; and $X^1$ is —OH, —NH$_2$, or —N(R$^{14}$)$_2$, and here, R$^{14}$ independently represent a hydrogen atom or alkyl group having 1 to 5 carbon atoms, and in this alkyl group, at least one —CH$_2$— is optionally substituted with —O—, at least one —(CH$_2$)$_2$— is optionally substituted with —CH=CH—, and in these groups, at least one hydrogen atom is optionally substituted with a fluorine atom.

Item 7. The liquid crystal composition according to any one of Items 1 to 6, wherein the polymerizable compound includes at least one compound selected from among the group of compounds represented by Formula (1-15) to Formula (1-31).

[Chem. 25]
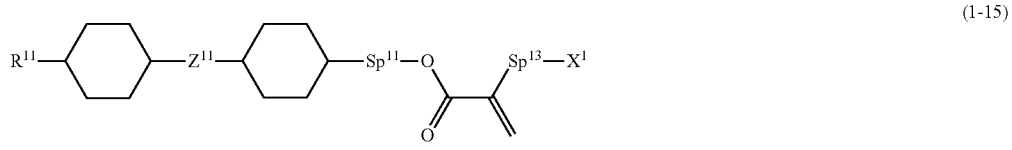
(1-15)
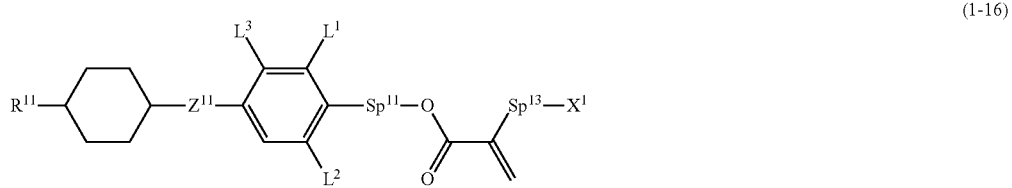
(1-16)
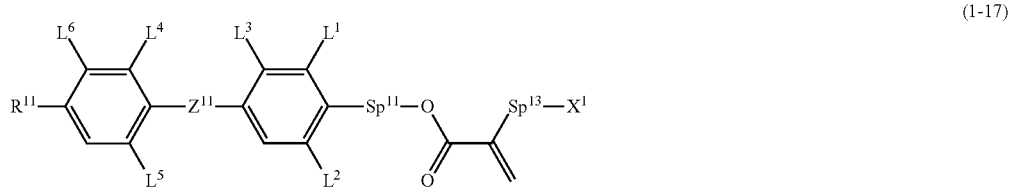
(1-17)
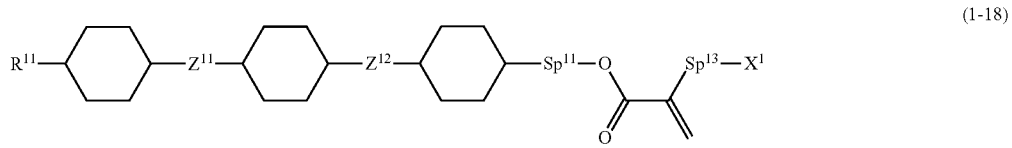
(1-18)
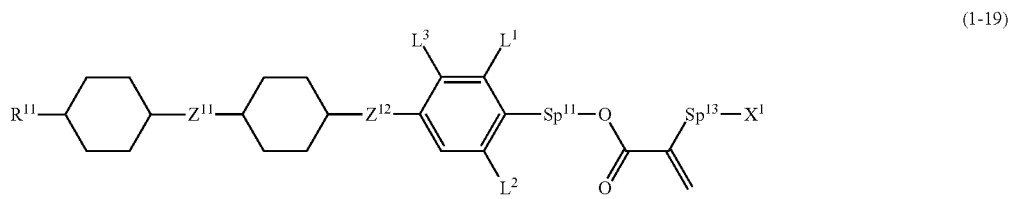
(1-19)
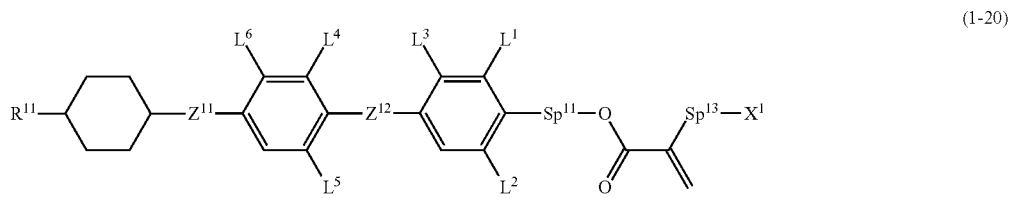
(1-20)
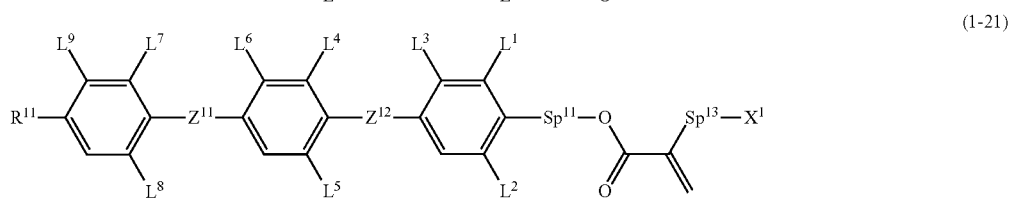
(1-21)
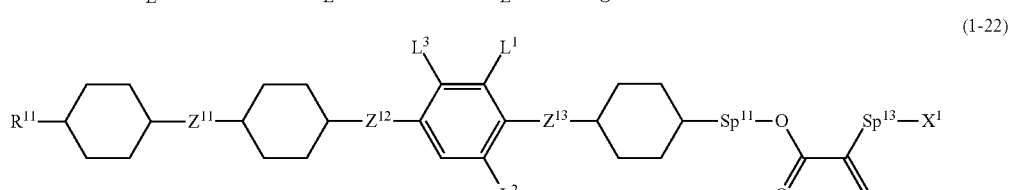
(1-22)
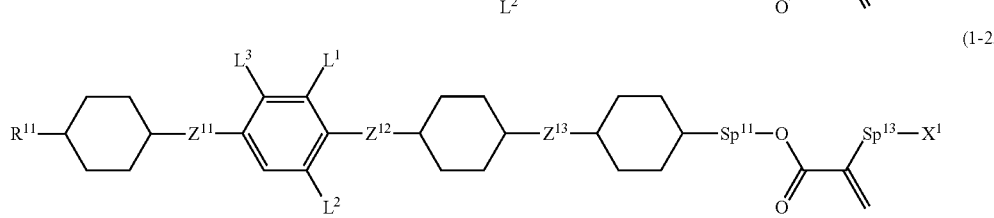
(1-23)

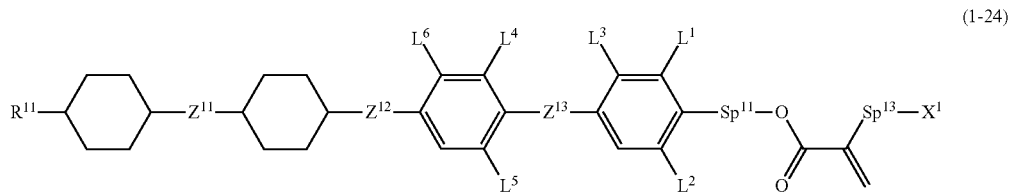
(1-24)
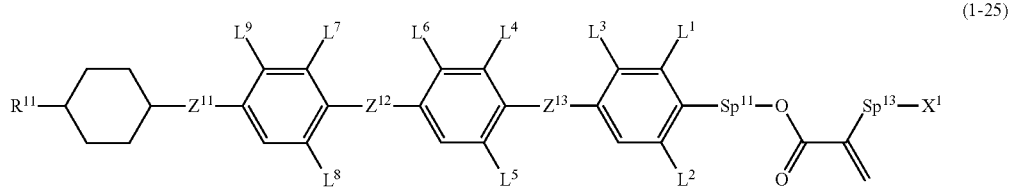
(1-25)
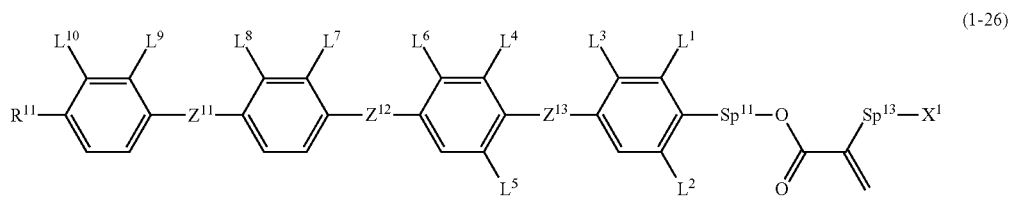
(1-26)
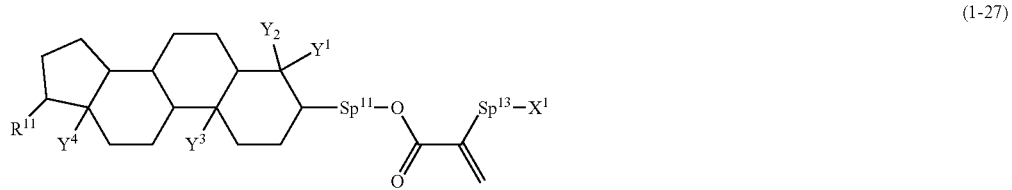
(1-27)
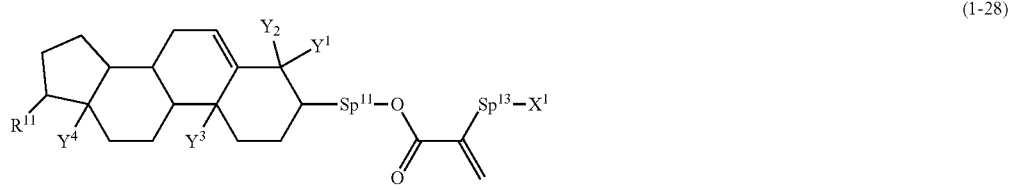
(1-28)
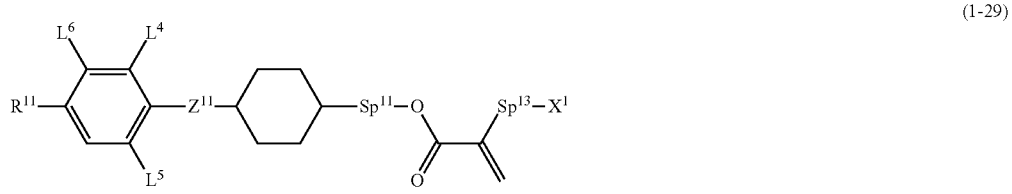
(1-29)
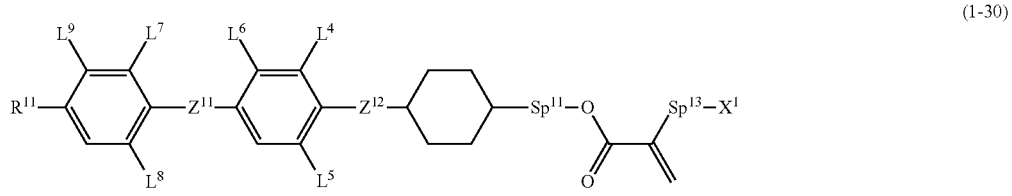
(1-30)
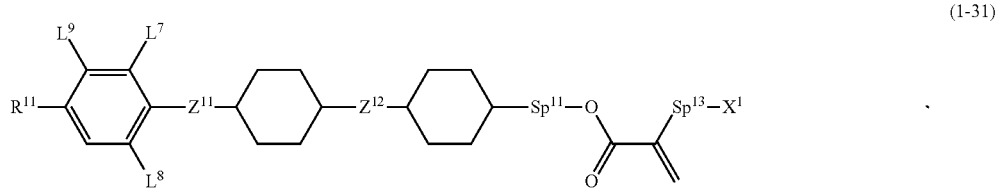
(1-31)

in Formula (1-15) to Formula (1-31),

R$^{11}$ is an alkyl group having 1 to 10 carbon atoms, an alkenyl group having 2 to 10 carbon atoms, or an alkoxy group having 1 to 9 carbon atoms, and in these groups, at least one hydrogen atom is optionally substituted with a fluorine atom;

Z$^{11}$, Z$^{12}$, and Z$^{13}$ independently represent a single bond or —(CH$_2$)$_2$—;

Sp$^{11}$ is a single bond or an alkylene group having 1 to 5 carbon atoms, and in this alkylene group, at least one —CH$_2$— is optionally substituted with —O—;

Sp$^{13}$ is an alkylene group having 1 to 5 carbon atoms, and in this alkylene group, at least one —CH$_2$— is optionally substituted with —O—;

L$^1$, L$^2$, L$^3$, L$^4$, L$^5$, L$^6$, L$^7$, L$^8$, L$^9$, and L$^{10}$ independently represent a hydrogen atom, a fluorine atom, a methyl group, or an ethyl group;

Y$^1$, Y$^2$, Y$^3$, and Y$^4$ independently represent a hydrogen atom or a methyl group; and X$^1$ is —OH, —NH$_2$, or —N(R$^{14}$)$_2$, and here, R$^{14}$ independently represent a hydrogen atom or alkyl group having 1 to 4 carbon atoms, and in this alkyl group, at least one —CH$_2$— is optionally substituted with —O—, and in these groups, at least one hydrogen atom is optionally substituted with a fluorine atom.

Item 8. The liquid crystal composition according to any one of Items 1 to 7, wherein the polymerizable compound includes at least one compound selected from among the group of compounds represented by Formula (1-32) to Formula (1-43).

[Chem. 27]

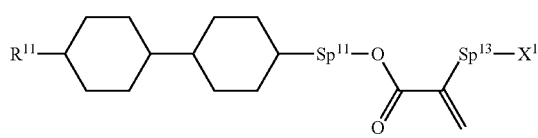

(1-32)

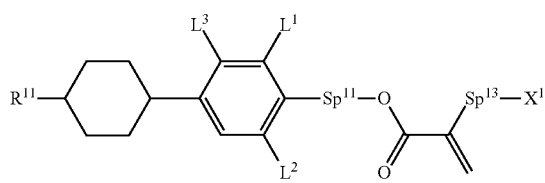

(1-33)

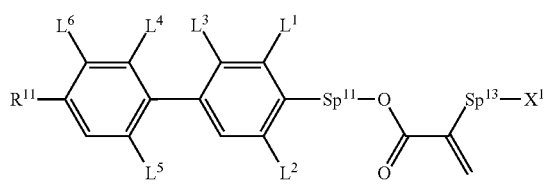

(1-34)

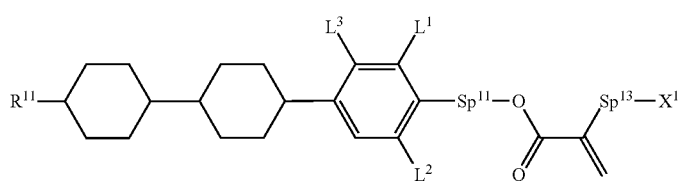

(1-35)

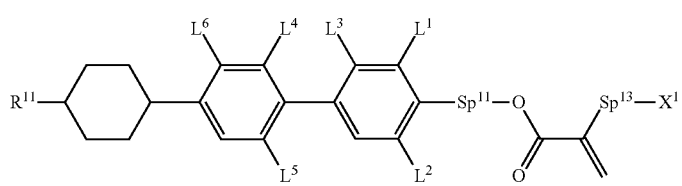

(1-36)

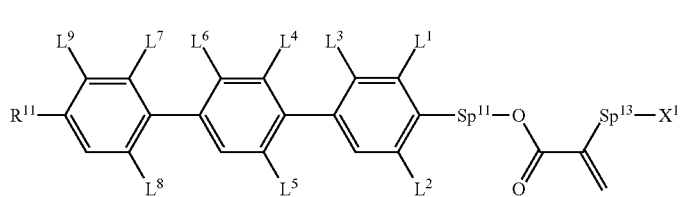

(1-37)

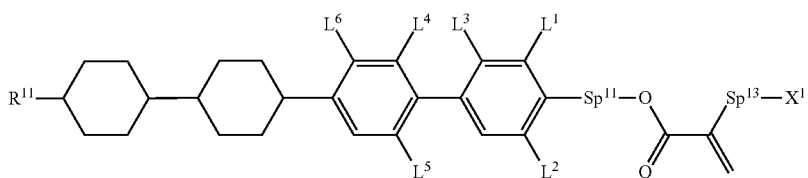
(1-38)

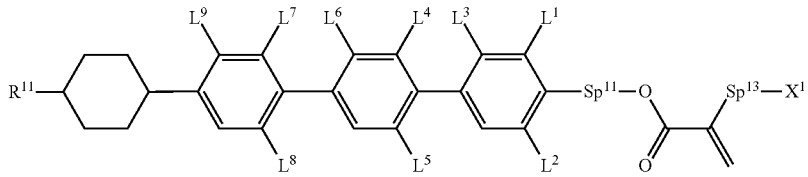
(1-39)

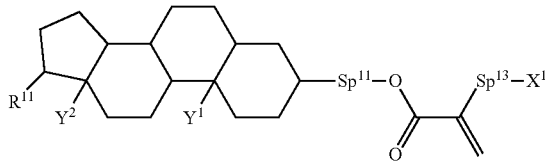
(1-40)

[Chem. 28]

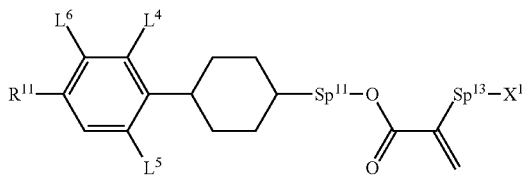
(1-41)

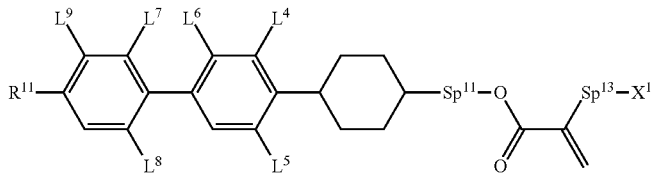
(1-42)

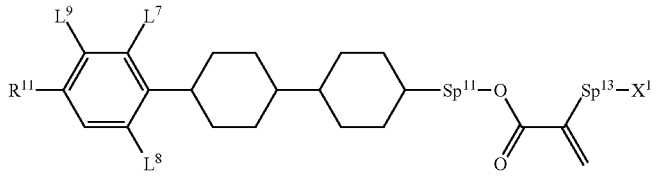
(1-43)

in Formula (1-32) to Formula (1-43), $R^{11}$ is an alkyl group having 1 to 10 carbon atoms;

$Sp^{11}$ is a single bond or an alkylene group having 1 to 5 carbon atoms, and in this alkylene group, at least one —$CH_2$— is optionally substituted with —O—, and in these groups, at least one hydrogen atom is optionally substituted with a fluorine atom;

$Sp^{13}$ is an alkylene group having 1 to 5 carbon atoms, and in this alkylene group, at least one —$CH_2$— is optionally substituted with —O—;

$L^1$, $L^2$, $L^3$, $L^4$, $L^5$, $L^6$, $L^7$, $L^8$, and $L^9$ independently represent a hydrogen atom, a fluorine atom, a methyl group, or an ethyl group;

$Y^1$ and $Y^2$ independently represent a hydrogen atom or a methyl group; and $X^1$ is —OH, —$NH_2$, or —$N(R^{14})_2$, and here, $R^{14}$ independently represent a hydrogen atom or alkyl group having 1 to 4 carbon atoms, and in this alkyl group, at least one —$CH_2$— is optionally substituted with —O—.

Item 9. The liquid crystal composition according to any one of Items 1 to 8, wherein the polymerizable compound includes at least one compound selected from among the group of compounds represented by Formula (1-44) to Formula (1-63).

[Chem. 29]

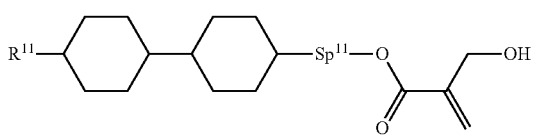
(1-44)

-continued
(1-45)
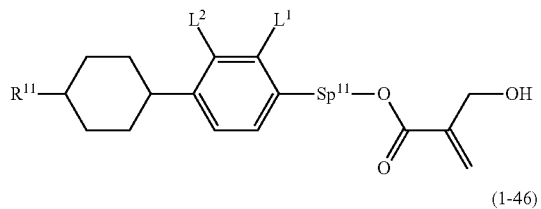
(1-46)
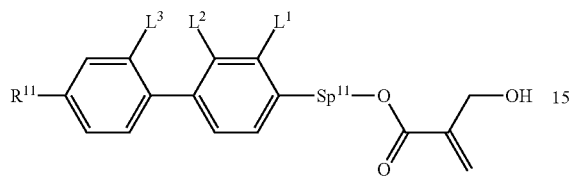
(1-47)
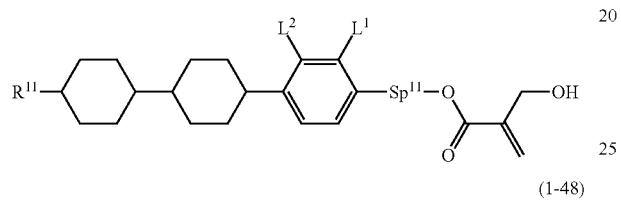
(1-48)
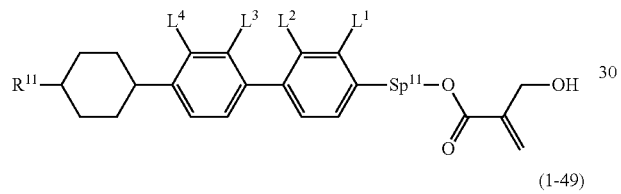
(1-49)
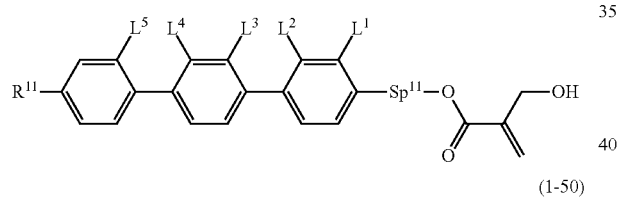
(1-50)
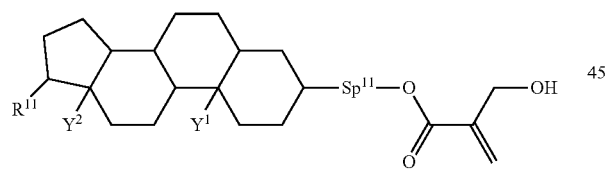
[Chem. 30]
(1-51)
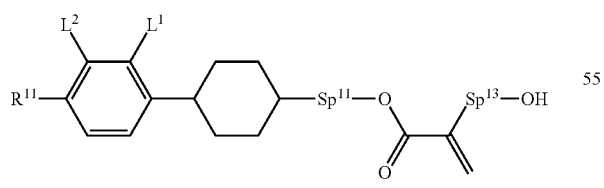
(1-52)
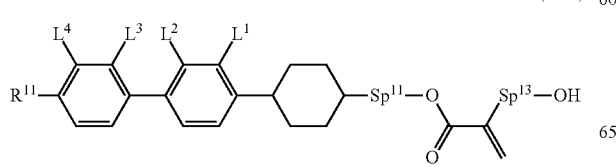
-continued
(1-53)
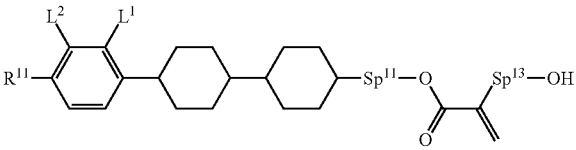
(1-54)
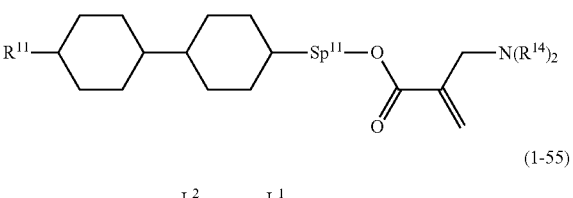
(1-55)
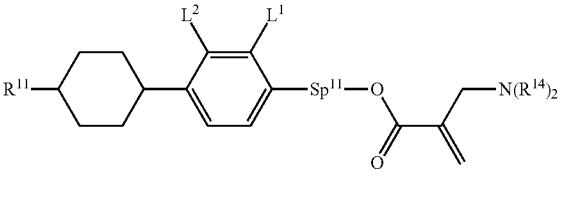
(1-56)
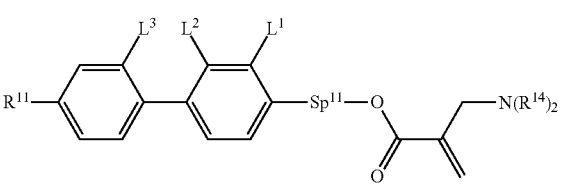
(1-57)
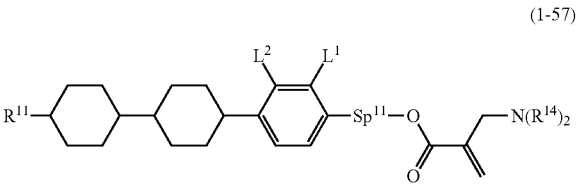
(1-58)
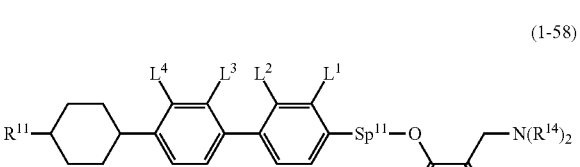
(1-59)
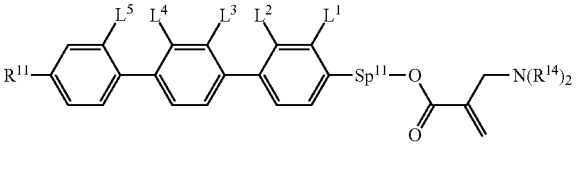
(1-60)
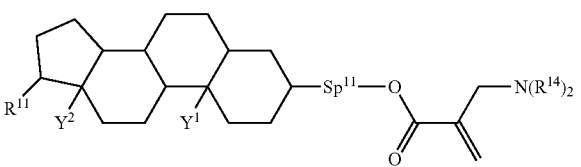

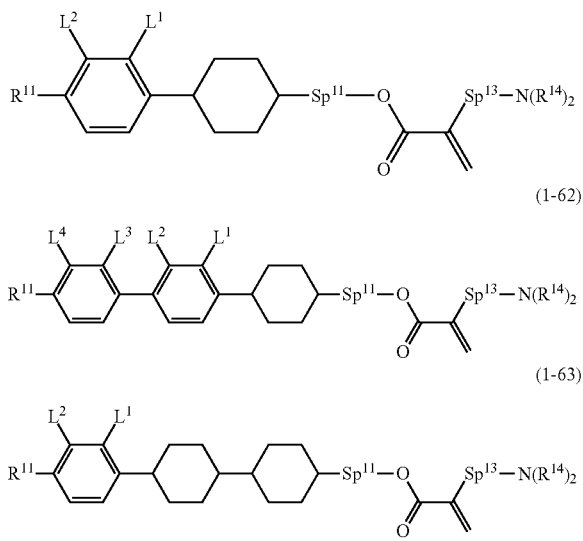

in Formula (1-44) to Formula (1-63), $R^{11}$ is an alkyl group having 1 to 10 carbon atoms;

$Sp^{11}$ is a single bond or an alkylene group having 1 to 3 carbon atoms, and in this alkylene group, at least one —$CH_2$— is optionally substituted with —O—, and in these groups, at least one hydrogen atom is optionally substituted with a fluorine atom;

$Sp^{13}$ is an alkylene group having 1 to 5 carbon atoms, and in this alkylene group, at least one —$CH_2$— is optionally substituted with —O—;

$L^1$, $L^2$, $L^3$, $L^4$, and $L^5$ independently represent a hydrogen atom, a fluorine atom, a methyl group, or an ethyl group;

$Y^1$ and $Y^2$ independently represent a hydrogen atom or a methyl group; and $R^{14}$ independently represent a hydrogen atom, a methyl group or an ethyl group.

Item 10. The liquid crystal composition according to any one of Items 1 to 9, wherein the polymerizable compound includes at least one compound selected from among the group of compounds represented by Formula (1-64),

[Chem. 32]

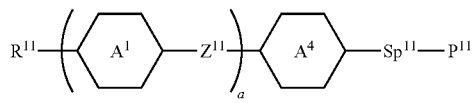

(1-64)

in Formula (1-64), $R^{11}$ is an alkyl group having 1 to 15 carbon atoms, and in this $R^{11}$, at least one —$CH_2$— is optionally substituted with —O— or —S—, at least one —$(CH_2)_2$— is optionally substituted with —CH=CH— or —C≡C—, and at least one hydrogen atom is optionally substituted with a halogen atom;

ring $A^1$ and ring $A^4$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -$Sp^{11}$-$P^{11}$, and in these groups, at least one hydrogen atom is optionally substituted with a fluorine or chlorine atom;

a is 0, 1, 2, 3, or 4;

$Z^{11}$ independently represent a single bond or an alkylene group having 1 to 6 carbon atoms, and in this $Z^{11}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a fluorine or chlorine atom; and $Sp^{11}$ is a single bond or an alkylene group having 1 to 10 carbon atoms, and in this $Sp^{11}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a halogen atom, and in these groups, at least one hydrogen atom is substituted with a group selected from among groups represented by Formula (1a);

[Chem. 33]

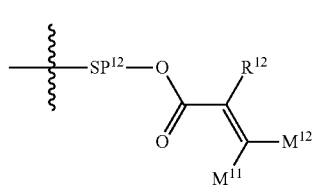

(1a)

in Formula (1a), $Sp^{12}$ is a single bond or an alkylene group having 1 to 10 carbon atoms, and in this $Sp^{12}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a halogen atom;

$M^{11}$ and $M^{12}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and $R^{12}$ is an alkyl group having 1 to 15 carbon atoms, and in this $R^{12}$, at least one —$CH_2$— is optionally substituted with —O— or —S—, and at least one —$(CH_2)_2$— is optionally substituted with —CH=CH— or —C≡C—, and at least one hydrogen atom is optionally substituted with a halogen atom;

in Formula (1-64), $P^{11}$ is a group selected from among groups represented by Formula (1f) and Formula (1g);

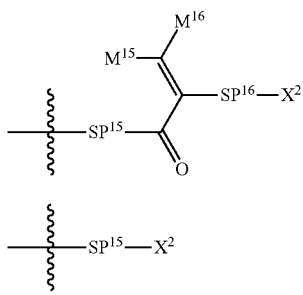

(1f)

(1g)

in Formulae (1f) and (1g),

Sp$^{15}$ is a single bond or an alkylene group having 1 to 10 carbon atoms, and in this Sp$^{15}$, at least one —CH$_2$— is optionally substituted with —O—, —NH—, —CO—, —COO—, —OCO—, or —OCOO—, and at least one —(CH$_2$)$_2$— is optionally substituted with —CH=CH— or —C≡C—, and in these groups, at least one hydrogen atom is optionally substituted with a halogen atom;

Sp$^{16}$ is a single bond or an alkylene group having 1 to 10 carbon atoms, and in this Sp$^{16}$, at least one —CH$_2$— is optionally substituted with —O—, —NH—, —CO—, —COO—, —OCO—, or —OCOO—, at least one —(CH$_2$)$_2$— is optionally substituted with —CH=CH— or —C≡C—, and at least one hydrogen atom is optionally substituted with a halogen atom;

M$^{15}$ and M$^{16}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and X$^2$ is —OH, —NH$_2$, —OR$^{15}$, —N(R$^5$)$_2$, —COOH, —SH, —B(OH)$_2$, or —Si(R$^{15}$)$_3$, and here, R$^{15}$ independently represent a hydrogen atom or an alkyl group having 1 to 10 carbon atoms, and in this R$^{15}$, at least one -CH$_2$— is optionally substituted with —O—, at least one —(CH$_2$)$_2$— is optionally substituted with —CH=CH—, and at least one hydrogen atom is optionally substituted with a halogen atom.

Item 11. The liquid crystal composition according to any one of Items 1 to 10, wherein the polymerizable compound includes at least one compound selected from among the group of compounds represented by Formula (1-65) to Formula (1-84).

(1-65)

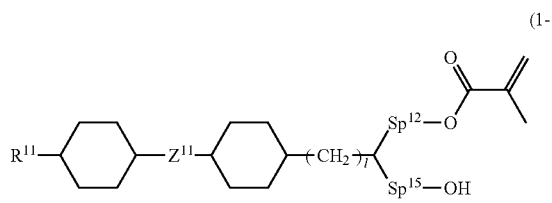

(1-66)

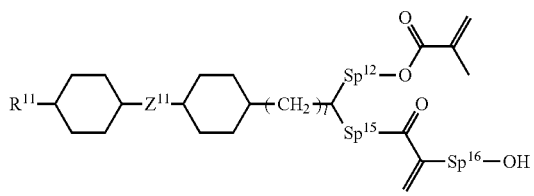

(1-67)

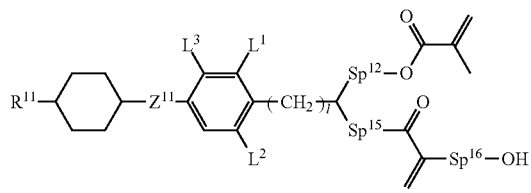

(1-68)

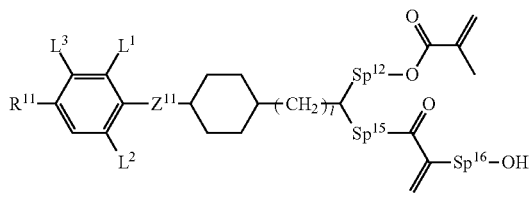

(1-69)

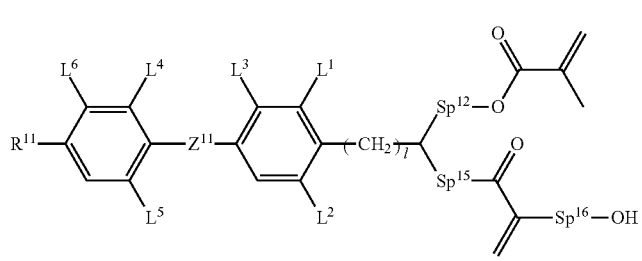

(1-70)

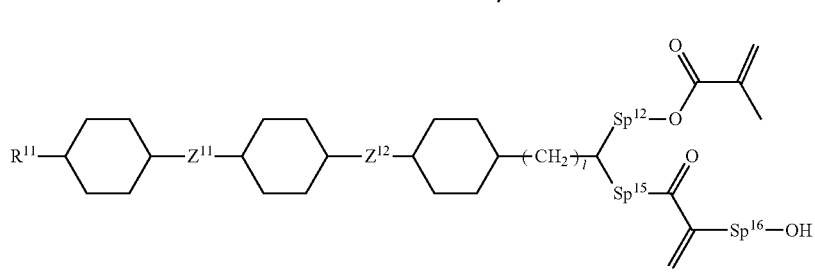

-continued
[Chem. 36]
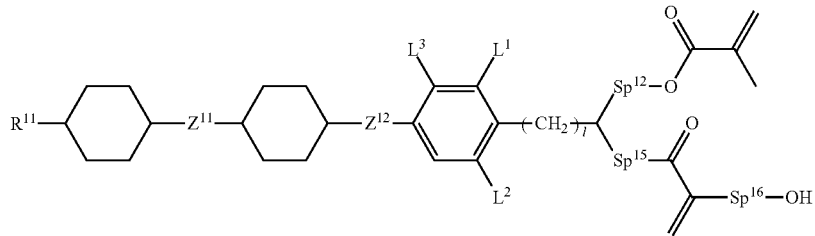
(1-71)
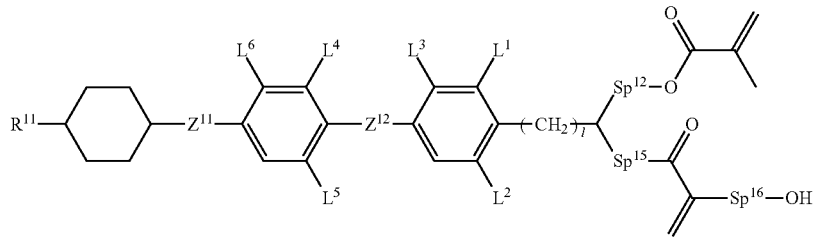
(1-72)
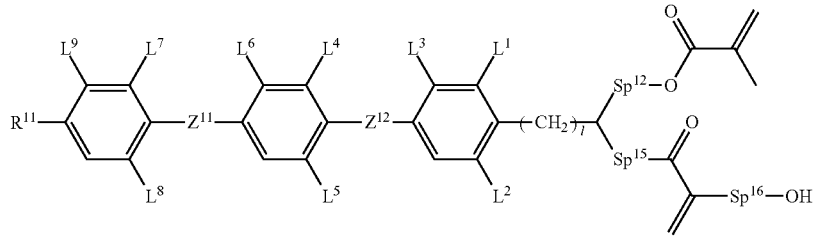
(1-73)
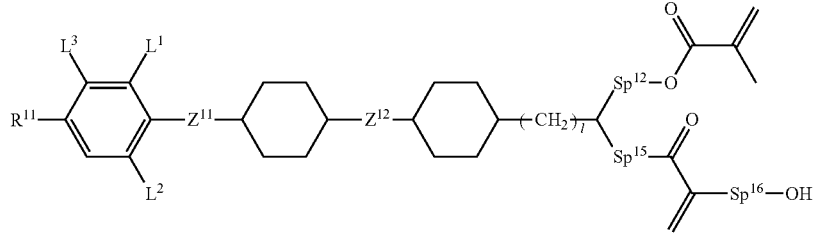
(1-74)
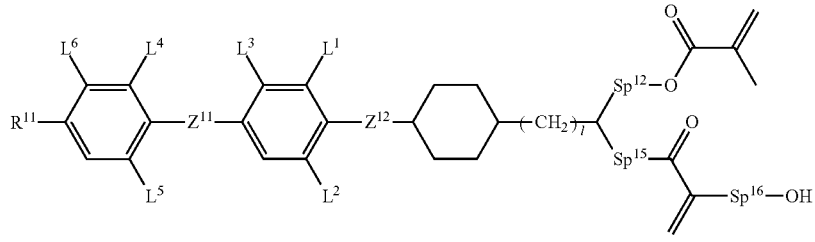
(1-75)
[Chem. 37]
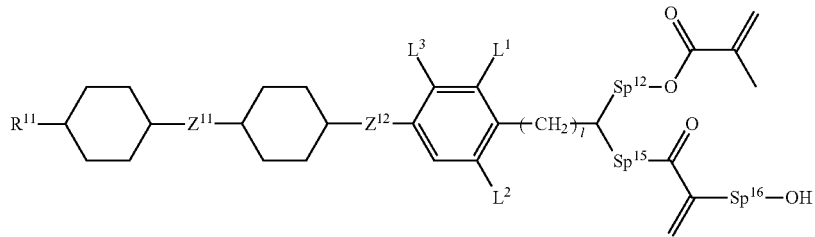
(1-76)

-continued
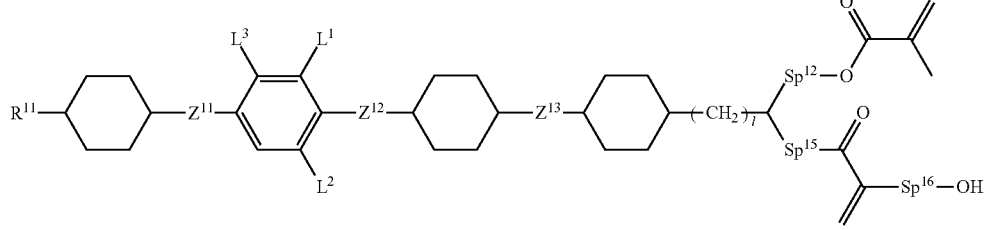
(1-77)
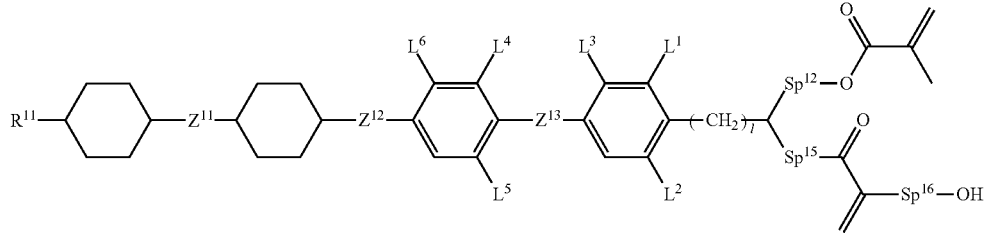
(1-78)
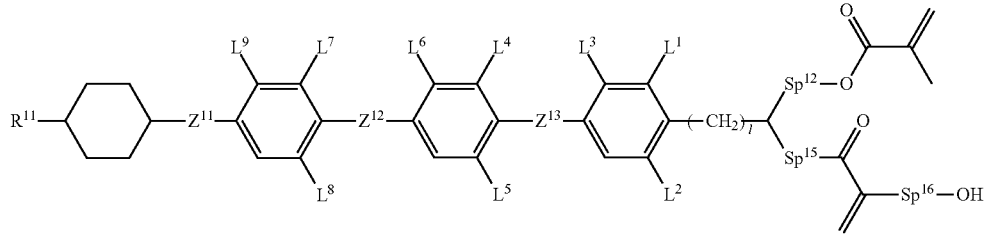
(1-79)
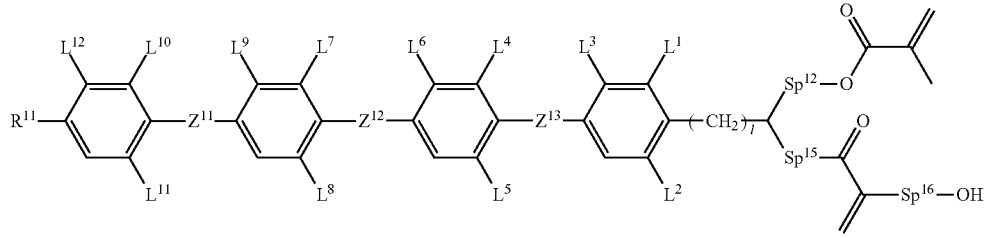
(1-80)
[Chem. 38]
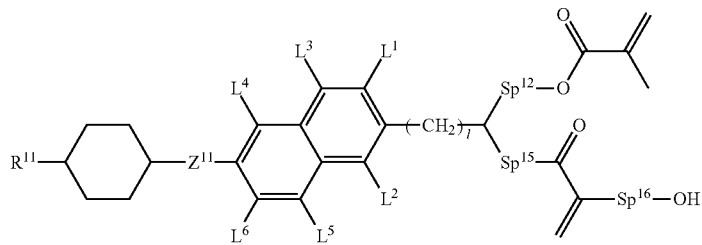
(1-81)
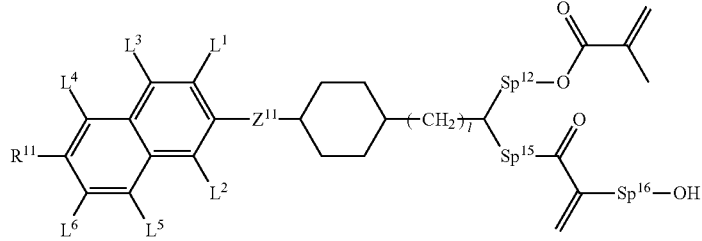
(1-82)

(1-83)

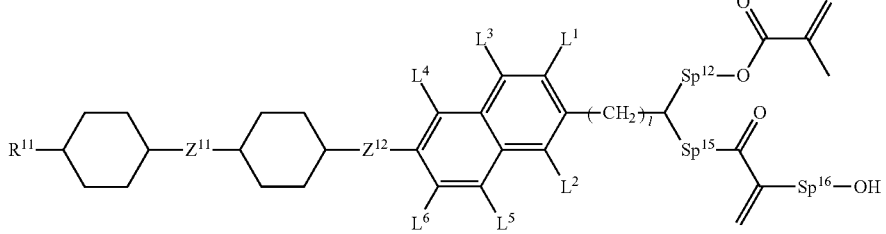

(1-84)

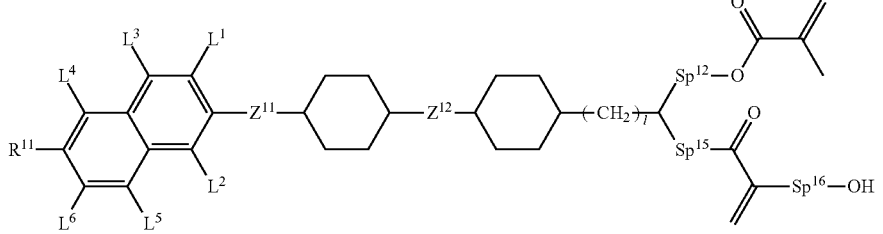

in Formula (1-65) to Formula (1-84), $R^{11}$ is an alkyl group having 1 to 10 carbon atoms;

$Z^{11}$, $Z^{12}$, and $Z^{13}$ independently represent a single bond, —(CH$_2$)$_2$—, or —(CH$_2$)$_4$—;

$Sp^{12}$, $Sp^{15}$, and $Sp^{16}$ independently represent a single bond or an alkylene group having 1 to 5 carbon atoms, and in this alkylene group, at least one —CH$_2$— is optionally substituted with —O—;

$L^1$, $L^2$, $L^3$, $L^4$, $L^5$, $L^6$, $L^7$, $L^8$, $L^9$, $L^{10}$, $L^{11}$, and $L^{12}$ independently represent a hydrogen atom, a fluorine atom, a methyl group, or an ethyl group;

l is 0, 1, 2, 3, 4, 5, or 6.

Item 12. The liquid crystal composition according to any one of Items 1 to 11, wherein the polymerizable compound includes at least one compound selected from among the group of compounds represented by Formula (1-85) and Formula (1-86).

[Chem. 39]

(1-85)

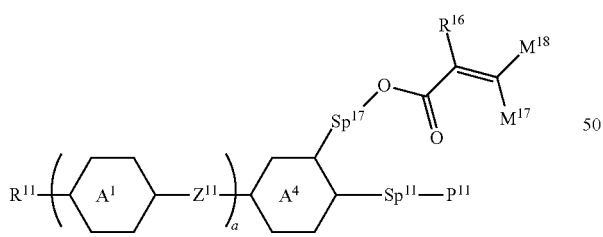

(1-86)

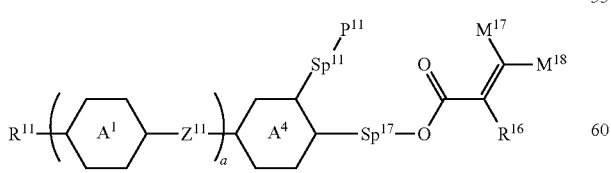

in Formula (1-85) and Formula (1-86), $R^{11}$ is an alkyl group having 1 to 15 carbon atoms, and in this $R^{11}$, at least one —CH$_2$— is optionally substituted with —O— or —S—, at least one —(CH$_2$)$_2$— is optionally substituted with —CH═CH— or —C≡C—, and at least one hydrogen atom is optionally substituted with a halogen atom;

ring $A^1$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -Sp$^{11}$-P$^{11}$, and in these groups, at least one hydrogen atom is optionally substituted with a fluorine or chlorine atom;

a is 0, 1, 2, 3, or 4;

ring $A^4$ is a benzene ring or a cyclohexane ring;

$Z^{11}$ independently represent a single bond or an alkylene group having 1 to 6 carbon atoms, and in this $Z^{11}$, at least one —CH$_2$— is optionally substituted with —O—, —CO—, —COO—, —OCO—, or —OCOO—, at least one —(CH$_2$)$_2$— is optionally substituted with —CH═CH— or —C≡C—, and at least one hydrogen atom is optionally substituted with a fluorine or chlorine atom; and $Sp^{11}$ is a single bond or an alkylene group having 1 to 10 carbon atoms, and in this $Sp^{11}$, at least one —CH$_2$— is optionally substituted with —O—, —CO—, —COO—, —OCO—, or —OCOO—, at least one —(CH$_2$)$_2$— is optionally substituted with —CH═CH— or —C≡C—, and at least one hydrogen atom is optionally substituted with a halogen atom;

$P^{11}$ is a group selected from among groups represented by Formula (1f) and Formula (1g);

[Chem. 40]

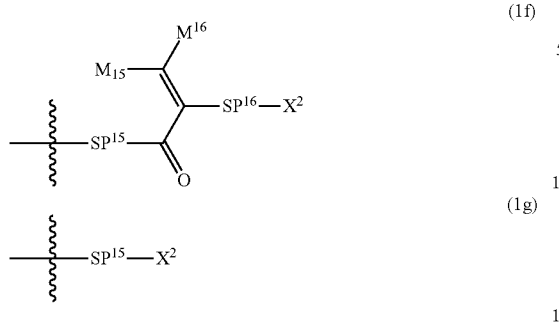

(1f)

(1g)

in Formulae (1f) and (1g), $Sp^{15}$ is a single bond or an alkylene group having 1 to 10 carbon atoms, and in this $Sp^{15}$, at least one —$CH_2$— is optionally substituted with —O—, —NH—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom;

$Sp^{16}$ is a single bond or an alkylene group having 1 to 10 carbon atoms, and in this $Sp^{16}$, at least one —$CH_2$— is optionally substituted with —O—, —NH—, —CO—, —COO—, —OCO—, or —OCOO—, at least one —$(CH_2)_2$— is optionally substituted with —CH=CH— or —C≡C—, and at least one hydrogen atom is optionally substituted with a halogen atom;

$M^{15}$ and $M^{16}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and $X^2$ is —OH, —$NH_2$, —$OR^{15}$, —$N(R^{15})_2$, —COOH, —SH, —$B(OH)_2$, or —$Si(R^{15})_3$, and here, $R^{15}$ independently represent a hydrogen atom or an alkyl group having 1 to 10 carbon atoms, and in this $R^{15}$, at least one-$CH_2$— is optionally substituted with —O—, at least one —$(CH_2)_2$— is optionally substituted with —CH=CH—, and at least one hydrogen atom is optionally substituted with a halogen atom;

in Formula (1-85) and Formula (1-86), $Sp^{17}$ is a single bond or an alkylene group having 1 to 10 carbon atoms, and in this $Sp^{17}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a halogen atom;

$M^{17}$ and $M^{18}$ independently represent a hydrogen atom, a halogen atom, an alkyl group having 1 to 5 carbon atoms, or an alkyl group having 1 to 5 carbon atoms in which at least one hydrogen atom is substituted with a halogen atom;

$R^{16}$ is an alkyl group having 1 to 15 carbon atoms, and in this $R^{16}$, at least one —$CH_2$— is optionally substituted with —O— or —S—, at least one —$(CH_2)_2$— is optionally substituted with —CH=CH— or —C≡C—, and at least one hydrogen atom is optionally substituted with a halogen atom.

Item 13. The liquid crystal composition according to any one of Items 1 to 12, wherein, based on a weight of the liquid crystal composition excluding additives, a proportion of the compound represented by Formula (1) is in a range of 0.05 parts by weight to 10 parts by weight.

Item 14. The liquid crystal composition according to any one of Items 1 to 13, wherein the liquid crystalline compound includes at least one compound selected from among the group of compounds represented by Formula (2) as a first component.

[Chem. 41]

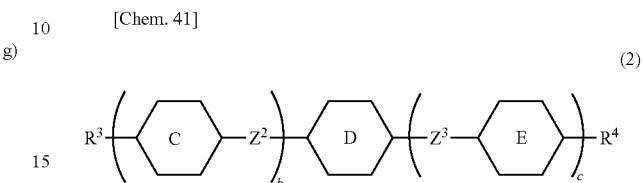

(2)

in Formula (2), $R^3$ and $R^4$ independently represent an alkyl group having 1 to 12 carbon atoms, an alkoxy group having 1 to 12 carbon atoms, an alkenyl group having 2 to 12 carbon atoms, or an alkenyloxy group having 2 to 12 carbon atoms;

ring C and a ring E independently represent 1,4-cyclohexylene, 1,4-cyclohexenylene, 1,4-phenylene, 1,4-phenylene in which at least one hydrogen atom is substituted with a fluorine or chlorine atom, or tetrahydropyran-2,5-diyl;

ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl, or 7,8-difluorochroman-2,6-diyl;

$Z^2$ and $Z^3$ independently represent a single bond, —$(CH_2)_2$—, —$CH_2O$—, —$OCH_2$—, —COO—, or —OCO—; and b is 1, 2, or 3, c is 0 or 1, and a sum of b and c is 3 or less.

Item 15. The liquid crystal composition according to Item 14, wherein the liquid crystalline compound includes at least one compound selected from among the group of compounds represented by Formula (2-1) to Formula (2-22) as the first component.

[Chem. 42]

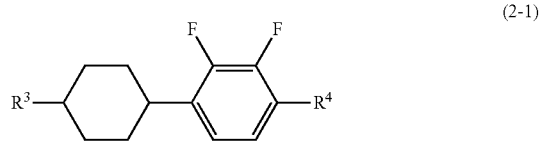

(2-1)

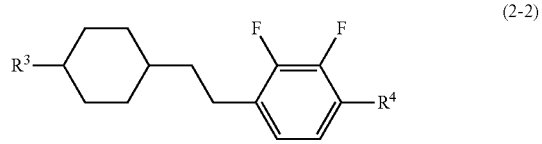

(2-2)

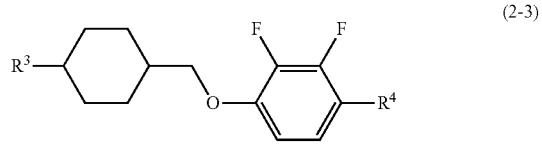

(2-3)

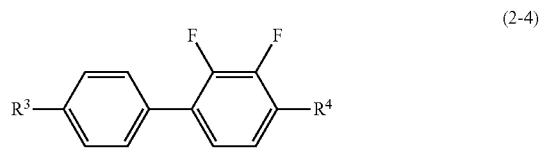

(2-4)

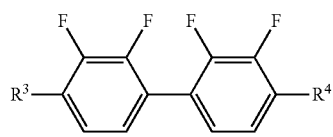
(2-5)

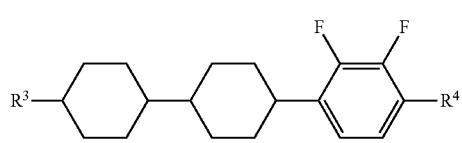
(2-6)

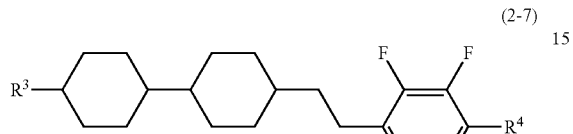
(2-7)

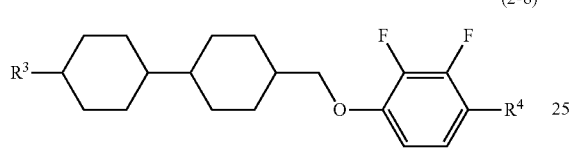
(2-8)

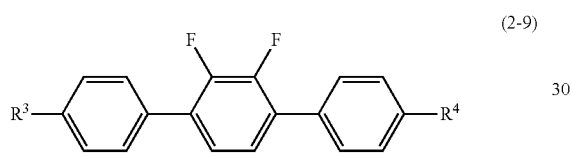
(2-9)

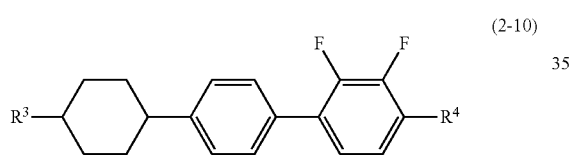
(2-10)

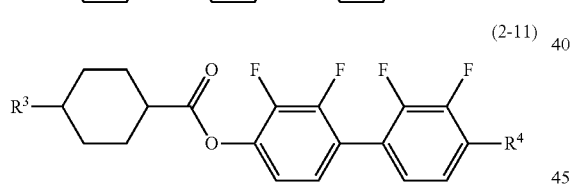
(2-11)

[Chem. 43]

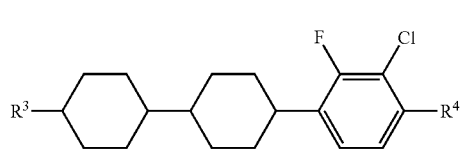
(2-12)

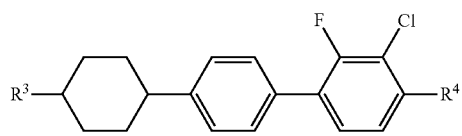
(2-13)

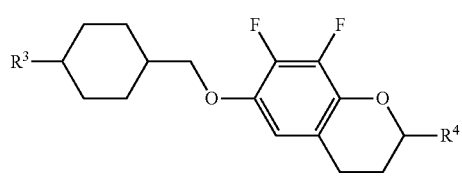
(2-14)

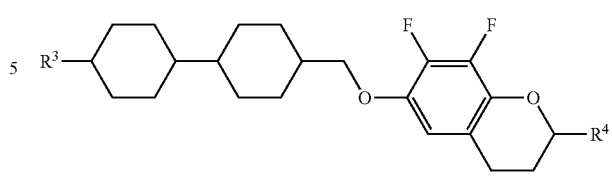
(2-15)

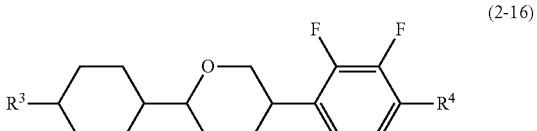
(2-16)

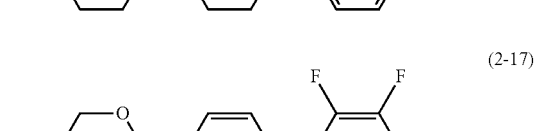
(2-17)

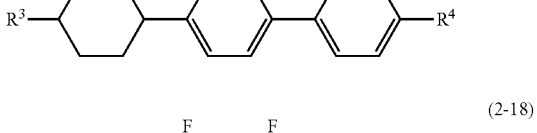
(2-18)

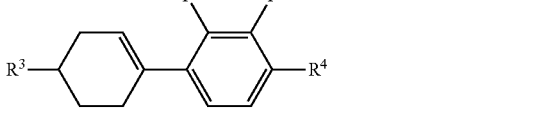
(2-19)

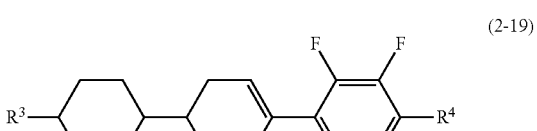
(2-20)

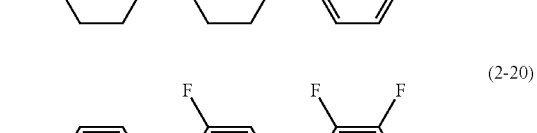
(2-21)

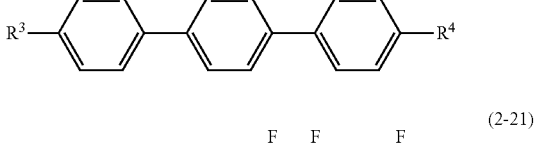
(2-22)

in Formula (2-1) to Formula (2-22), $R^3$ and $R^4$ independently represent an alkyl group having 1 to 12 carbon atoms, an alkoxy group having 1 to 12 carbon atoms, an alkenyl group having 2 to 12 carbon atoms, or an alkenyloxy group having 2 to 12 carbon atoms.

Item 16. The liquid crystal composition according to Item 14 or 15, wherein, based on a weight of the liquid crystal composition excluding additives, a proportion of the first component is in a range of 10 weight % to 90 weight %.

Item 17. The liquid crystal composition according to any one of Items 1 to 16, wherein the liquid crystalline compound includes at least one compound selected from among the group of compounds represented by Formula (3) as a second component.

[Chem. 44]

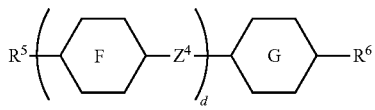
(3)

in Formula (3), $R^5$ and $R^6$ independently represent an alkyl group having 1 to 12 carbon atoms, an alkoxy group having 1 to 12 carbon atoms, an alkenyl group having 2 to 12 carbon atoms, an alkyl group having 1 to 12 carbon atoms in which at least one hydrogen atom is substituted with a fluorine or chlorine atom, or an alkenyl group having 2 to 12 carbon atoms in which at least one hydrogen atom is substituted with a fluorine or chlorine atom;

ring F and ring G independently represent 1,4-cyclohexylene, 1,4-phenylene, 2-fluoro-1,4-phenylene, or 2,5-difluoro-1,4-phenylene;

$Z^4$ independently represent a single bond, —(CH$_2$)$_2$—, —CH$_2$O—, —OCH$_2$—, —COO—, or —OCO—;

d is 1, 2, or 3.

Item 18. The liquid crystal composition according to Item 17, wherein the liquid crystalline compound includes at least one compound selected from among the group of compounds represented by Formula (3-1) to Formula (3-13) as the second component.

[Chem. 45]

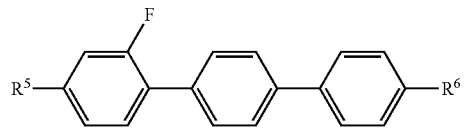
(3-1)

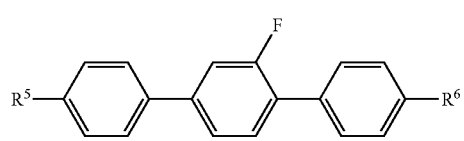
(3-2)

(3-3)

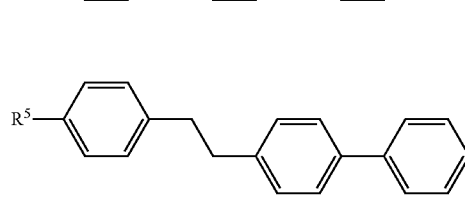
(3-4)

(3-5)

(3-6)

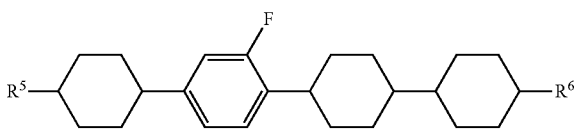
(3-7)

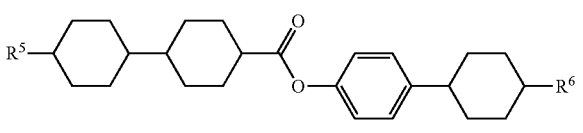
(3-8)

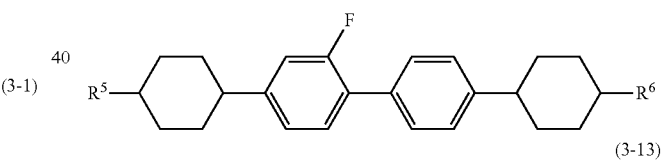
(3-9)

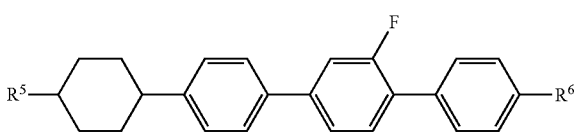
(3-10)

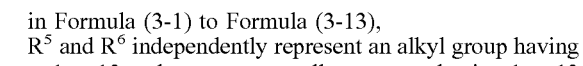
(3-11)

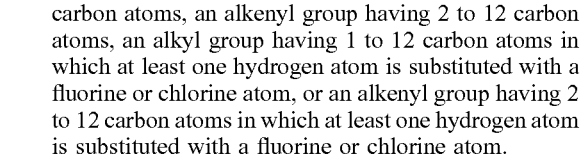
(3-12)

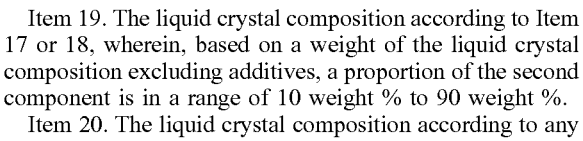
(3-13)

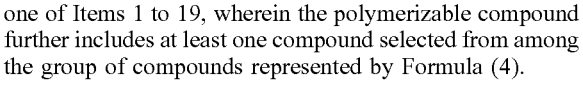

in Formula (3-1) to Formula (3-13), $R^5$ and $R^6$ independently represent an alkyl group having 1 to 12 carbon atoms, an alkoxy group having 1 to 12 carbon atoms, an alkenyl group having 2 to 12 carbon atoms, an alkyl group having 1 to 12 carbon atoms in which at least one hydrogen atom is substituted with a fluorine or chlorine atom, or an alkenyl group having 2 to 12 carbon atoms in which at least one hydrogen atom is substituted with a fluorine or chlorine atom.

Item 19. The liquid crystal composition according to Item 17 or 18, wherein, based on a weight of the liquid crystal composition excluding additives, a proportion of the second component is in a range of 10 weight % to 90 weight %.

Item 20. The liquid crystal composition according to any one of Items 1 to 19, wherein the polymerizable compound further includes at least one compound selected from among the group of compounds represented by Formula (4).

[Chem. 46]

(4)

$$\left(\begin{array}{c}P^1\\Sp^3\end{array}\right)_j \left(\begin{array}{c}P^2\\Sp^4\end{array}\right)_k \left(\begin{array}{c}P^3\\Sp^5\end{array}\right)_p$$

$$\overset{}{\underset{}{J}}-Z^5-\left(\overset{}{\underset{}{K}}-Z^6\right)_q-\overset{}{\underset{}{P}}$$

in Formula (4), ring J and ring P independently represent cyclohexyl, cyclohexenyl, phenyl, 1-naphthyl, 2-naphthyl, tetrahydropyran-2-yl, 1,3-dioxan-2-yl, pyrimidin-2-yl, or pyridin-2-yl, and in these rings, at least one hydrogen atom is optionally substituted with a fluorine atom, a chlorine atom, an alkyl group having 1 to 12 carbon atoms, an alkoxy group having 1 to 12 carbon atoms, or an alkyl group having 1 to 12 carbon atoms in which at least one hydrogen atom is substituted with a fluorine or chlorine atom;

ring K independently represent 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, or pyridine-2,5-diyl, and in these rings, at least one hydrogen atom is optionally substituted with a fluorine atom, a chlorine atom, an alkyl group having 1 to 12 carbon atoms, an alkoxy group having 1 to 12 carbon atoms, or an alkyl group having 1 to 12 carbon atoms in which at least one hydrogen atom is substituted with a fluorine or chlorine atom;

$Z^5$ and $Z^6$ independently represent a single bond or an alkylene group having 1 to 10 carbon atoms, and in these $Z^5$ and $Z^6$, at least one —$CH_2$— is optionally substituted with —O—, —CO—, —COO—, or —OCO—, at least one —$(CH_2)_2$— is optionally substituted with —CH=CH—, —C($CH_3$)=CH—, —CH=C($CH_3$)—, or —C($CH_3$)=C($CH_3$)—, and at least one hydrogen atom is optionally substituted with a fluorine or chlorine atom;

$P^1$, $p^2$, and $P^3$ independently represent a polymerizable group;

$Sp^3$, $Sp^4$, and $Sp^5$ independently represent a single bond or an alkylene group having 1 to 10 carbon atoms, and in $Sp^3$, $Sp^4$, and $Sp^5$, at least one —$CH_2$— is optionally substituted with —O—, —COO—, —OCO—, or —OCOO—, and at least one —$(CH_2)_2$— is optionally substituted with —CH=CH— or —C≡C—, and at least one hydrogen atom is optionally substituted with a fluorine or chlorine atom;

q is 0, 1, or 2;

j, k, and p independently represent 0, 1, 2, 3, or 4, and a sum of j, k, and p is 1 or more.

Item 21. The liquid crystal composition according to Item 20, wherein, in Formula (4), $P^1$, $P^2$, and $P^3$ independently represent a polymerizable group selected from among groups represented by Formula (P-1) to Formula (P-5),

[Chem. 47]

(P-1)

(P-2)

(P-3)

(P-4)

(P-5)

in Formula (P-1) to Formula (P-5), $M^1$, $M^2$, and $M^3$ independently represent a hydrogen atom, a fluorine atom, an alkyl group having 1 to 5 carbon atoms, or an alkyl group having 1 to 5 carbon atoms in which at least one hydrogen atom is substituted with a fluorine or chlorine atom.

Item 22. The liquid crystal composition according to Item 20 or 21, wherein the polymerizable compound includes at least one compound selected from among the group of compounds represented by Formula (4-1) to Formula (4-29).

[Chem. 48]

(4-1)

$P^1$—$Sp^3$—⟨phenyl-phenyl⟩—$Sp^5$—$P^3$ (4-2)

$P^1$—$Sp^3$—⟨phenyl(F)-phenyl⟩—$Sp^5$—$P^3$ (4-3)

$P^1$—$Sp^3$—⟨phenyl(F)-phenyl⟩—$Sp^5$—$P^3$ (4-4)
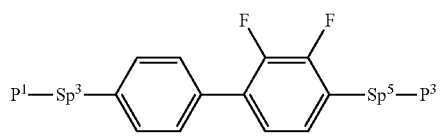
(4-5)
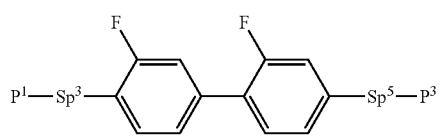
(4-6)
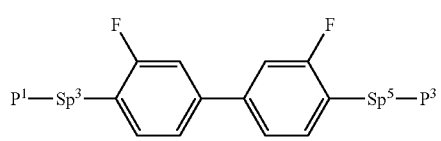
(4-7)
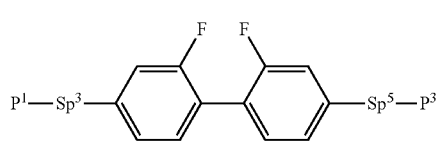
(4-8)
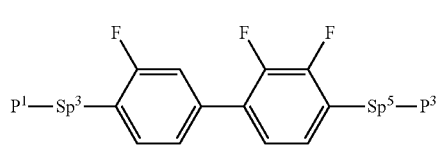
(4-9)
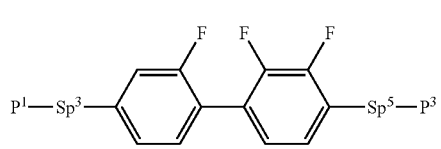
(4-10)
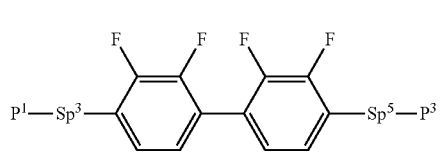
(4-11)
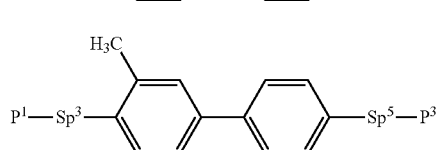
[Chem. 49]
(4-12)
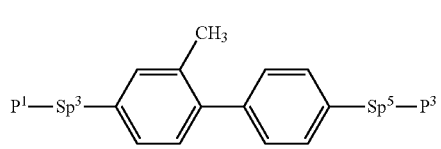
(4-13)
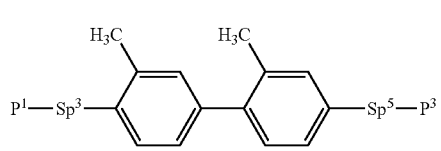
(4-14)
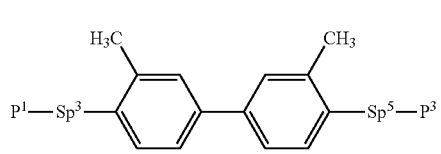
(4-15)
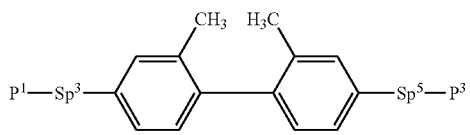
(4-16)
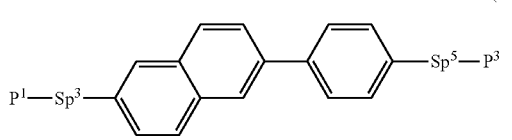
(4-17)
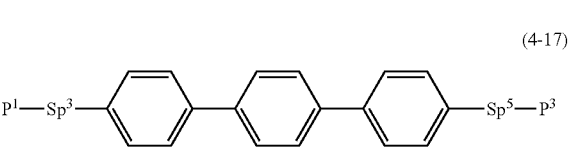
(4-18)
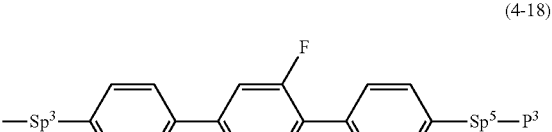
(4-19)
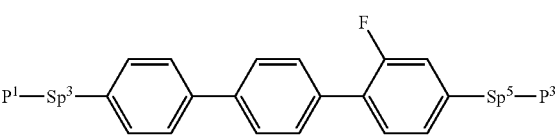
(4-20)
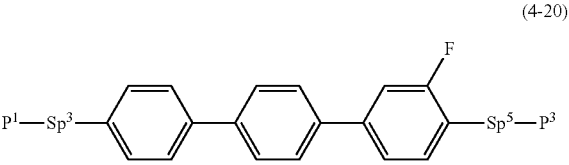
(4-21)
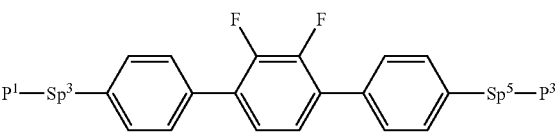
(4-22)
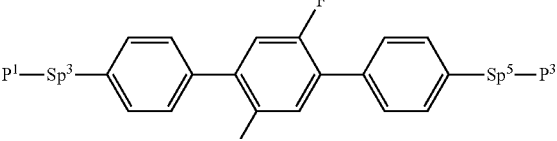
[Chem. 50]
(4-23)
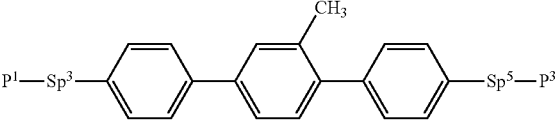

-continued (4-24)
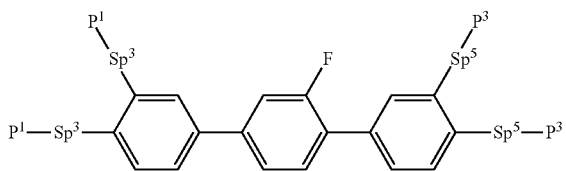

(4-25)
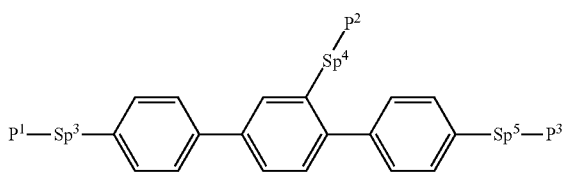

(4-26)
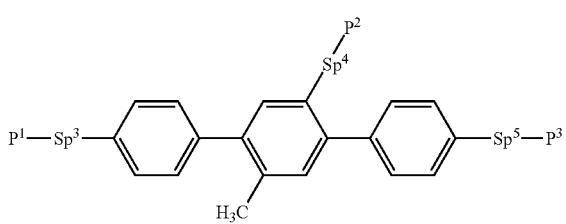

(4-27)
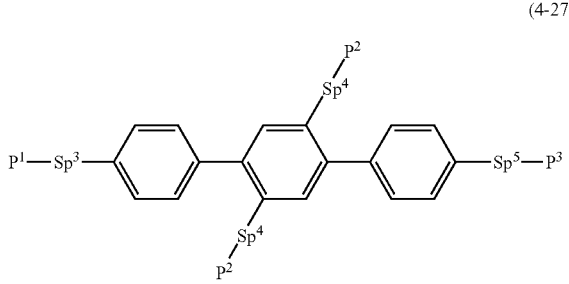

(4-28)
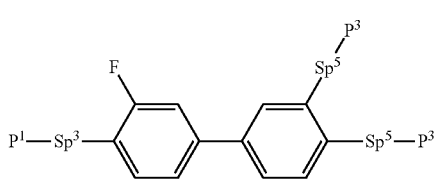

[Chem. 52]

-continued (4-29)
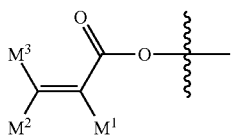

in Formula (4-1) to Formula (4-29),
$P^1$, $P^2$, and $P^3$ independently represent a polymerizable group selected from among groups represented by Formula (P-1) to Formula (P-3) and here, $M^1$, $M^2$, and $M^3$ independently represent a hydrogen atom, a fluorine atom, an alkyl group having 1 to 5 carbon atoms, or an alkyl group having 1 to 5 carbon atoms in which at least one hydrogen atom is substituted with a fluorine or chlorine atom;

[Chem. 51]

(P-1)
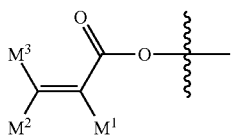

(P-2)
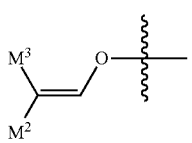

(P-3)
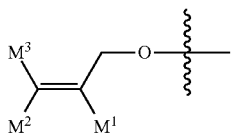

$Sp^3$, $Sp^4$, and $Sp^5$ independently represent a single bond or an alkylene group having 1 to 10 carbon atoms, in $Sp^3$, $Sp^4$, and $Sp^5$, at least one —CH$_2$— is optionally substituted with —O—, —COO—, —OCO—, or —OCOO—, and at least one —(CH$_2$)$_2$— is optionally substituted with —CH=CH— or —C≡C—, and at least one hydrogen atom is optionally substituted with a fluorine or chlorine atom.

Item 23. The liquid crystal composition according to any one of Items 20 to 22, wherein, based on a weight of the liquid crystal composition excluding additives, a proportion of the compound represented by Formula (4) is in a range of 0.03 parts by weight to 10 parts by weight.

Item 24. The liquid crystal composition according to any one of Items 1 to 23, wherein the dichroic dye includes a compound represented by Formula (5), (5)
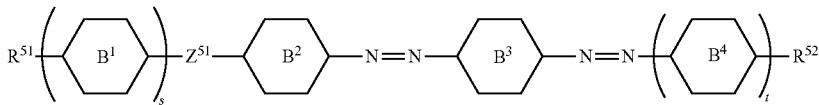

in Formula (5),

R$^{51}$ and R$^{52}$ independently represent an alkyl group having 1 to 15 carbon atoms or a group represented by Formula (5a), and in this alkyl group, at least one —CH$_2$— is optionally substituted with —O—, —COO—, —OCO—, or —OCOO—, and at least one —(CH$_2$)$_2$— is optionally substituted with —CH═CH— or —C≡C—, and here, R$^{53}$ and R$^{54}$ in Formula (5a) independently represent a hydrogen atom, or an alkyl group having 1 to 10 carbon atoms, and R$^{53}$ and R$^{54}$ may be bonded to each other to form a ring;

[Chem. 53]

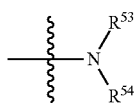
(5a)

Ring B$^1$ independently represent 1,4-cyclohexylene, 1,4-cyclohexenylene, 1,4-phenylene, naphthalene-2,6-diyl, decahydronaphthalene-2,6-diyl, tetrahydropyran-2,5-diyl, 1,3-dioxane-2,5-diyl, or a group represented by Formula (5b), and in these rings, at least one hydrogen atom is optionally substituted with a fluorine or chlorine atom, and here, Z$^{52}$ in Formula (5b) is —N═N—, —COO—, or —OCO—;

[Chem. 54]

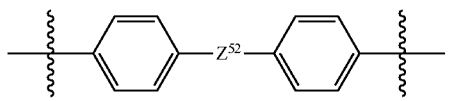
(5b)

Ring B$^2$ and ring B$^3$ independently represent 1,4-phenylene, or naphthalene-2,6-diyl, and in these rings, at least one hydrogen atom is optionally substituted with a fluorine or chlorine atom;

ring B$^4$ independently represent 1,4-cyclohexylene, 1,4-cyclohexenylene, 1,4-phenylene, naphthalene-2,6-diyl, decahydronaphthalene-2,6-diyl, tetrahydropyran-2,5-diyl, 1,3-dioxane-2,5-diyl, a group represented by Formula (5c), or a group represented by Formula (5d), and in these rings, at least one hydrogen atom is optionally substituted with a methyl group, a fluorine or chlorine atom, and here, Z$^{53}$ in Formula (5d) is —NH—CH$_2$—, —N═N—, —COO—, or —OCO—;

[Chem. 55]

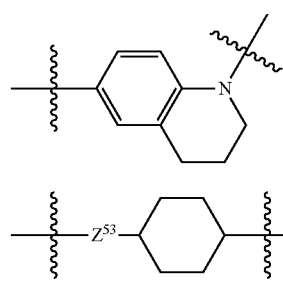
(5c)

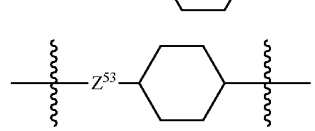
(5d)

Z$^{51}$ is a single bond, —N═N—, —COO—, or —OCO—;

s is 0, 1, 2, 3, or 4;

t is 1, 2, 3, or 4.

Item 25. The liquid crystal composition according to Item 24, wherein the dichroic dye includes at least one compound selected from among the group of compounds represented by Formula (5-1) to Formula (5-8).

[Chem. 56]

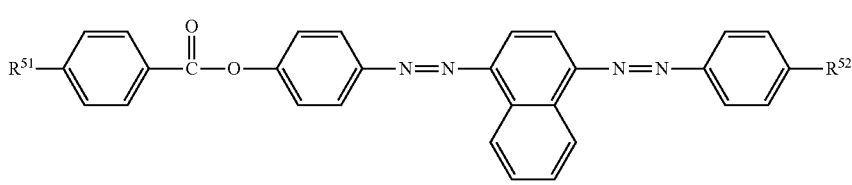
(5-1)

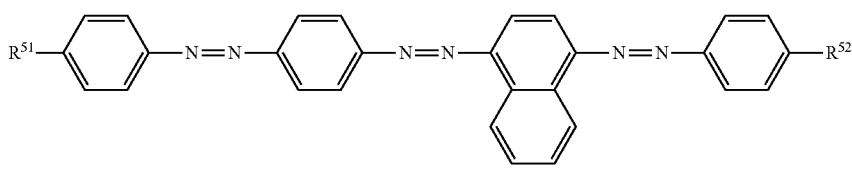
(5-2)

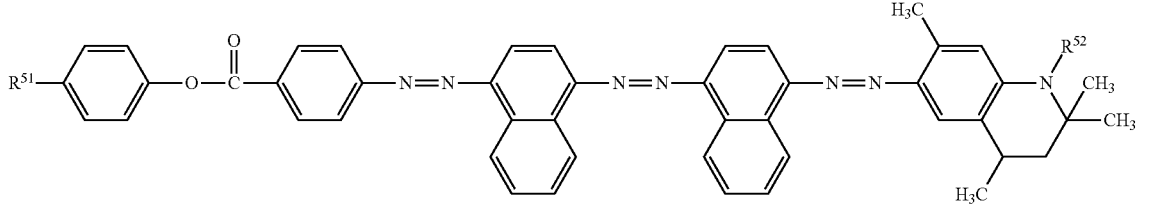
(5-3)

-continued

(5-4)

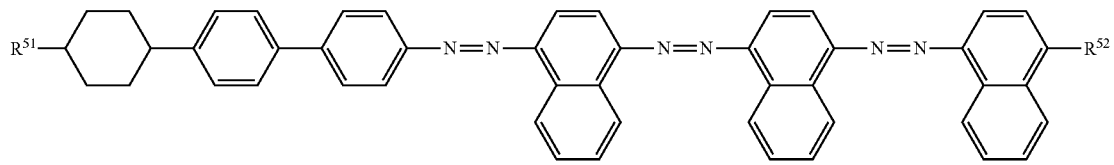
(5-5)

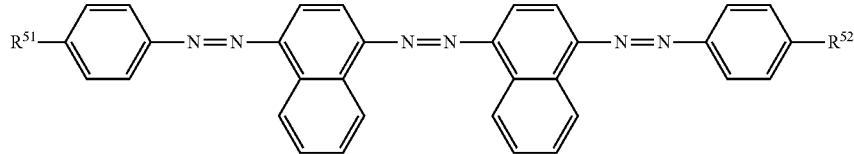
(5-6)

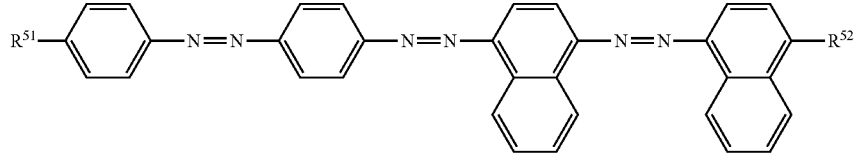
(5-7)

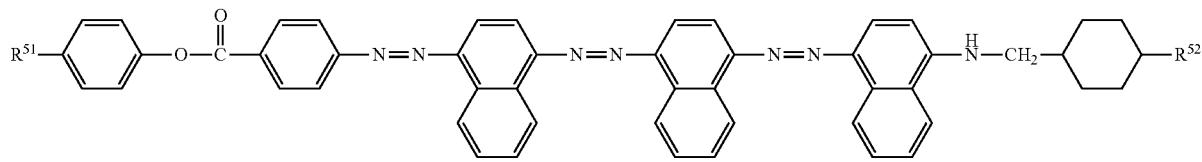
(5-8)

in Formula (5-1) to Formula (5-8), $R^{51}$ and $R^{52}$ independently represent an alkyl group having 1 to 15 carbon atoms or a group represented by Formula (5a), and in this alkyl group, at least one —CH$_2$— is optionally substituted with —O—, —COO—, —OCO—, or —OCOO—, and at least one —(CH$_2$)$_2$— is optionally substituted with —CH=CH— or —C≡C—, and here, $R^{53}$ and $R^{54}$ in Formula (5a) independently represent a hydrogen atom, or an alkyl group having 1 to 10 carbon atoms, and $R^{53}$ and $R^{54}$ may be bonded to each other to form a ring.

[Chem.57]

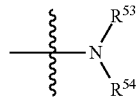
(5a)

Item 26. The liquid crystal composition according to Item 24 or 25, wherein, based on a weight of the liquid crystal composition excluding additives, a proportion of the compound represented by Formula (5) is in a range of 0.01 parts by weight to 10 parts by weight.

Item 27. A liquid crystal element including the liquid crystal composition according to any one of Items 1 to 26.

Item 28. The liquid crystal element according to Item 27, wherein an operation mode of the liquid crystal element is an IPS mode, a VA mode, an FFS mode, or an FPA mode.

Item 29. The liquid crystal element according to Item 27 or 28, wherein the liquid crystal element is in a guest host (GH) mode.

Item 30. A polymer sustained alignment type liquid crystal element including the liquid crystal composition according to any one of Items 1 to 26 and in which a polymerizable compound in the liquid crystal composition is polymerized.

Item 31. A liquid crystal element without an alignment film including the liquid crystal composition according to any one of Items 1 to 26 and in which a polymerizable compound in the liquid crystal composition is polymerized.

Item 32. A use of the liquid crystal composition according to any one of Items 1 to 26 in a liquid crystal element.

Item 33. A use of the liquid crystal composition according to any one of Items 1 to 26 in a polymer sustained alignment type liquid crystal element.

Item 34. A use of the liquid crystal composition according to any one of Items 1 to 26 in a liquid crystal element having no alignment film The disclosure also includes the following items. (a) A method in which the liquid crystal composition is disposed between two substrates, light is emitted while a voltage is applied to the composition, a polymerizable compound having a polar group contained in this composition is polymerized, and thus the above liquid crystal element is produced. (b) The above liquid crystal composition in which an upper limit temperature of a nematic phase is 70° C. or higher, an optical anisotropy (measured at 25° C.) at a wavelength of 589 nm is 0.08 or more, and a dielectric anisotropy (measured at 25° C.) at a frequency of 1 kHz is -2 or less.

The disclosure also includes the following items. (c) The above composition in which Compound (5) to Compound (7) described in Japanese Unexamined Patent Application Publication No. 2006-199941 are liquid crystalline compounds having positive dielectric anisotropy, and which includes at least one compound selected from the group of these compounds. (d) The above composition including at least two of the above Compound (1). (e) The above composition further including a polar compound different from Compound (1). (f) The above composition including one, two, or at least three of additives such as an optically active compound, an antioxidant, a UV absorber, a dye, an antifoaming agent, a polymerizable compound, a polymerization initiator, a polymerization inhibitor, and a polar compound. (g) An element including the above composition. (h) An element including the above composition and has a mode of TN, ECB, OCB, IPS, FFS, VA, or FPA. (i) An element including the above composition and having a GH mode. (j) A transmissive type element including the above composition. (k) A use of the above composition as a composition having a nematic phase. (1) A use of the above composition as an optically active composition by adding an optically active compound thereto.

The composition of the disclosure will be described in the following order. First, the configuration of the composition will be described. Second, main characteristics of component compounds and main effects of the compounds on the composition will be described. Third, a combination of components in the composition, preferable proportions of the components, and the basis thereof will be described. Fourth, preferable forms of the component compounds will be described. Fifth, preferable component compounds will be described. Sixth, additives that may be added to the composition will be described. Seventh, a synthesis method of component compounds will be described. Finally, applications of the composition will be described.

First, the configuration of the composition will be described. The composition of the disclosure is classified into a composition A and a composition B. In addition to a liquid crystalline compound selected from among Compound (2) and Compound (3), a polymerizable compound of Compound (1), and a dichroic dye of Compound (5), the composition A may further include other liquid crystalline compounds, and additives other than the polymerizable compound of Compound (1) and the dichroic dye of Compound (5). "Other liquid crystalline compound" is a liquid crystalline compound different from Compound (2) and Compound (3). Such a compound is mixed into the composition in order to additionally adjust characteristics. Examples of the additives include an optically active compound, an antioxidant, a UV absorber, a dye, an antifoaming agent, a polymerizable compound, a polymerization initiator, a polymerization inhibitor, and a polar compound.

The composition B is substantially composed of only a liquid crystalline compound selected from Compound (2) and Compound (3), the polymerizable compound of Compound (1) and the dichroic dye of the Compound (5). The term "substantially" means that the composition contains additives but does not contain other liquid crystalline compounds. The composition B has fewer components than the composition A. In order to reduce costs, the composition B is preferable to the composition A. The composition A is preferable to the composition B because it is possible to additionally adjust characteristics by mixing other liquid crystalline compounds.

Second, main characteristics of component compounds and main effects of this compound on characteristics of the composition will be described. Main characteristics of component compounds are summarized in Table 2 based on the effects of the disclosure. In the symbols in Table 2, L means large or high, M means medium, and S means small or low. The symbols L, M, and S are classification based on qualitative comparison between component compounds, and the symbol 0 means that the value is zero or close to zero.

TABLE 2

| Characteristics of compounds | | |
|---|---|---|
| Characteristics | Compound (2) | Compound (3) |
| Upper limit temperature | S to L | S to L |
| Viscosity | M to L | S to M |
| Optical anisotropy | M to L | S to L |
| Dielectric anisotropy | M to L[1)] | 0 |
| Specific resistance | L | L |

[1)] a value of dielectric anisotropy is negative, and the symbol indicates a magnitude of an absolute value Main effects of component compounds on characteristics of the composition when the component compounds are mixed into the composition are as follows. Compound (1) is a polymerizable compound having a polar group, and is adsorbed onto a surface of a substrate according to an action of the polar group, and controls alignment of liquid crystal molecules. In order to obtain a desired effect, it is preferable that Compound (1) have high compatibility with a liquid crystalline compound. Compound (1) has a rod-like molecular structure having a six-membered ring such as 1,4-cyclohexylene and 1,4-phenylene and has a branched structure at one terminal of the molecular structure, and thereby compatibility is thought to be improved, and it is optimal for the purpose. Compound (1) provides a polymer according to polymerization. Since this polymer stabilizes alignment of liquid crystal molecules, a response time of the element is shortened and thus image burn is lessened. Compound (2) raises dielectric anisotropy and thus lowers a lower limit temperature. Compound (3) lowers the viscosity. Compound (4) is a polymerizable compound different from Compound (1), and provides a polymer according to polymerization. Since this polymer stabilizes alignment of liquid crystal molecules, a response time of the element is shortened and thus image burn is lessened. In consideration of alignment of liquid crystal molecules, since the polymer of Compound (1) has an interaction with a surface of the substrate, it is assumed to be more effective than the polymer of Compound (4). Compound (5) is a dichroic dye. According to Compound (5), it is possible to change transmittance of the element without using a polarizing filter, and the element in a GH mode is obtained.

Third, a combination of components in the composition, preferable proportions of the components, and the basis thereof will be described. A preferable combination of components in the composition is Compound (1)+Compound (2)+Compound (3)+Compound (5) or Compound (1)+Compound (2)+Compound (3)+Compound (4)+Compound (5).

Compound (1) is added to the composition in order to control alignment of liquid crystal molecules. Based on a weight of the liquid crystal composition excluding additives, a preferable proportion of Compound (1) is about 0.05 parts by weight or more in order to align liquid crystal molecules and is about 10 parts by weight or less in order to prevent display defect of an element. A more preferable proportion of Compound (1) is in a range of about 0.1 parts by weight to about 7 parts by weight. A particularly preferable proportion of Compound (1) is in a range of about 0.5 parts by weight to about 5 parts by weight.

Based on a weight of the liquid crystal composition excluding additives, a preferable proportion of Compound (2) is about 10 weight % or more in order to increase an absolute value of the dielectric anisotropy and is about 90 weight % or less in order to decrease a lower limit temperature. A more preferable proportion of Compound (2) is in a range of about 20 weight % to about 85 weight %. A particularly preferable proportion of Compound (2) is in a range of about 30 weight % to about 85 weight %.

Based on a weight of the liquid crystal composition excluding additives, a preferable proportion of Compound (3) is about 10 weight % or more in order to increase an upper limit temperature or decrease a lower limit temperature, and is about 90 weight % or less in order to increase an absolute value of the dielectric anisotropy. A more preferable proportion of Compound (3) is in a range of about 15 weight % to about 75 weight %. A particularly preferable proportion of Compound (3) is in a range of about 15 weight % to about 60 weight %.

Compound (4) is added to the composition in order to adapt the composition to a polymer sustained alignment type element. Based on a weight of the liquid crystal composition excluding additives, a preferable proportion of Compound (4) is about 0.03 parts by weight or more in order to improve long term reliability of the element and is about 10 parts by weight or less in order to prevent display defect of the element. A more preferable proportion of Compound (4) is in a range of about 0.1 parts by weight to about 2 parts by weight. A particularly preferable proportion of Compound (4) is in a range of about 0.2 parts by weight to about 1.0 part by weight.

Compound (5) is added to the composition in order to obtain, for example, an element in a GH mode. Based on a weight of the liquid crystal composition excluding additives, a preferable proportion of Compound (5) is about 0.01 parts by weight or more in order to increase a change in the transmittance and is about 10 parts by weight or less because compatibility with the liquid crystal composition is necessary. A more preferable proportion of Compound (5) is in a range of about 0.5 parts by weight to about 10 parts by weight. A particularly preferable proportion of Compound (5) is in a range of about 0.8 parts by weight to about 8 parts by weight.

Fourth, preferable forms of the component compounds will be described. Compound (1) includes a mesogenic site composed of at least one ring and a polymerizable group such as an acryloyloxy group substituted with a polar group such as a hydroxyalkyl group. Compound (1) is useful because a polar group non-covalently interacts with a surface of a glass (or a metal oxide) substrate. One application is an additive for a liquid crystal composition used in a liquid crystal element. Compound (1) is added in order to control alignment of liquid crystal molecules. Such an additive is chemically stable under conditions in which it is sealed to the element, and has high solubility in the liquid crystal composition, and preferably has a high voltage holding ratio when it is used for a liquid crystal display element. Compound (1) has such characteristics to a considerable extent.

Preferable examples of Compound (1) will be described. Preferable examples of $R^{11}$, MES, $Sp^{11}$, or $P^{11}$ in Compound (1) also apply to sub-formulas of Compound (1). In Compound (1), according to an appropriate combination of types of such groups, it is possible to arbitrarily adjust characteristics. Compound (1) may contain a larger amount of isotopes such as $^2H$ (deuterium) and $^{13}C$ than a natural abundance of isotopes since there are no significant differences in characteristics of the compound.

[Chem. 58]

$$R^{11}\text{-MES-Sp}^{11}\text{-P}^{11} \quad (1)$$

in Formula (1), $R^{11}$ is an alkyl group having 1 to 15 carbon atoms, and in this alkyl group, at least one —$CH_2$— is optionally substituted with —O— or —S—, and at least one —$(CH_2)_2$— is optionally substituted with —CH=CH— or —C≡C—, and in this group, at least one hydrogen atom is optionally substituted with a halogen atom.

Preferably, $R^{11}$ is an alkyl group having 1 to 15 carbon atoms, an alkenyl group having 2 to 15 carbon atoms, an alkoxy group having 1 to 14 carbon atoms, or an alkenyloxy group having 2 to 14 carbon atoms. More preferably, $R^{11}$ is an alkyl group having 1 to 10 carbon atoms, an alkenyl group having 2 to 10 carbon atoms, or an alkoxy group having 1 to 9 carbon atoms. Particularly preferably, $R^{11}$ is an alkyl group having 1 to 10 carbon atoms.

in Formula (1), MES is a mesogenic group having at least one ring. The mesogenic group is well-known to those skilled in the art. In the ring in MES, at least one hydrogen atom is optionally substituted with -$Sp^{11}$-$P^{11}$. The mesogenic group refers to a part contributing to formation of a liquid crystal phase when the compound has a liquid crystal phase (intermediate phase). Preferable examples of Compound (1) include Compound (1-1), Compound (1-64), Compound (1-85) or Compound (1-86).

[Chem. 59]

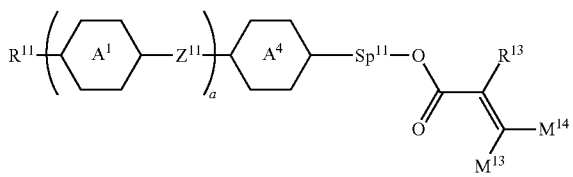

(1-1)

in Formula (1-1), preferably, ring $A^1$ and ring $A^4$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -$Sp^{11}$-$P^{11}$, and in these groups, at least one hydrogen atom is optionally substituted with a fluorine or chlorine atom. More preferably, the ring $A^1$ or the ring $A^4$ is 1,4-cyclohexylene, 1,4-phenylene, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom or an alkyl group having 1 to 5 carbon atoms. Particularly preferably, the ring $A^1$ or the ring $A^4$ is 1,4-cyclohexylene, 1,4-phenylene, or perhydrocyclopenta[a]phenanthrene-3,17-diyl, and in these rings, at least one hydrogen atom is optionally substituted with a fluorine atom, a methyl group, or a ethyl group, for example, such as 1-methyl-1,4-cyclohexylene, 2-ethyl-1,4-cyclohexylene, 2-fluoro-1,4-phenylene.

In Formula (1-1), $Z^{11}$ independently represent a single bond or an alkylene group having 1 to 10 carbon atoms, and in this alkylene group, at least one —$CH_2$— is optionally substituted with —O—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom.

Preferably, $Z^{11}$ is a single bond, —$(CH_2)_2$—, —CH=CH—, —C≡C—, —COO—, —OCO—, —$CF_2$O—, —$OCF_2$—, —$CH_2$O—, —$OCH_2$—, or —CF=CF—. More preferably, $Z^{11}$ is a single bond, —$(CH_2)_2$—, or —CH=CH—. Particularly preferably, $Z^{11}$ is a single bond.

In Formula (1-1), a is 0, 1, 2, 3, or 4. Preferably, a is 0, 1, 2, or 3. More preferably, a is 0, 1, or 2.

In Formula (1), $Sp^{11}$ is a single bond or an alkylene group having 1 to 10 carbon atoms, and in this alkylene group, at least one —$CH_2$— is optionally substituted with —O—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom.

Preferably, $Sp^{11}$ is a single bond, an alkylene group having 1 to 5 carbon atoms, or an alkylene group having 1 to 5 carbon atoms in which one —$CH_2$— is substituted with —O—. More preferably, $Sp^{11}$ is a single bond, an alkylene group having 1 to 3 carbon atoms, or an alkylene group having 1 to 3 carbon atoms in which one —$CH_2$— is substituted with —O—.

In Formula (1-1), $M^{13}$ and $M^{14}$ independently represent a hydrogen atom, a halogen atom, an alkyl group having 1 to 5 carbon atoms, or an alkyl group having 1 to 5 carbon atoms in which at least one hydrogen atom is substituted with a halogen atom. Preferably, $M^{13}$ or $M^{14}$ is a hydrogen atom, a fluorine atom, a methyl group, an ethyl group, or a trifluoromethyl group. More preferably, $M^{13}$ or $M^{14}$ is a hydrogen atom.

In Formula (1-1), $R^{13}$ is a group represented by Formula (1c), Formula (1d), or Formula (1e). Preferably, $R^{13}$ is a group represented by Formula (1c) or Formula (1d). More preferably, $R^{13}$ is a group represented by Formula (1c).

[Chem. 60]

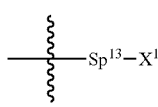

(1c)

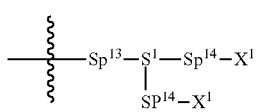

(1d)

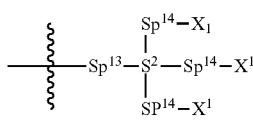

(1e)

in Formula (1c), Formula (1d), and Formula (1e), $Sp^{13}$ and $Sp^{14}$ independently represent a single bond or an alkylene group having 1 to 10 carbon atoms, and in this alkylene group, at least one —$CH_2$— is optionally substituted with —O—, —NH—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom;

Preferably, $Sp^{13}$ or $Sp^{14}$ is an alkylene group having 1 to 7 carbon atoms or an alkylene group having 1 to 5 carbon atoms in which one —$CH_2$— is substituted with —O—. More preferably, $Sp^{13}$ or $Sp^{14}$ is an alkylene group having 1 to 5 carbon atoms or an alkylene group having 1 to 5 carbon atoms in which one —$CH_2$— is substituted with —O—. Particularly preferably, $Sp^2$ or $Sp^3$ is —$CH_2$—.

In Formulae (1c) to (1e), $S^1$ is >CH— or >N—, and $S^2$ is >C< or >Si<. Preferably, $S^1$ is >CH— or >N—, and preferably, $S^2$ is >C<. Formula (1d) is more preferable than Formula (1e).

In Formulae (1c) to (1e), $X^1$ independently represent —OH, —$NH_2$, —$OR^{14}$, —$N(R^{14})_2$, a group represented by Formula (x1), —COOH, —SH, —$B(OH)_2$, or a group represented by —$Si(R^{14})_3$, and here, $R^{14}$ independently represent a hydrogen atom or an alkyl group having 1 to 10 carbon atoms, and in this alkyl group, at least one —$CH_2$— is optionally substituted with —O—, at least one —$(CH_2)_2$— is optionally substituted with —CH=CH—, and in these groups, at least one hydrogen atom is optionally substituted with a halogen atom, and w in Formula (x1) is 1, 2, 3 or 4;

[Chem. 61]

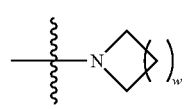

(x1)

Preferably, $X^1$ is —OH, —$NH_2$, —$OR^3$, —$N(R^{14})_2$, or a group represented by Formula (x1) or —$Si(R^4)_3$, and here, $R^{14}$ independently represent a hydrogen atom or alkyl group having 1 to 5 carbon atoms, and in this alkyl group, at least one -$CH_2$— is optionally substituted with —O—, at least one —$(CH_2)_2$— is optionally substituted with —CH=CH—, and in these groups, at least one hydrogen atom is optionally substituted with a fluorine atom, and w in Formula (x1) is 1, 2, 3 or 4. More preferably, $X^1$ is —OH, —$NH_2$, or —$N(R^{14})_2$. Particularly preferably, $X^1$ is —OH.

[Chem. 62]

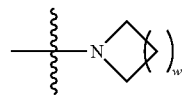

[Chem. 63]

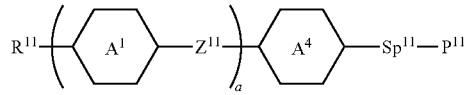

(1-64)

in Formula (1-64), $R^{11}$ is an alkyl group having 1 to 15 carbon atoms, and in this $R^{11}$, at least one —$CH_2$— is optionally substituted with —O— or —S—, at least one —$(CH_2)_2$— is optionally substituted with —CH=CH— or —C≡C—, and at least one hydrogen atom is optionally substituted with a halogen atom.

Ring $A^1$ and ring $A^4$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl, or 2,3,4,7,8,9,10,11,12,13,14,15,16,17-tetradecahydrocycopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -$Sp^{11}$-$P^{11}$, and in these groups, at least one hydrogen atom is optionally substituted with a fluorine or chlorine atom. Preferably, the ring $A^1$ or the ring $A^4$ is 1,4-cyclohexylene, 1,4-phenylene, 2-fluoro-1,4-phenylene, naphthalene-2,6-diyl, or 3-ethyl-1,4-phenylene.

a is 0, 1, 2, 3, or 4. Preferably, a is 0, 1, 2, or 3. More preferably, a is 0, 1, or 2.

$Z^{11}$ independently represent a single bond or an alkylene group having 1 to 6 carbon atoms, and in this $Z^{1'}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a fluorine or chlorine atom. Preferably, $Z^{11}$ is a single bond, —$(CH_2)_2$—, —$CH_2O$—, —$OCH_2$—, —COO—, or —OCO—. More preferably, $Z^{11}$ is a single bond.

$Sp^{11}$ is a single bond or an alkylene group having 1 to 10 carbon atoms, and in this $Sp^{11}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a halogen atom, and in these groups, at least one hydrogen atom is substituted with a group selected from among groups represented by Formula (1a).

[Chem. 64]

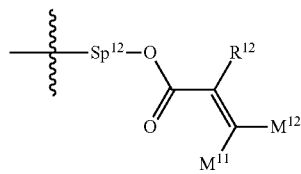

(1a)

in Formula (1a), $Sp^{12}$ is a single bond or an alkylene group having 1 to 10 carbon atoms, and in $Sp^{12}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a halogen atom. Preferably, $Sp^{12}$ is a methylene group or an ethylene group.

$M^{11}$ and $M^{12}$ independently represent a hydrogen atom, a halogen atom, an alkyl group having 1 to 5 carbon atoms, or an alkyl group having 1 to 5 carbon atoms in which at least one hydrogen atom is substituted with a halogen atom. Preferably, $M^{11}$ and $M^{12}$ are a hydrogen atom.

$R^{12}$ is an alkyl group having 1 to 15 carbon atoms, and in this $R^{12}$, at least one —$CH_2$— is optionally substituted with —O— or —S—, and at least one —$(CH_2)_2$— is optionally substituted with —CH=CH— or —C≡C—, and at least one hydrogen atom is optionally substituted with a halogen atom. Preferably, $R^{12}$ is a methyl group.

$P^{11}$ is a group selected from among groups represented by Formula (1f) and Formula (1g).

[Chem. 65]

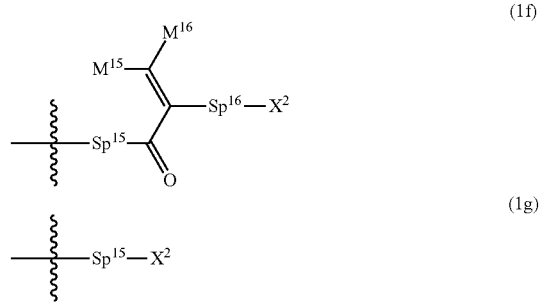

(1f)

(1g)

in Formulae (1f) and (1g), $Sp^{15}$ is a single bond or an alkylene group having 1 to 10 carbon atoms, and in this $Sp^{15}$, at least one —$CH_2$— is optionally substituted with —O—, —NH—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom.

Preferably, $Sp^{15}$ is a single bond or a methylene group.

$Sp^{16}$ independently represent a single bond or an alkylene group having 1 to 10 carbon atoms, and in this $Sp^{16}$, at least one —$CH_2$— is optionally substituted with —O—, —NH—, —CO—, —COO—, —OCO—, or —OCOO—, at least one —$(CH_2)_2$— is optionally substituted with —CH=CH— or —C≡C—, and at least one hydrogen atom is optionally substituted with a halogen atom.

Preferably, $Sp^{16}$ is a single bond or a methylene group.

$M^{15}$ and $M^{16}$ independently represent a hydrogen atom, a halogen atom, an alkyl group having 1 to 5 carbon atoms, or an alkyl group having 1 to 5 carbon atoms in which at least one hydrogen atom is substituted with a halogen atom. Preferably, $M^{15}$ and $M^{16}$ are a hydrogen atom.

$X^2$ is —OH, —$NH_2$, —$OR^{15}$, —$N(R^{15})_2$, —COOH, —SH, —$B(OH)_2$, or —$Si(R^{15})_3$. Preferably, $X^2$ is —OH.

In —$OR^{15}$, —$N(R^{15})_2$, and —$Si(R^{15})_3$, $R^{15}$ independently represent a hydrogen atom or an alkyl group having 1 to 10 carbon atoms, and in this $R^{15}$, at least one —$CH_2$— is optionally substituted with —O—, at least one —$(CH_2)_2$— is optionally substituted with —CH=CH—, and at least one hydrogen atom is optionally substituted with a halogen atom.

In Formula (1-64), a is 0, 1, 2, 3, or 4. Preferably, a is 0, 1, or 2.

Preferable examples of the Compound (1-64) include a Compound (1-65) to a Compound (1-84). In Formula (1-65) to Formula (1-84), $R^{11}$ is an alkyl group having 1 to 10 carbon atoms.

$Z^{11}$, $Z^{12}$, and $Z^{13}$ independently represent a single bond, —$(CH_2)_2$—, or —$(CH_2)_4$—.

$Sp^{12}$, $Sp^{15}$, and $Sp^{16}$ independently represent a single bond or an alkylene group having 1 to 5 carbon atoms, and in this alkylene group, at least one —$CH_2$— is optionally substituted with —O—.

$L^1$, $L^2$, $L^3$, $L^4$, $L^5$, $L^6$, $L^7$, $L^8$, $L^9$, $L^{10}$, $L^{11}$, and $L^{12}$ independently represent a hydrogen atom, a fluorine atom, a methyl group, or an ethyl group.

l is 0, 1, 2, 3, 4, 5, or 6. Preferably, l is 0 or 1.

[Chem. 66]

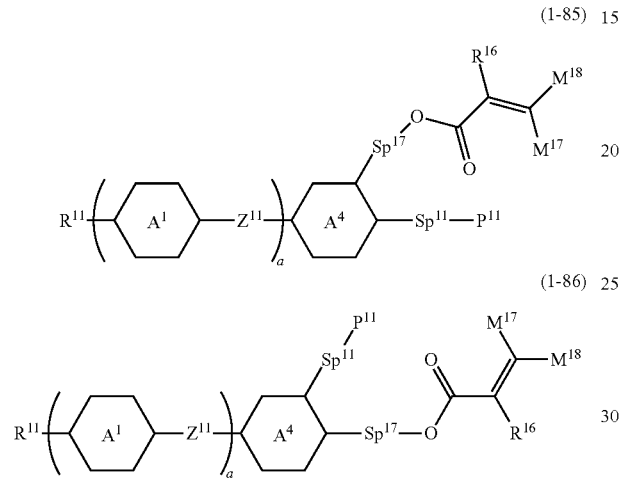

(1-85)

(1-86)

in Formula (1-85) and Formula (1-86), $R^{11}$ is an alkyl group having 1 to 15 carbon atoms, and in this $R^{11}$, at least one —$CH_2$— is optionally substituted with —O— or —S—, at least one —$(CH_2)_2$— is optionally substituted with —CH=CH— or —C≡C—, and at least one hydrogen atom is optionally substituted with a halogen atom.

Ring $A^1$ independently represents 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -$Sp^{11}$-$P^{11}$, and in these groups, at least one hydrogen atom is optionally substituted with a fluorine or chlorine atom. Preferably, the ring $A^1$ is 1,4-cyclohexylene, 1,4-phenylene, 2-fluoro-1,4-phenylene, naphthalene-2,6-diyl, or 3-ethyl-1,4-phenylene.

a is 0, 1, 2, 3, or 4. Preferably, a is 0, 1, 2, or 3. More preferably, a is 0, 1, or 2.

Ring $A^4$ is a benzene ring or a cyclohexane ring. Preferably, the ring $A^4$ is a benzene ring.

$Z^{11}$ independently represent a single bond or an alkylene group having 1 to 6 carbon atoms, and in this $Z^{11}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a fluorine or chlorine atom. Preferably, $Z^{11}$ is a single bond, —$(CH_2)_2$—, —$CH_2O$—, —$OCH_2$—, —COO—, or —OCO—. More preferably, $Z^{11}$ is a single bond.

$Sp^{11}$ is a single bond or an alkylene group having 1 to 10 carbon atoms, and in this $Sp^{11}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a halogen atom.

$P^{11}$ is a group selected from among groups represented by Formula (1f) and Formula (1g).

[Chem. 67]

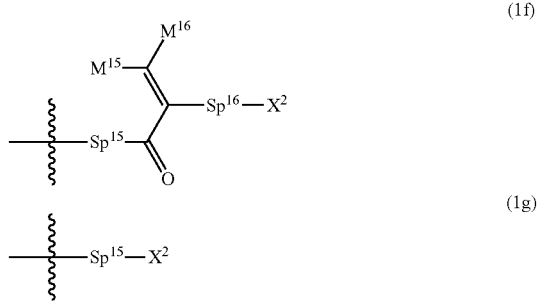

(1f)

(1g)

in Formulae (1f) and (1g), $Sp^{15}$ is a single bond or an alkylene group having 1 to 10 carbon atoms, and in this $Sp^{15}$, at least one —$CH_2$— is optionally substituted with —O—, —NH—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom. Preferably, $Sp^{15}$ is a single bond or a methylene group.

$Sp^{16}$ is a single bond or an alkylene group having 1 to 10 carbon atoms, and in this $Sp^{16}$, at least one —$CH_2$— is optionally substituted with —O—, —NH—, —CO—, —COO—, —OCO—, or —OCOO—, at least one —$(CH_2)_2$— is optionally substituted with —CH=CH— or —C≡C—, and at least one hydrogen atom is optionally substituted with a halogen atom. Preferably, $Sp^{16}$ is a single bond or a methylene group.

$M^{15}$ and $M^{16}$ independently represent a hydrogen atom, a halogen atom, an alkyl group having 1 to 5 carbon atoms, or an alkyl group having 1 to 5 carbon atoms in which at least one hydrogen atom is substituted with a halogen atom. Preferably, $M^{15}$ and $M^{16}$ are a hydrogen atom.

$X^2$ is —OH, —$NH_2$, —$OR^{15}$, —$N(R^{15})_2$, —COOH, —SH, —$B(OH)_2$, or —$Si(R^{15})_3$, and here, $R^{15}$ independently represents a hydrogen atom or an alkyl group having 1 to 10 carbon atoms, and in this $R^{15}$, at least one -$CH_2$— is optionally substituted with —O—, at least one —$(CH_2)_2$— is optionally substituted with —CH=CH—, and at least one hydrogen atom is optionally substituted with a halogen atom.

In Formula (1-85) and Formula (1-86), $Sp^{17}$ is a single bond or an alkylene group having 1 to 10 carbon atoms, and in this $Sp^{17}$, at least one —$CH_2$— is optionally substituted with —O—, —CO—, —COO—, —OCO—, or —OCOO—, at least one —(CH$_2$)$_2$— is optionally substituted with —CH=CH— or —C≡C—, and at least one hydrogen atom is optionally substituted with a halogen atom. Preferably, Sp$^{17}$ is a single bond or a methylene group.

M$^{17}$ and M$^{18}$ independently represent a hydrogen atom, a halogen atom, an alkyl group having 1 to 5 carbon atoms, or an alkyl group having 1 to 5 carbon atoms in which at least one hydrogen atom is substituted with a halogen atom. Preferably, M$^{17}$ and M$^{18}$ are a hydrogen atom.

R$^{16}$ is an alkyl group having 1 to 15 carbon atoms, and in this R$^{16}$, at least one —CH$_2$— is optionally substituted with —O— or —S—, at least one —(CH$_2$)$_2$— is optionally substituted with —CH=CH— or —C≡C—, and at least one hydrogen atom is optionally substituted with a halogen atom. Preferably, R$^{16}$ is a methyl group.

As the liquid crystalline compound, preferably, Compound (2) is used as a first component and Compound (3) is used as a second component. In Formula (2) and Formula (3), R$^3$ and R$^4$ independently represent an alkyl group having 1 to 12 carbon atoms, an alkoxy group having 1 to 12 carbon atoms, an alkenyl group having 2 to 12 carbon atoms, or an alkenyloxy group having 2 to 12 carbon atoms. A preferable R$^3$ or R$^4$ is an alkyl group having 1 to 12 carbon atoms in order to increase stability and is an alkoxy group having 1 to 12 carbon atoms in order to increase dielectric anisotropy. R$^5$ and R$^6$ independently represent an alkyl group having 1 to 12 carbon atoms, an alkoxy group having 1 to 12 carbon atoms, an alkenyl group having 2 to 12 carbon atoms, an alkyl group having 1 to 12 carbon atoms in which at least one hydrogen atom is substituted with a fluorine or chlorine atom, or an alkenyl group having 2 to 12 carbon atoms in which at least one hydrogen atom is substituted with a fluorine or chlorine atom. A preferable R$^5$ or R$^6$ is an alkenyl group having 2 to 12 carbon atoms in order to decrease the viscosity and is an alkyl group having 1 to 12 carbon atoms in order to increase stability. An alkyl group of the liquid crystalline compound is linear or branched, and does not contain a cyclic alkyl group. A linear alkyl group is preferable to a branched alkyl group. These similarly apply to terminal groups such as an alkoxy group and an alkenyl group.

A preferable alkyl group is a methyl, ethyl, propyl, butyl, pentyl, hexyl, heptyl, or octyl group. A more preferable alkyl group is an ethyl, propyl, butyl, pentyl, or heptyl group in order to decrease the viscosity.

A preferable alkoxy group is a methoxy, ethoxy, propoxy, butoxy, pentyloxy, hexyloxy, or heptyloxy group. A more preferable alkoxy group is a methoxy or ethoxy group in order to decrease the viscosity.

A preferable alkenyl group is a vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl group. A more preferable alkenyl group is a vinyl, 1-propenyl, 3-butenyl, or 3-pentenyl group in order to decrease the viscosity. A preferable configuration of —CH=CH— in such an alkenyl group depends on the position of a double bond. In order to decrease the viscosity, a trans type is preferable for an alkenyl group such as 1-propenyl, 1-butenyl, 1-pentenyl, 1-hexenyl, 3-pentenyl, and 3-hexenyl. A cis type is preferable for an alkenyl group such as 2-butenyl, 2-pentenyl, and 2-hexenyl.

A preferable alkenyloxy group is a vinyloxy, allyloxy, 3-butenyloxy, 3-pentenyloxy, or 4-pentenyloxy group. In order to decrease the viscosity, a more preferable alkenyloxy group is an allyloxy or 3-butenyloxy group.

Preferable examples of an alkyl group in which at least one hydrogen atom is substituted with a fluorine or chlorine atom include fluoromethyl, 2-fluoroethyl, 3-fluoropropyl, 4-fluorobutyl, 5-fluoropentyl, 6-fluorohexyl, 7-fluoroheptyl, or 8-fluorooctyl. More preferable examples include 2-fluoroethyl, 3-fluoropropyl, 4-fluorobutyl, or 5-fluoropentyl in order to increase dielectric anisotropy.

Preferable examples of an alkenyl group in which at least one hydrogen atom is substituted with a fluorine or chlorine atom include 2,2-difluorovinyl, 3,3-difluoro-2-propenyl, 4,4-difluoro-3-butenyl, 5,5-difluoro-4-pentenyl, or 6,6-difluoro-5-hexenyl. More preferable examples include 2,2-difluorovinyl or 4,4-difluoro-3-butenyl in order to decrease the viscosity.

Ring C and ring E independently represent 1,4-cyclohexylene, 1,4-cyclohexenylene, 1,4-phenylene, 1,4-phenylene in which at least one hydrogen atom is substituted with a fluorine or chlorine atom, or tetrahydropyran-2,5-diyl. Preferable examples of "1,4-phenylene in which at least one hydrogen atom is substituted with a fluorine or chlorine atom" include 2-fluoro-1,4-phenylene, 2,3-difluoro-1,4-phenylene, or 2-chloro-3-fluoro-1,4-phenylene. A preferable ring C or ring E is 1,4-cyclohexylene in order to decrease the viscosity, is tetrahydropyran-2,5-diyl in order to increase dielectric anisotropy, and is 1,4-phenylene in order to increase optical anisotropy. Regarding the configuration of 1,4-cyclohexylene, the trans type is preferable to the cis type in order to increase an upper limit temperature. In a chemical formula of tetrahydropyran-2,5-diyl, oxygen may be leftward (L) or rightward (R), but preferably, oxygen is leftward (L).

[Chem. 68]

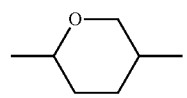

(L)

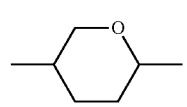

(R)

Ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl, or 7,8-difluorochroman-2,6-diyl. Preferably, the ring D is 2,3-difluoro-1,4-phenylene in order to decrease the viscosity, is 2-chloro-3-fluoro-1,4-phenylene in order to decrease optical anisotropy, and is 7,8-difluorochroman-2,6-diyl in order to increase dielectric anisotropy.

Ring F and ring G independently represent 1,4-cyclohexylene, 1,4-phenylene, 2-fluoro-1,4-phenylene, or 2,5-difluoro-1,4-phenylene. A preferable ring F or ring G is 1,4-cyclohexylene in order to decrease the viscosity or in order to increase an upper limit temperature and is 1,4-phenylene in order to decrease a lower limit temperature. Regarding the configuration of 1,4-cyclohexylene, the trans type is preferable to the cis type in order to increase an upper limit temperature.

Z$^2$ and Z$^3$ independently represent a single bond, —(CH$_2$)$_2$—, —CH$_2$O—, —OCH$_2$—, —COO—, or —OCO—. A preferable Z$^2$ or Z$^3$ is a single bond in order to decrease the viscosity, is —CH$_2$CH$_2$— in order to decrease a lower limit temperature, and is —CH$_2$O— or —OCH$_2$— in order to increase dielectric anisotropy. Z$^4$ independently represent a single bond, —(CH$_2$)$_2$—, —CH$_2$O—, —OCH$_2$—, —COO—, or —OCO—. A preferable Z$^4$ is a single bond in order to decrease the viscosity, is —(CH$_2$)$_2$— in order to decrease a lower limit temperature, and is —COO— or —OCO— in order to increase an upper limit temperature.

b is 1, 2, or 3, c is 0 or 1, and a sum of b and c is 3 or less. A preferable b is 1 in order to decrease the viscosity and is 2 or 3 in order to increase an upper limit temperature. A preferable c is 0 in order to decrease the viscosity and is 1 in order to decrease a lower limit temperature. d is 1, 2, or 3. A preferable d is 1 in order to decrease the viscosity and 2 or 3 in order to increase an upper limit temperature.

As the polymerizable compound, Compound (4) may be further used.

[Chem. 69]

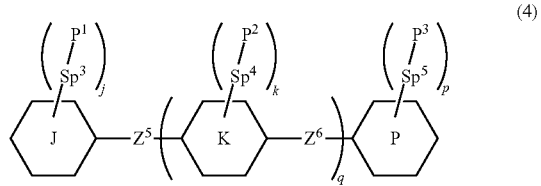

(4)

in Formula (4), P$^1$, P$^2$, and P$^3$ independently represent a polymerizable group. A preferable P$^1$, p$^2$, or P$^3$ is a polymerizable group selected from among groups represented by Formula (P-1) to Formula (P-5). A more preferable P$^1$, P$^2$, or P$^3$ is a group represented by Formula (P-1), Formula (P-2), or Formula (P-3). A particularly preferable P$^1$, p$^2$, or P$^3$ is a group represented by Formula (P-1) or Formula (P-2). A most preferable P$^1$, P$^2$, or p$^3$ is a group represented by Formula (P-1). A preferable group represented by Formula (P-1) is —OCO—CH=CH$_2$ or —OCO—C(CH$_3$)=CH$_2$. Wave lines in Formula (P-1) to Formula (P-5) indicate binding sites.

[Chem. 70]

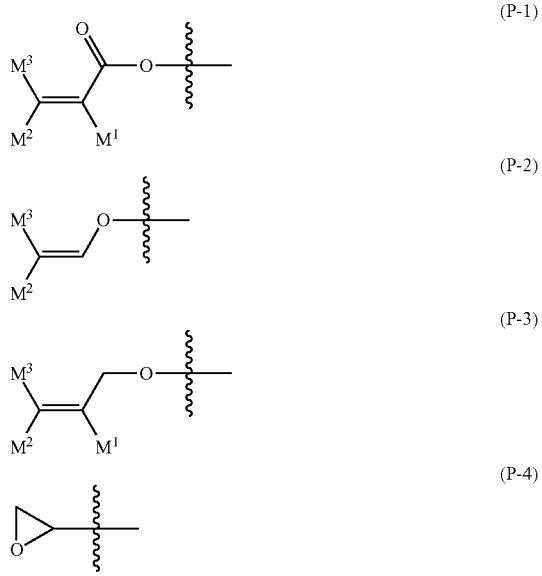

(P-1)

(P-2)

(P-3)

(P-4)

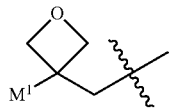

(P-5)

in Formula (P-1) to Formula (P-5), M$^1$, M$^2$, and M$^3$ independently represent a hydrogen atom, a fluorine atom, an alkyl group having 1 to 5 carbon atoms, or an alkyl group having 1 to 5 carbon atoms in which at least one hydrogen atom is substituted with a fluorine or chlorine atom. A preferable M$^1$, M$^2$, or M$^3$ is a hydrogen atom or a methyl group in order to increase reactivity. A more preferable M$^1$ is a hydrogen atom or a methyl group, and a more preferable M$^2$ or M$^3$ is a hydrogen atom.

Sp$^3$, Sp$^4$, and Sp$^5$ independently represent a single bond or an alkylene group having 1 to 10 carbon atoms, and in this alkylene group, at least one —CH$_2$— is optionally substituted with —O—, —COO—, —OCO—, or —OCOO—, and at least one —(CH$_2$)$_2$— is optionally substituted with —CH=CH— or —C≡C—, and in these groups, at least one hydrogen atom is optionally substituted with a fluorine or chlorine atom. Preferably, Sp$^3$, Sp$^4$, or Sp$^5$ is a single bond, —(CH$_2$)$_2$—, —CH$_2$O—, —OCH$_2$—, —COO—, —OCO—, —CO—CH=CH—, or —CH=CH—CO—. More preferably, Sp$^3$, Sp$^4$, or Sp$^5$ is a single bond.

Ring J and ring P independently represent cyclohexyl, cyclohexenyl, phenyl, 1-naphthyl, 2-naphthyl, tetrahydropyran-2-yl, 1,3-dioxan-2-yl, pyrimidin-2-yl, or pyridin-2-yl, and in these rings, at least one hydrogen atom is optionally substituted with a fluorine atom, a chlorine atom, an alkyl group having 1 to 12 carbon atoms, an alkoxy group having 1 to 12 carbon atoms, or an alkyl group having 1 to 12 carbon atoms in which at least one hydrogen atom is substituted with a fluorine or chlorine atom. Preferably, the ring J or the ring P is a phenyl group.

Ring K independently represents 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, or pyridine-2,5-diyl, and in these rings, at least one hydrogen atom is optionally substituted with a fluorine atom, a chlorine atom, an alkyl group having 1 to 12 carbon atoms, an alkoxy group having 1 to 12 carbon atoms, or an alkyl group having 1 to 12 carbon atoms in which at least one hydrogen atom is substituted with a fluorine or chlorine atom. Preferably, the ring K is 1,4-phenylene or 2-fluoro-1,4-phenylene.

Z$^5$ and Z$^6$ independently represent a single bond or an alkylene group having 1 to 10 carbon atoms, and in this alkylene group, at least one —CH$_2$— is optionally substituted with —O—, —CO—, —COO—, or —OCO—, at least one —(CH$_2$)$_2$— is optionally substituted with —CH=CH—, —C(CH$_3$)=CH—, —CH=C(CH$_3$)—, or —C(CH$_3$)=C(CH$_3$)—, and in these groups, at least one hydrogen atom is optionally substituted with a fluorine or chlorine atom. Preferably, Z$^5$ or Z$^6$ is a single bond, —(CH$_2$)$_2$—, —CH$_2$O—, —OCH$_2$—, —COO—, or —OCO—. More preferably, Z$^5$ or Z$^{is}$ a single bond.

q is 0, 1, or 2. Preferably, q is 0 or 1. j, k, and p independently represent 0, 1, 2, 3, or 4, and a sum of j, k, and p is 1 or more. Preferably, j, k, or p 1 or 2.

As the dichroic dye, Compound (5) is preferably used. Compound (5) is preferable because it has a high dichroic ratio, has favorable compatibility with the liquid crystal composition and has high durability.

[Chem. 71]

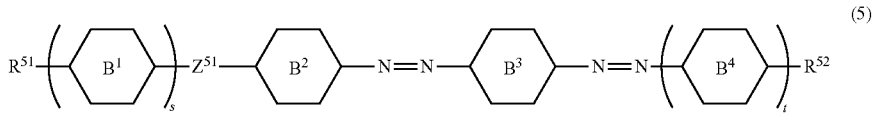
(5)

in Formula (5), $R^{51}$ and $R^{52}$ independently represent an alkyl group having 1 to 15 carbon atoms or a group represented by Formula (5a), and in this alkyl group, at least one —CH$_2$— is optionally substituted with —O—, —COO—, —OCO—, or —OCOO—, and at least one —(CH$_2$)$_2$— is optionally substituted with —CH=CH— or —C≡C—, at least one —(CH$_2$)$_2$— is optionally substituted with —CH=CH— or —C≡C—, and here, $R^{53}$ and $R^{54}$ in Formula (5a) independently represent a hydrogen atom, or an alkyl group having 1 to 10 carbon atoms, and $R^{53}$ and $R^{54}$ may be bonded to each other to form a ring. Preferably, $R^{51}$ and $R^{52}$ are an alkyl group having 1 to 10 carbon atoms or a group represented by Formula (5a). More preferably, $R^{5'}$ and $R^{52}$ are an alkyl group having 1 to 10 carbon atoms.

[Chem. 72]

(5a)

Ring B$^1$ independently represent 1,4-cyclohexylene, 1,4-cyclohexenylene, 1,4-phenylene, naphthalene-2,6-diyl, decahydronaphthalene-2,6-diyl, tetrahydropyran-2,5-diyl, 1,3-dioxane-2,5-diyl, or a group represented by Formula (5b), and in these rings, at least one hydrogen atom is optionally substituted with a fluorine or chlorine atom, and here, $Z^{52}$ in Formula (5b) is —N=N—, —COO—, or —OCO—. Preferably, the ring B$^1$ is 1,4-phenylene.

[Chem. 73]

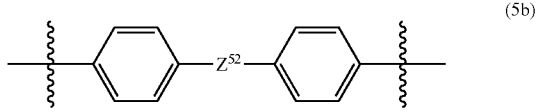
(5b)

Ring B$^2$ and ring B$^3$ independently represent 1,4-phenylene, or naphthalene-2,6-diyl, and in these rings, at least one hydrogen atom is optionally substituted with a fluorine or chlorine atom. Preferably, the ring B$^2$ and the ring B$^3$ are 1,4-phenylene or naphthalene-2,6-diyl.

Ring B$^4$ independently represents 1,4-cyclohexylene, 1,4-cyclohexenylene, 1,4-phenylene, naphthalene-2,6-diyl, decahydronaphthalene-2,6-diyl, tetrahydropyran-2,5-diyl, 1,3-dioxane-2,5-diyl, a group represented by Formula (5c), or a group represented by Formula (5d), and in these rings, at least one hydrogen atom is optionally substituted with a methyl group, a fluorine or chlorine atom, and here, $Z^{53}$ in Formula (5d) is —NH—CH$_2$—, —N=N—, —COO—, or —OCO—. Preferably, the ring B$^4$ is 1,4-phenylene, naphthalene-2,6-diyl, a group represented by Formula (5c), or a group represented by Formula (5d).

[Chem. 74]

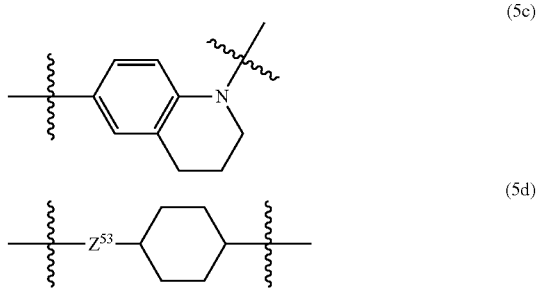

$Z^{51}$ is a single bond, —N=N—, —COO—, or —OCO—.
A preferable $Z^{51}$ is —N=N—, —COO—, or —OCO—.
s is 0, 1, 2, 3, or 4. A preferable s is 0, or 1.
t is 1, 2, 3, or 4. A preferable t is 1.

Fifth, preferable component compounds will be described. A preferable Compound (1) includes Compound (1-32) to Compound (1-43) according to Item 8, Compound (1-44) to Compound (1-63) according to Item 9, Compound (1-65) to Compound (1-84) according to Item 11, and Compound (1-85) and Compound (1-86) according to Item 12. In these compounds, at least one of Compound (1) is preferably Compound (1-32), Compound (1-65), Compound (1-66), Compound (1-67), Compound (1-74), Compound (1-82), Compound (1-84) or Compound (1-85). At least two of Compound (1) are preferably a combination of Compound (1-65) and Compound (1-66) or a combination of Compound (1-66) and Compound (1-67).

A preferable Compound (2) is Compound (2-1) to Compound (2-22) according to Item 15. In these compounds, at least one of the first components is preferably Compound (2-1), Compound (2-2), Compound (2-3), Compound (2-4), Compound (2-6), Compound (2-8), Compound (2-9), Compound (2-10), Compound (2-16), or Compound (2-17). At least two of the first components is preferably a combination of Compound (2-1) and Compound (2-6), a combination of Compound (2-1) and Compound (2-10), a combination of Compound (2-3) and Compound (2-6), a combination of Compound (2-3) and Compound (2-10), a combination of Compound (2-4) and Compound (2-6), or a combination of Compound (2-4) and Compound (2-8).

A preferable Compound (3) is Compound (3-1) to Compound (3-13) according to Item 18. In these compounds, at least one of the second components is preferably Compound (3-1), Compound (3-2), Compound (3-3), Compound (3-5), Compound (3-6), Compound (3-7), Compound (3-8), or Compound (3-9). At least two of the second components is preferably a combination of Compound (3-1) and Compound (3-3), a combination of Compound (3-1) and Compound (3-5), or a combination of Compound (3-1) and Compound (3-6).

A preferable Compound (4) is Compound (4-1) to Compound (4-29) according to Item 22. In these compounds, at least one of Compound (4) is preferably Compound (4-1), Compound (4-2), Compound (4-24), Compound (4-25), Compound (4-26), Compound (4-27) or Compound (4-29). At least two of Compound (4) are preferably a combination of Compound (4-1) and Compound (4-2), a combination of Compound (4-1) and Compound (4-18), a combination of Compound (4-2) and Compound (4-24), a combination of Compound (4-2) and Compound (4-25), a combination of Compound (4-2) and Compound (4-26), a combination of Compound (4-25) and Compound (4-26), or a combination of Compound (4-18) and Compound (4-24).

A preferable Compound (5) is Compound (5-1) to Compound (5-8) according to Item 25. In these compounds, at least one of Compound (5) is preferably Compound (5-1), Compound (5-2), Compound (5-3), or Compound (5-4). At least two of Compound (5) is preferably a combination of Compound (5-1) and Compound (5-2), a combination of Compound (5-1) and Compound (5-3), or a combination of Compound (5-2) and Compound (5-3).

Sixth, additives other than Compound (1), Compound (4) and Compound (5) which may be added to the composition will be described. Such additives include an optically active compound, an antioxidant, a UV absorber, a dye, an anti-foaming agent, a polymerizable compound, a polymerization initiator, a polymerization inhibitor, and a polar compound. An optically active compound is added to the composition in order to form a twist angle by causing a helical structure of liquid crystal molecules. Examples of such a compound include Compound (6-1) to Compound (6-5). Based on a weight of the liquid crystal composition excluding additives, a preferable proportion of the optically active compound is about 5 parts by weight or less. A more preferable proportion is in a range of about 0.01 parts by weight to about 2 parts by weight.

[Chem. 75]

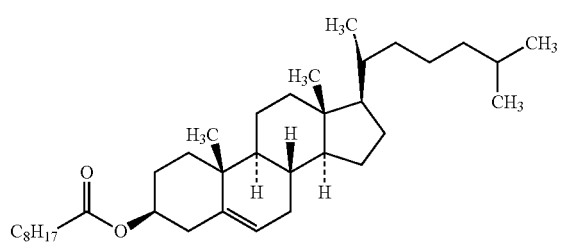

(6-1)

(6-2)

(6-3)

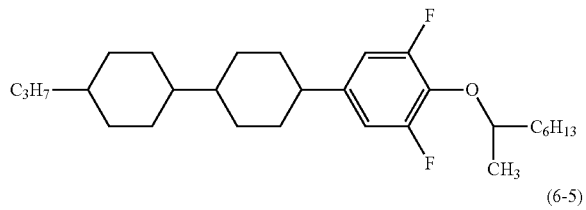

(6-4)

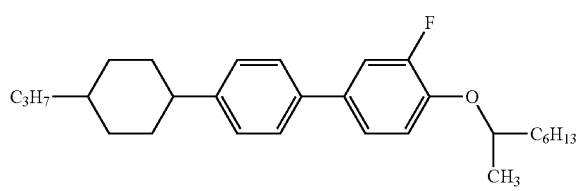

(6-5)

In order to prevent a reduction in the specific resistance due to heating in an atmosphere or to maintain a high voltage holding ratio not only at room temperature but also at a temperature close to an upper limit temperature after the element is used for a long term, the antioxidant is added to the composition. Preferable examples of the antioxidant include Compound (7) in which n is an integer of 1 to 9.

[Chem. 76]

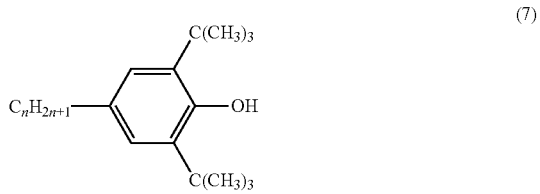

(7)

In Compound (7), a preferable n is 1, 3, 5, 7, or 9. A more preferable n is 7. Since Compound (7) in which n is 7 has low volatility, after the element is used for a long term, it is effective for maintaining high voltage holding ratio not only at room temperature but also at a temperature close to an upper limit temperature. A preferable proportion of the antioxidant is about 50 ppm or more in order to obtain such an effect and is about 600 ppm or less in order to prevent an upper limit temperature from decreasing or a lower limit temperature from increasing. A more preferable proportion is in a range of about 100 ppm to about 300 ppm.

Preferable examples of the UV absorber include benzophenone derivatives, benzoate derivatives, triazole derivatives, and the like. A light stabilizer such as a sterically hindered amine is also preferable. A preferable proportion of such an absorbent and stabilizer is about 50 ppm or more in order to obtain such an effect and is about 10000 ppm or less in order to prevent an upper limit temperature from decreasing or a lower limit temperature from increasing. A more preferable proportion is in a range of about 100 ppm to about 10,000 ppm.

In order to adapt the composition to an element in a GH mode, a dichroic dye is added to the composition. Compound (5) is suitable for this objective. In addition to Compound (5), other dichroic dyes different from Compound (5) may be added to the composition. Preferable examples of other dichroic dyes include an azo type dye and an anthraquinone type dye other than Compound (5). In order to prevent foaming, an antifoaming agent such as dimethyl silicone oil and methylphenyl group silicone oil is added to the composition. A preferable proportion of the antifoaming agent is about 1 ppm or more in order to obtain such an effect and is about 1,000 ppm or less in order to prevent a display defect. A more preferable proportion is in a range of about 1 ppm to about 500 ppm.

A polymerizable compound is used to adapt the composition to a polymer sustained alignment (PSA) type element. Compound (1) and Compound (4) are suitable for this objective. In addition to Compound (1) and Compound (4), other polymerizable compounds different from Compound (1) and Compound (4) may be added to the composition. Preferable examples of other polymerizable compounds include compounds such as an acrylate, a methacrylate, a vinyl compound, a vinyloxy compound, propenyl ether, an epoxy compound (oxirane, oxetane), and vinyl ketone. More preferable examples include an acrylate or a methacrylate. A preferable proportion of Compound (1) and Compound (4) is about 10 weight % or more based on the total weight of the polymerizable compound. A more preferable proportion is about 50 weight % or more. A particularly preferable proportion is about 80 weight % or more. A particularly preferable proportion is 100 weight %. When the type of Compound (1) and Compound (4) is changed or when other polymerizable compounds are combined at appropriate proportions into Compound (1) and Compound (4), it is possible to adjust the reactivity of the polymerizable compound and a pretilt angle of liquid crystal molecules. A short response time of the element can be achieved by optimizing a pretilt angle. Since alignment of liquid crystal molecules is stabilized, it is possible to obtain a large contrast ratio and a long lifespan.

The polymerizable compound such as Compound (1) and Compound (4) is polymerized by emitting ultraviolet rays. Polymerization may be performed in the presence of an appropriate initiator such as a photopolymerization initiator. Appropriate conditions for polymerization, and an appropriate type and an appropriate amount of an initiator are known in those skilled in the art and described in literatures. For example, Irgacure651 (registered trademark; BASF), Irgacure184 (registered trademark; BASF), or Darocur1173 (registered trademark; BASF) which is a photoinitiator is appropriate for radical polymerization. A preferable proportion of the photopolymerization initiator is in a range of about 0.1 parts by weight to about 5 parts by weight based on the total weight of the polymerizable compound. A more preferable proportion is in a range of about 1 part by weight to about 3 parts by weight.

When the polymerizable compound such as Compound (1) and Compound (4) is stored, a polymerization inhibitor may be added in order to prevent polymerization. Generally, the polymerizable compound is added to the composition when the polymerization inhibitor has not been removed. Examples of the polymerization inhibitor include hydroquinone, hydroquinone derivatives such as methylhydroquinone, 4-t-butyl catechol, 4-methoxyphenol, and phenothiazine.

Seventh, a synthesis method of component compounds will be described. Such compounds can be synthesized by a known method. A synthesis method will be exemplified. A synthesis method of Compound (1) is described in the section of examples. Compound (2-1) is synthesized by a method described in Published Japanese Translation No. 1990-503441 of the PCT International Publication. Compound (3-5) is synthesized by a method described in Japanese Unexamined Patent Application Publication No. 1982-165328. Compound (4-18) is synthesized by a method described in Japanese Unexamined Patent Application Publication No. 1995-101900. Some of Compound (5) is commercially available. Compound (5-1) in which $R^{51}$ is a pentyl group and $R^{52}$ is a butyl group in Formula (5-1) is commercially available from Nippon Kanko Shikiso Kenkyusho Co., Ltd. Some of Compound (7) is commercially available. Compound (7) in which n is 1 in Formula (7) is available from Aldrich (Sigma-Aldrich Corporation). Compound (7) in which n is 7 in Formula (7) is synthesized by a method described in this specification of U.S. Pat. No. 3,660,505.

Compounds of which a synthesis method is not described can be synthesized by methods described in books such as Organic Syntheses (John Wiley & Sons, Inc.), Organic Reactions (John Wiley & Sons, Inc.), Comprehensive Organic Synthesis (Pergamon Press), and New Experimental Chemistry Course (Maruzen). The composition is prepared by a known method from the compound obtained in this manner. For example, component compounds are mixed together, and then heated, and dissolved.

Finally, applications of the composition will be described. Most of the composition has a lower limit temperature of about −10° C. or lower, an upper limit temperature of about 70° C. or higher, and an optical anisotropy in a range of about 0.07 to about 0.20. When proportions of component compounds are controlled, or when other liquid crystalline compounds are mixed in, a composition having an optical anisotropy in a range of about 0.08 to about 0.25 may be prepared. In addition, a composition having an optical anisotropy in a range of about 0.10 to about 0.30 may be prepared. An element having this composition has a high voltage holding ratio. This composition is suitable for an AM element. This composition is particularly suitable for a transmissive type AM element. A use of this composition as a composition having a nematic phase and a use of this composition as an optically active composition by adding an optically active compound thereto can be obtained.

This composition can be used as a liquid crystal element in a GH mode. The liquid crystal element can be used for a smart window, electronic paper, and the like.

This composition can be used for an AM element. In addition, it can be used for a PM element. This composition can be used for an AM element and a PM element which have modes such as PC, TN, STN, ECB, OCB, IPS, FFS, VA, and FPA. Particularly preferably, this composition can be used for an element having VA, FPA, IPS or FFS. In an element having an IPS mode or an FFS mode, when no voltage is applied, it is preferable that alignment of liquid crystal molecules be perpendicular to a glass substrate. Such an element may be of a reflective type, a transmissive type, or a semi-transmissive type. A use of the composition for a transmissive type element is preferable. The composition can be used for an amorphous silicon-TFT element or a polysilicon-TFT element. A nematic curvilinear aligned phase (NCAP) type element prepared by microcapsulating this composition or a polymer dispersed (PD) type element in which a three-dimensional mesh-like polymer is formed in the composition can be used.

An example of a method of producing a polymer sustained alignment type element of the related art is as follows. An element including two substrates called an array substrate and a color filter substrate is assembled. This substrate has an alignment film. At least one of the substrates has an electrode layer. Liquid crystalline compounds are mixed to prepare a liquid crystal composition. A polymerizable compound is added to this composition. Additives may be additionally added as necessary. This composition is inserted into the element. Light is emitted while a voltage is applied to the element. Ultraviolet rays are preferable. The polymerizable compound is polymerized by light emission. A composition containing a polymer is produced by the polymerization. A polymer sustained alignment type element is produced by such a procedure.

In this procedure, when a voltage is applied, liquid crystal molecules are aligned by an action of an electric field. Molecules of the polymerizable compound are also aligned according to the alignment. In this state, since the polymerizable compound is polymerized by ultraviolet rays, a polymer that maintains this alignment is produced. According to an effect of the polymer, a response time of the element is shortened. Since image burn is a malfunction of liquid crystal molecules, burn is also lessened by an effect of the polymer at the same time. Here, a polymerizable compound in the composition is polymerized in advance, and the composition can be disposed between substrates of the liquid crystal display element.

When Compound (1) which is a polymerizable compound having a polar group is used as a polymerizable compound, it is not necessary for a substrate of the element to have an alignment film. An element having no alignment film is produced according to the procedure described two paragraphs ago except that a substrate having no alignment film is used.

In this procedure, since a polar group interacts with a surface of the substrate, Compound (1) is arranged on the substrate. According to the arrangement, liquid crystal molecules are aligned. When a voltage is applied, alignment of liquid crystal molecules is further promoted. Since the polymerizable group is polymerized by ultraviolet rays in this state, a polymer that maintains this alignment is produced. According to an effect of the polymer, alignment of liquid crystal molecules is additionally stabilized and a response time of the element is shortened. Since image burn is a malfunction of liquid crystal molecules, burn is also lessened by an effect of the polymer at the same time.

EXAMPLES

The disclosure will be described in further detail with reference to examples. The disclosure is not limited to these examples. The disclosure also includes a mixture of a composition M1 and a composition M2. The disclosure includes a mixture in which at least two of compositions of the examples are mixed. A synthesized compound was identified by a method such as NMR analysis. Compounds, compositions, and characteristics of elements were measured by the following methods.

NMR analysis: a DRX-500 (commercially available from Bruker BioSpin) was used for measurement. In $^1$H-NMR measurement, a sample was dissolved in a deuterated solvent such as $CDCl_3$ and measurement was performed under conditions of room temperature and 500 MHz with a cumulative number of 16 measurements. Tetramethylsilane was used as an internal reference. In $^{19}$F-NMR measurement, $CFCl_3$ was used as an internal reference and a cumulative number of measurements was 24. In the explanation of nuclear magnetic resonance spectrums, s is singlet, d is doublet, t is triplet, q is quartet, quin is quintet, sex is sextet, m is multiplet, and br is broad.

Gas chromatographic analysis: A GC-14B type gas chromatography instrument (commercially available from Shimadzu Corporation) was used for measurement. Helium (2 mL/min) was used as a carrier gas. A temperature of a sample vaporization chamber was set to 280° C. and a temperature of a detector (FID) was set to 300° C. A capillary column DB-1 (a length of 30 m, an inner diameter 0.32 mm, a film thickness of 0.25 μm; a fixed liquid phase was dimethylpolysiloxane; nonpolar) commercially available from Agilent Technologies Inc was used in order to separate component compounds. This column was maintained at 200° C. for 2 minutes and then heated to 280° C. at a rate of 5° C./min. A sample was prepared in an acetone solution (0.1 weight %) and then 1 μL of the solution was injected into the sample vaporization chamber. As a recorder, a C-R5A type Chromatopac (commercially available from Shimadzu Corporation or an equivalent thereof was used. The obtained gas chromatogram showed retention times of peaks corresponding to component compounds and areas of the peaks.

As a solvent for diluting a sample, chloroform, hexane, or the like may be used. In order to separate component compounds, the following capillary column may be used. HP-1 (a length of 30 m, an inner diameter of 0.32 mm, and a film thickness of 0.25 μm, commercially available from Agilent Technologies Inc.), Rtx-1 (a length of 30 m, an inner diameter of 0.32 mm, and a film thickness of 0.25 μm, commercially available from Restek Corporation), and BP-1 (a length of 30 m, an inner diameter of 0.32 mm, and a film thickness of 0.25 μm, commercially available from SGE International Pty. Ltd.) may be used.

In order to prevent peaks of compounds from overlapping, a capillary column CBP1-M50-025 (a length of 50 m, an inner diameter of 0.25 mm, and a film thickness of 0.25 μm, commercially available from Shimadzu Corporation) may be used.

A proportion of the liquid crystalline compound contained in the composition may be calculated by the following method. A mixture of the liquid crystalline compound was analyzed through gas chromatography (FID). An area ratio of peaks in the gas chromatogram corresponded to a proportion of the liquid crystalline compound. When the capillary column described above is used, a correction coefficient of each liquid crystalline compound may be regarded as 1. Therefore, a proportion (weight %) of the liquid crystalline compound can be calculated from the area ratio of peaks.

Measurement sample: When characteristics of the composition and the element were measured, the composition itself was used as a sample. When characteristics of a compound were measured, the compound (15 weight %) was mixed into a mother liquid crystal (85 weight %) to prepare a sample for measurement. A characteristic value of the compound was calculated from a value obtained by measurement according to an extrapolation method. (Extrapolation value)={(measured value of sample)–0.85× (measured value of mother liquid crystal)}/0.15. When a smectic phase (or a crystal) was precipitated at 25° C. at this proportion, a ratio between the compound and the mother liquid crystal was changed to 10 weight %:90 weight %, 5 weight %:95 weight %, and 1 weight %:99 weight % in that order. An upper limit temperature, optical anisotropy, viscosity, and a value of a dielectric anisotropy of the compound were obtained by the extrapolation method.

The following mother liquid crystal was used. Proportions of component compounds are expressed as weight %.

[Chem. 77]

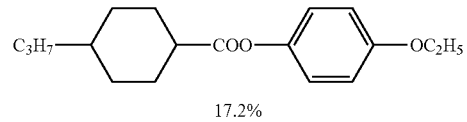

17.2%

-continued

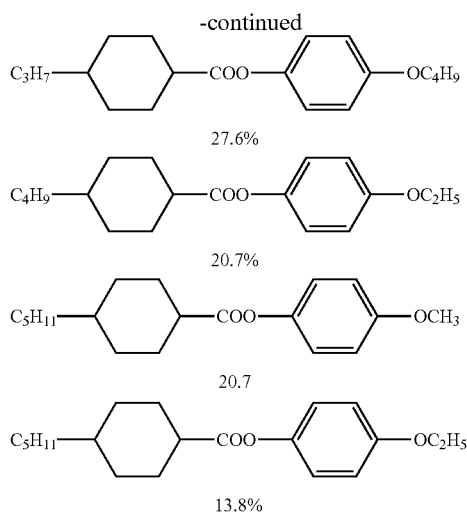

27.6%

20.7%

20.7

13.8%

Measurement method: Characteristics were measured by the following methods. Most of these are methods described in JEITA standard (JEITA.ED-2521B) discussed and established by Japan Electronics and Information Technology Industries Association (JEITA) or modified methods thereof. No thin film transistor (TFT) was attached to a TN element used for measurement.

(1) Transition temperature (° C.): A scanning calorimeter (commercially available from PerkinElmer) and a Diamond DSC system or a high sensitivity differential scanning calorimeter X-DSC7000 (commercially available from SII NanoTechnology Inc.) were used for measurement. The temperature of the sample was raised or lowered at a speed of 3° C./min, a starting point of an endothermic peak or an exothermic peak according to a phase change in the sample was obtained by extrapolation, and a transition temperature was determined. A melting point and a polymerization initiation temperature of the compound were measured using this device. A temperature at which the compound transitions from a solid phase to a liquid crystal phase such as a smectic phase or a nematic phase may be abbreviated as a "lower limit temperature of a liquid crystal phase." A temperature at which the compound transitions from a liquid crystal phase to a liquid phase may be abbreviated as a "clearing point."

A crystal is represented as C. When types of crystal are distinguished, they are denoted as $C_1$ and $C_2$. The smectic phase is represented as S and the nematic phase is represented as N. In the smectic phase, when phases are distinguished as a smectic A phase, a smectic B phase, a smectic C phase, and a smectic F phase, they are represented as $S_A$, $S_B$, $S_C$, and $S_F$, respectively. A liquid (isotropic) is represented as I. The transition temperature is expressed as, for example, "C 50.0 N 100.0 I." This indicates that a transition temperature from a crystal to a nematic phase is 50.0° C., and a transition temperature from a nematic phase to a liquid is 100.0° C.

(2) Upper limit temperature (NI; ° C.) of nematic phase: A sample was placed on a hot plate of a melting point measuring device including a polarization microscope and heated at a speed of 1° C./min. A temperature at which a part of the sample changed from a nematic phase to an isotropic liquid was measured. An upper limit temperature of the nematic phase may be abbreviated as an "upper limit temperature."

(3) Lower limit temperature ($T_C$; ° C.) of nematic phase: A sample having a nematic phase was put into a glass bottle and stored in a freezer at 0° C., −10° C., −20° C., −30° C., and −40° C. for 10 days, and then a liquid crystal phase was observed. For example, when the sample remained in a nematic phase at −20° C., and changed to a crystal or a smectic phase at −30° C., $T_C$ is described as <−20° C. A lower limit temperature of the nematic phase may be abbreviated as a "lower limit temperature."

(4) Viscosity (bulk viscosity; η; measured at 20° C.; mPa·s): An E type rotational viscometer (commercially available from Tokyo Keiki) was used for measurement.

(5) Viscosity (rotational viscosity; γ1; measured at 25° C.; mPa·s): Measurement was performed according to a method described in M. Imai et al., Molecular Crystals and Liquid Crystals, Vol. 259, 37 (1995). A sample was inserted into a VA element having an interval (cell gap) of 20 μm between two glass substrates. A voltage in a range of 39 V to 50 V was gradually applied to this element at intervals of 1 V. After no voltage was applied for 0.2 seconds, application was repeated under conditions of one square wave (square pulse; 0.2 seconds) and no voltage application (2 seconds). A peak current and a peak time of a transient current generated by this application were measured. A value of the rotational viscosity was obtained from these measured values and Calculation Formula (8) on page 40 in the paper (M. Imai). Dielectric anisotropy necessary for this calculation was measured by the method described in measurement (6).

(6) Optical anisotropy (refractive index anisotropy; Δn; measured at 25° C.): Measurement was performed by an Abbe refractometer in which a polarizing plate was attached to an eyepiece using light with a wavelength of 589 nm. A surface of a main prism was rubbed in one direction and the sample was then added dropwise onto the main prism. A refractive index n∥ was measured when a direction of polarized light was parallel to a rubbing direction. A refractive index n⊥ was measured when a direction of polarized light was perpendicular to a rubbing direction. A value of optical anisotropy was calculated from the formula Δn=n∥−n⊥.

(7) Dielectric anisotropy (Δε; measured at 25° C.): A value of dielectric anisotropy was calculated from the formula Δε=ε∥−ε⊥. A dielectric constant (ε∥ and ε⊥) was measured as follows.

1) Measurement of dielectric constant (ε∥): An ethanol (20 mL) solution containing octadecyltriethoxysilane (0.16 mL) was applied to a well-washed glass substrate. The glass substrate was rotated by a spinner and then heated at 150° C. for 1 hour. A sample was inserted into a VA element in which an interval (cell gap) between two glass substrates was 4 m, and this element was sealed using an adhesive that was cured with ultraviolet rays. A sine wave (0.5 V, 1 kHz) was applied to this element and after 2 seconds, a dielectric constant (ε∥) in a long axis direction of liquid crystal molecules was measured.

2) Measurement of dielectric constant (ε⊥): A polyimide solution was applied to a well-washed glass substrate. The glass substrate was fired and a rubbing treatment was then performed on the obtained alignment film. A sample was inserted into a TN element in which an interval (cell gap) between two glass substrates was 9 μm and a twist angle was 80 degrees. A sine wave (0.5 V, 1 kHz) was applied to this element, and after 2 seconds, a dielectric constant (ε⊥) in a short axis direction of liquid crystal molecules was measured.

(8) Threshold voltage (Vth; measured at 25° C.; V): An LCD5100 type luminance meter (commercially available from Otsuka Electronics) was used for measurement. A light source was a halogen lamp. A sample was inserted into a VA element in a normally black mode in which an interval (cell gap) between two glass substrates was 4 μm, and a rubbing direction was anti-parallel, and this element was sealed with an adhesive that was cured with ultraviolet rays. A voltage (60 Hz, square wave) applied to this element was gradually increased by 0.02 V from 0 V to 20 V. In this case, light was emitted to the element in a vertical direction and a quantity of light that had passed through the element was measured. A voltage-transmittance curve in which the transmittance was 100% when the quantity of light was a maximum and the transmittance was 0% when the quantity of light was a minimum was created. A threshold voltage was a voltage when the transmittance was 10%.

(9) Voltage holding ratio (VHR-1; measured at 25° C.; %): A TN element used for measurement included a polyimide alignment film, and an interval (cell gap) between two glass substrates was 5 μm. This element was sealed with an adhesive that was cured with ultraviolet rays after the sample was inserted. A pulse voltage (at 5 V for 60 microseconds) was applied to this TN element for charging. An attenuating voltage was measured for 16.7 milliseconds by a high-speed voltmeter, and an area A between a voltage curve in a unit cycle and the horizontal axis was obtained. An area B was an area when the voltage was not attenuated. A voltage holding ratio was expressed as a percentage of the area A with respect to the area B.

(10) Voltage holding ratio (VHR-2; measured at 80° C.; %): A voltage holding ratio was measured in the same procedure as in the above method except that the voltage holding ratio was measured at 80° C. instead of 25° C. The obtained value was expressed as VHR-2.

(11) Voltage holding ratio (VHR-3; measured at 25° C.; %): After ultraviolet rays were emitted, a voltage holding ratio was measured, and stability with respect to ultraviolet radiation was evaluated. A TN element used for measurement had a polyimide alignment film and a cell gap was 5 μm. A sample was inserted into the element and light was emitted for 20 minutes. A light source was an extra high pressure mercury lamp USH-500D (commercially available from Ushio Inc) and an interval between the element and the light source was 20 cm. In measurement of VHR-3, an attenuating voltage was measured for 16.7 milliseconds. A composition having a large VHR-3 had great stability with respect to ultraviolet radiation. VHR-3 is preferably 90% or more and more preferably 95% or more.

(12) Voltage holding ratio (VHR-4; measured at 25° C.; %): A TN element into which a sample was inserted was heated in a thermostatic chamber at 80° C. for 500 hours and a voltage holding ratio was then measured, and stability with respect to heat was evaluated. In measurement of VHR-4, an attenuating voltage was measured for 16.7 milliseconds. A composition having a large VHR-4 had great stability with respect to heat.

(13) Elastic constant (K11: splay elastic constant, K33: bend elastic constant; measured at 25° C.; pN): An EC-1 type elastic constant measuring instrument (commercially available from TOYO Corporation) was used for measurement. A sample was inserted into a vertically aligned element in which an interval (cell gap) between two glass substrates was 20 μm. A charge of 20 V to 0 V was applied to this element and an electrostatic capacitance and an applied voltage were measured. The measured values of the electrostatic capacitance (C) and the applied voltage (V) were fitted using Formula (2.98) and Formula (2.101) on page 75 in "Liquid Crystal Device Handbook" (commercially available from Nikkan Kogyo Shimbun, Ltd.) and a value of the elastic constant was obtained from Formula (2.100).

(14) Specific resistance (ρ; measured at 25° C.; Ωcm): 1.0 mL of a sample was injected into a container including an electrode. A DC voltage (10 V) was applied to this container and a direct current was measured after 10 seconds. A specific resistance was calculated from the following formula.

(Specific resistance)={(voltage)×(electric capacitance of container)}/{(direct current)×(dielectric constant of vacuum)}.

(15) Pretilt angle (degrees): Spectroscopic ellipsometer M-2000U (commercially available from J. A. Woollam Co., Inc.) was used in order to measure a pretilt angle.

Synthesis Example 1

Synthesis of Compound (1-44-1)

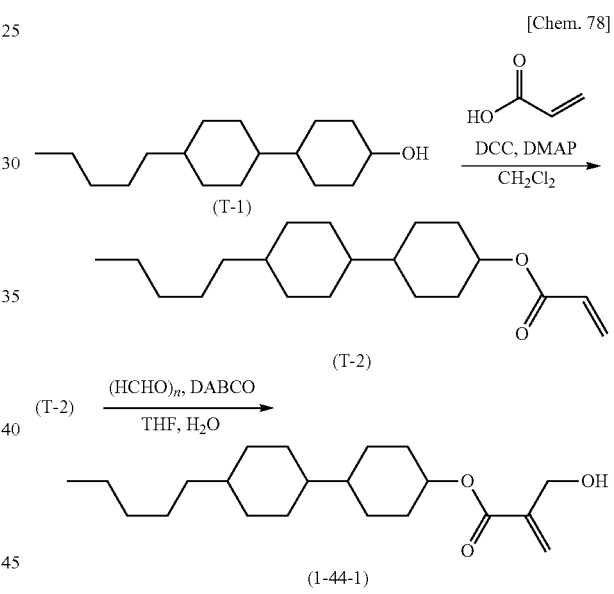

First Process

Compound (T-1) (25.0 g), acrylic acid (7.14 g), N,N-dimethyl-4-aminopyridine (DMAP) (1.21 g), and dichloromethane (300 ml) were put into a reactor and the mixture was cooled at 0° C. A dichloromethane (125 ml) solution containing N,N'-dicyclohexylcarbodiimide (DCC) (24.5 g) was slowly added dropwise thereto, and the mixture was stirred for 12 hours while the temperature returned to room temperature. After insoluble materials were removed by filtration, the reaction mixture was poured into water and an aqueous layer was extracted in dichloromethane. Then, organic layers that were extracted several times were collected, and the organic layers were washed with water and dried with anhydrous magnesium sulfate. This solution was concentrated under a reduced pressure, and the residue was purified through silica gel chromatography (volume ratio, heptane:toluene=2:1). In addition, purification by re-crystallization from Sol Mix (registered trademark) A-11 was performed to obtain Compound (T-2) (11.6 g; 38%).

Second Process

Paraformaldehyde (2.75 g), 1,4-diazabicyclo[2.2.2]octane (DABCO) (4.62 g), and water (40 ml) were put into a reactor and the mixture was stirred at room temperature for 15 minutes. A tetrahydrofuran (THF) (90 ml) solution containing Compound (T-2) (6.31 g) was added dropwise thereto, and the mixture was stirred at room temperature for 72 hours. The reaction mixture was poured into water, and an aqueous layer was extracted in ethyl acetate. Then, organic layers that were extracted several times were collected, and the organic layers were washed with water and dried with anhydrous magnesium sulfate. This solution was concentrated under a reduced pressure, and the residue was purified through silica gel chromatography (volume ratio, toluene:ethyl acetate=5:1). In addition, purification by recrystallization from a mixed solvent (volume ratio, 1:1) of heptane and toluene was performed to obtain Compound (1-44-1) (1.97 g; 29%).

NMR analysis values of the obtained Compound (1-44-1) were as follows.

$^1$H-NMR: chemical shift δ (ppm; CDCl$_3$): 6.23 (s, 1H), 5.79 (d, J=1.2 Hz, 1H), 4.79-4.70 (m, 1H), 4.32 (d, J=6.7 Hz, 2H), 2.29 (t, J=6.7 Hz, 1H), 2.07-2.00 (m, 2H), 1.83-1.67 (m, 6H), 1.42-1.18 (m, 8H), 1.18-0.91 (m, 9H), 0.91-0.79 (m, 5H).

Physical properties of Compound (1-44-1) were as follows.

Transition temperature: C 40.8 S$_A$ 109 I.

Synthesis Example 2

Synthesis of Compound (1-66-1)

[Chem. 79]

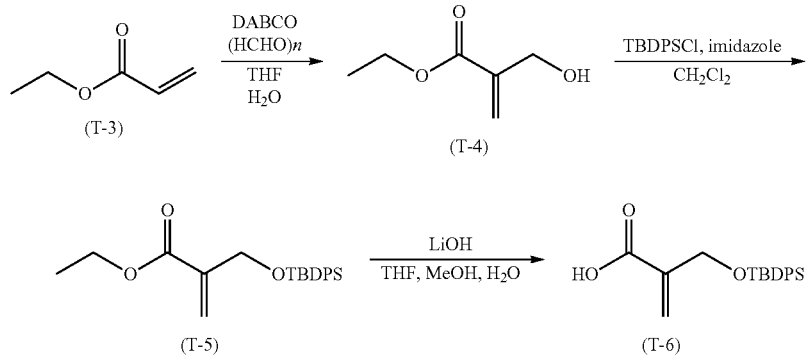

[Chem. 80]

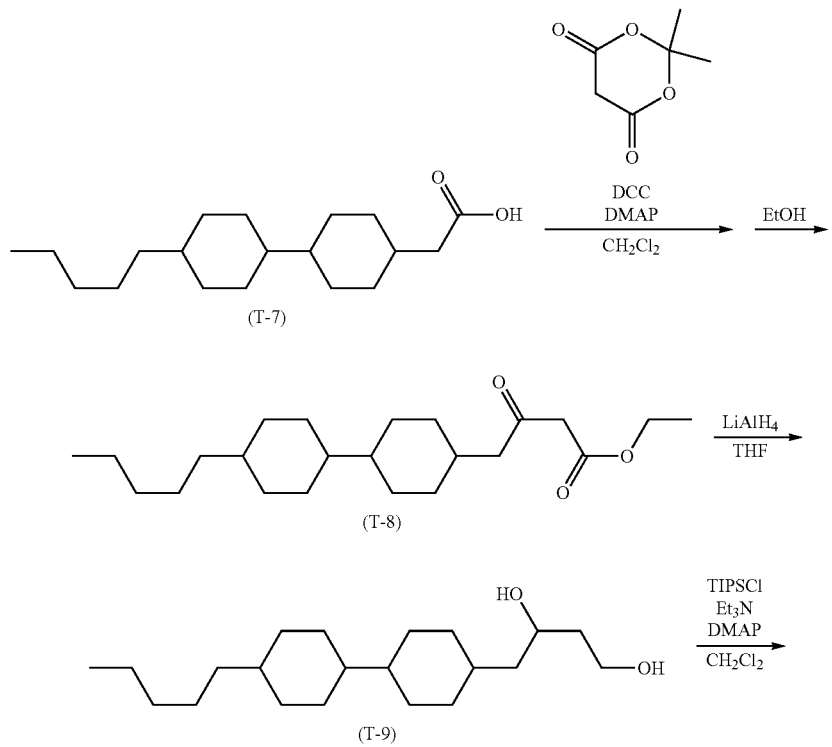

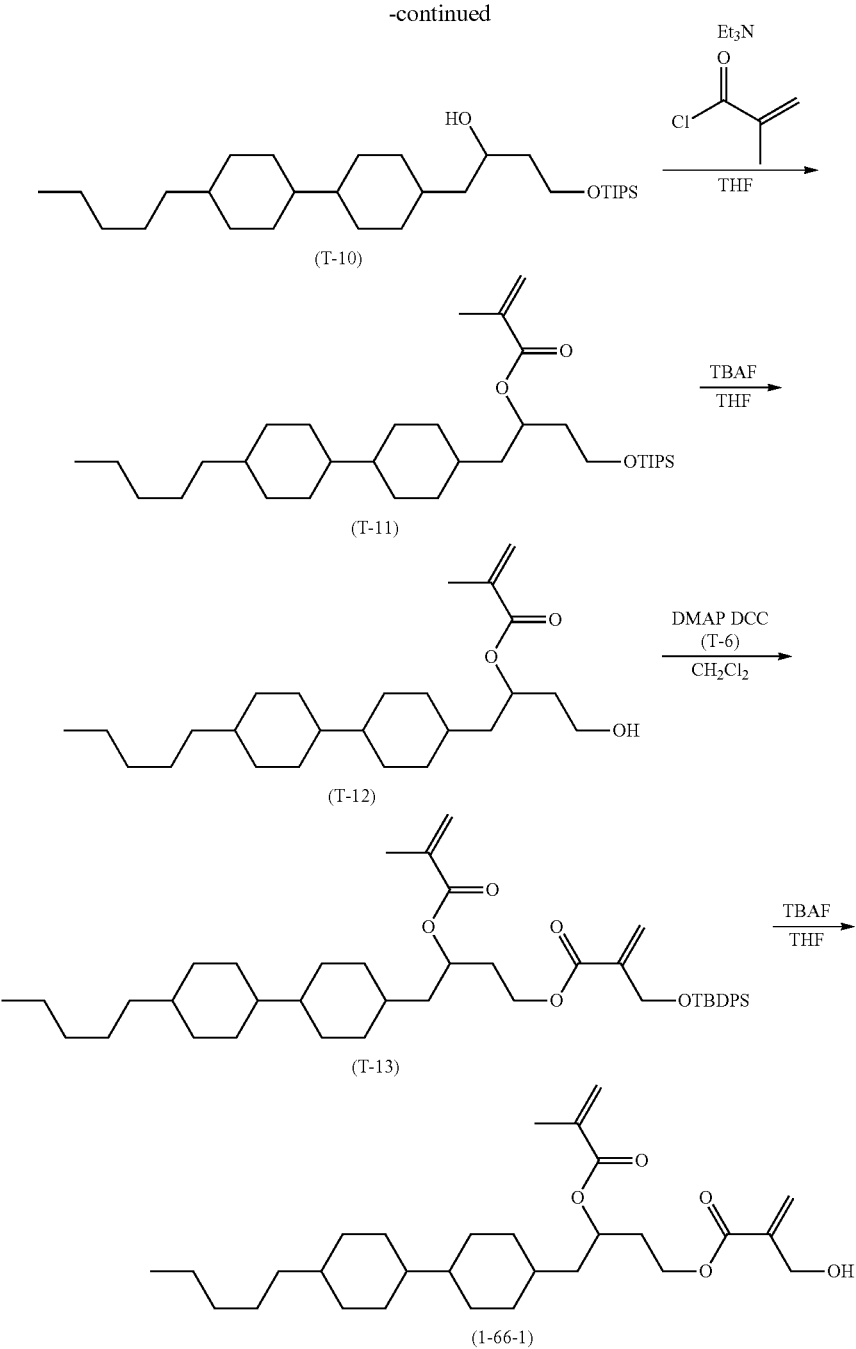

First Process

Paraformaldehyde (30.0 g), 1,4-diazabicyclo[2.2.2]octane (DABCO) (56.0 g), and water (600 ml) were put into a reactor and the mixture was stirred at room temperature for 15 minutes. An THF (1,200 ml) solution containing Compound (T-3) (50.0 g) was added dropwise thereto and the mixture was stirred at room temperature for 72 hours. The reaction mixture was poured into water, and an aqueous layer was extracted in ethyl acetate. Then, organic layers that were extracted several times were collected, and the organic layers were washed with water and dried with anhydrous magnesium sulfate. This solution was concentrated under a reduced pressure, and the residue was purified through silica gel chromatography (volume ratio, toluene:ethyl acetate=4:1) to obtain Compound (T-4) (43.2 g; 65%).

Second Process

Compound (T-4) (42.2 g) was used as a raw material, and imidazole (26.3 g), and dichloromethane (800 ml) were put into a reactor and the mixture was cooled at 0° C. A dichloromethane (100 ml) solution containing t-butyldiphenylchlorosilane (TBDPSCl) (106.4 g) was slowly added dropwise thereto, and the mixture was stirred for 12 hours while the temperature returned to room temperature. The reaction mixture was poured into water, and an aqueous layer was extracted in dichloromethane. Then, organic layers that were extracted several times were collected, and the organic layers were washed with water and dried with anhydrous magnesium sulfate. This solution was concentrated under a reduced pressure, and the residue was purified through silica gel chromatography (volume ratio, heptane:ethyl acetate=10:1) to obtain Compound (T-5) (107.0 g; 90%).

Third Process

Compound (T-5) (107.0 g), THF (800 ml), methanol (200 ml), and water (100 ml) were put into a reactor and the mixture was cooled at 0° C. Lithium hydroxide monohydrate (24.3 g) was added thereto and the mixture was stirred for 12 hours while the temperature returned to room temperature. The reaction mixture was poured into water, and 6 N hydrochloric acid (100 ml) was slowly added thereto so that it became acidic, and an aqueous layer was then extracted in ethyl acetate. Then, organic layers that were extracted several times were collected, and the organic layers were washed with water and dried with anhydrous magnesium sulfate. This solution was concentrated under a reduced pressure and purification by re-crystallization from heptane was performed to obtain Compound (T-6) (47.4 g; 48%).

Fourth Process

Compound (T-7) (15.0 g), DMAP (9.33 g), Meldrum's acid (9.54 g) and dichloromethane (250 ml) were put into a reactor and the mixture was cooled at 0° C. DCC (15.7 g) was slowly added dropwise thereto, and the mixture was stirred for 12 hours while the temperature returned to room temperature. After insoluble materials were removed by filtration, the reaction mixture was poured into water, and an aqueous layer was extracted in dichloromethane. Then, organic layers that were extracted several times were collected, and the organic layers were washed with water and dried with anhydrous magnesium sulfate. This solution was concentrated under a reduced pressure. The residue and ethanol (250 ml) were put into a reactor and the mixture was stirred at 70° C. After insoluble materials were removed by filtration, the reaction mixture was poured into a saline, and an aqueous layer was extracted in ethyl acetate. Then, organic layers that were extracted several times were collected, and the organic layer was dried with anhydrous magnesium sulfate. This solution was concentrated under a reduced pressure, and the residue was purified through silica gel chromatography (volume ratio, heptane: toluene=1:1) to obtain Compound (T-8) (10.2 g; 55%).

Fifth Process

Lithium aluminum hydride (0.6 g) and THF (100 ml) were put into a reactor and the mixture was ice-cooled. A THF (100 ml) solution containing Compound (T-8) (10.2 g) was slowly added thereto and the mixture was stirred for 3 hours while the temperature returned to room temperature. After insoluble materials were removed by filtration, the reaction mixture was poured into water, and an aqueous layer was extracted in ethyl acetate. Then, organic layers that were extracted several times were collected, and the organic layers were washed with saline and dried with anhydrous magnesium sulfate. This solution was concentrated under a reduced pressure, and the residue was purified through silica gel chromatography (volume ratio, toluene: ethyl acetate=1:1) to obtain Compound (T-9) (7.35 g; 81%).

Sixth Process

Compound (T-9) (7.35 g), trimethylamine (3.75 ml), DMAP (0.27 g), and dichloromethane (200 ml) were put into a reactor and the mixture was cooled at 0° C. Triisopropylsilyl chloride (TIPSCl) (5.05 ml) was slowly added dropwise thereto and the mixture was stirred for 24 hours while the temperature returned to room temperature. After insoluble materials were removed by filtration, the reaction mixture was poured into water, and an aqueous layer was extracted in ethyl acetate. Then, organic layers that were extracted several times were collected, and the organic layers were washed with saline and dried with anhydrous magnesium sulfate. This solution was concentrated under a reduced pressure, and the residue was purified through silica gel chromatography (volume ratio, toluene:ethyl acetate=19:1) to obtain Compound (T-10) (6.50 g; 60%).

Seventh Process

Compound (T-10) (6.50 g), trimethylamine (3.77 ml), and THF (200 ml) were put into a reactor and the mixture was cooled at 0° C. Methacryloyl chloride (2.00 ml) was slowly added dropwise thereto, and the mixture was stirred for 4 hours while the temperature returned to room temperature. After insoluble materials were removed by filtration, the reaction mixture was poured into water, and an aqueous layer was extracted in toluene. Then, organic layers that were extracted several times were collected, and the organic layers were washed with water and dried with anhydrous magnesium sulfate. This solution was concentrated under a reduced pressure, and the residue was purified through silica gel chromatography (volume ratio, toluene:heptane=1:1) to obtain Compound (T-11) (4.70 g; 63%).

Eighth Process

Compound (T-11) (4.70 g), and THF (100 ml) were put into a reactor and the mixture was cooled at 0° C. Tetra-n-butylammonium fluoride (TBAF) (1.00 M; THF solution; 10.3 ml) was slowly added thereto and the mixture was stirred for 1 hour while the temperature returned to room temperature. The reaction mixture was poured into water, and an aqueous layer was extracted in ethyl acetate. Then, organic layers that were extracted several times were collected, and the organic layers were washed with saline and dried with anhydrous magnesium sulfate. This solution was concentrated under a reduced pressure, and the residue was purified through silica gel chromatography (volume ratio, toluene:ethyl acetate=9:1) to obtain Compound (T-8) (1.50 g; 45%).

Ninth Process

Compound (T-12) (1.50 g), Compound (T-6) (1.56 g), DMAP (1.0 g), and dichloromethane (200 ml) were put into a reactor and the mixture was cooled at 0° C. A dichloromethane (60 ml) solution containing DCC (4.8 g) was slowly added dropwise thereto, and the mixture was stirred for 12 hours while the temperature returned to room temperature. After insoluble materials were removed by filtration, the reaction mixture was poured into water, and an aqueous layer was extracted in dichloromethane. Then, organic layers that were extracted several times were collected, and the organic layers were washed with water and dried with anhydrous magnesium sulfate. This solution was concentrated under a reduced pressure, and the residue was purified through silica gel chromatography (volume ratio, heptane:ethyl acetate=19:1) to obtain Compound (T-13) (1.51 g; 55%).

Tenth Process

Compound (T-13) (1.51 g) and THF (100 ml) were put into a reactor and the mixture was cooled at 0° C. TBAF (1.00 M; THF solution; 16.5 ml) was slowly added thereto, and the mixture was stirred for 1 hour while the temperature returned to room temperature. The reaction mixture was poured into water, and an aqueous layer was extracted in ethyl acetate. Then, organic layers that were extracted several times were collected, and the organic layers were washed with saline and dried with anhydrous magnesium sulfate. This solution was concentrated under a reduced pressure, and the residue was purified through silica gel chromatography (volume ratio, toluene:ethyl acetate=9:1). In addition, purification by re-crystallization from heptane was performed to obtain Compound (1-66-1) (0.45 g; 45%).

NMR analysis values of the obtained Compound (1-66-1) were as follows.

¹H-NMR: chemical shift δ (ppm; CDCl₃): 6.25 (s, 1H), 6.09 (s, 1H), 5.82 (d, J=1.1 Hz, 1H), 5.55 (s, 1H), 5.22-5.17 (m, 1H), 4.32-4.26 (m, 3H), 4.17-4.12 (m, 3H), 2.50 (s, 1H), 2.03-1.89 (m, 5H), 1.83-1.58 (m, 9H), 1.41-1.08 (m, 11H), 0.96-0.78 (m, 13H).

Physical properties of Compound (1-66-1) were as follows.

Transition temperature: C 61.2 I.

Examples of compositions will be shown below. Component compounds are indicated by symbols based on definitions in the following Table 3. In Table 3, the configuration related to 1,4-cyclohexylene is trans. A number in parentheses after a symbol indicates a chemical formula to which the compound belongs. The symbol (-) refers to another liquid crystalline compound. A proportion (percentage) of the liquid crystalline compound is a weight percentage (weight %) based on the weight of the liquid crystal composition excluding additives. Finally, values of characteristics of the compositions are summarized.

TABLE 3

Method of representing compound using symbols
R—(A₁)—Z₁— . . . —Zₙ—(Aₙ)—R'

| 1) Left terminal group R— | symbols |
|---|---|
| FCₙH₂ₙ— | Fn— |
| CₙH₂ₙ₊₁— | n- |
| CₙH₂ₙ₊₁O— | nO— |
| CₘH₂ₘ₊₁OCₙH₂ₙ— | mOn— |
| CH₂=CH— | V— |
| CₙH₂ₙ₊₁—CH=CH— | nV— |
| CH₂=CH—CₙH₂ₙ— | Vn— |
| CₘH₂ₘ₊₁—CH=CH—CₙH₂ₙ— | mVn— |
| CF₂=CH— | VFF— |
| CF₂=CH—CₙH₂ₙ— | VFFn— |
| CₙH₂ₙ₊₁CF₂CₙH₂ₙ— | m(CF2)n— |
| CH₂=CHCOO— | AC— |
| CH₂=C(CH₃)COO— | MAC— |

| 2) Right terminal group —R' | symbols |
|---|---|
| —CₙH₂ₙ₊₁ | -n |
| —OCₙH₂ₙ₊₁ | —On |
| —CH=CH₂ | —V |
| —CH=CH—CₙH₂ₙ₊₁ | —Vn |
| —CₙH₂ₙ—CH=CH₂ | —nV |
| —CₘH₂ₘ—CH=CH—CₙH₂ₙ₊₁ | —mVn |
| —CH=CF₂ | —VFF |
| —OCOCH=CH₂ | —AC |
| —OCOC(CH₃)=CH₂ | —MAC |

| 3) Bond group —Zₙ— | symbols |
|---|---|
| —CₙH₂ₙ— | n |
| —COO— | E |
| —CH=CH— | V |
| —CH=CHO— | VO |
| —OCH=CH— | OV |
| —CH₂O— | 1O |
| —OCH₂— | O1 |
| 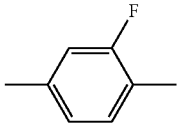 | ch |

| 4) Ring Structure —Aₙ— | symbols |
|---|---|
| 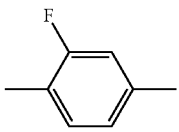 | H |
| 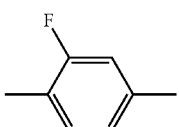 | B |

TABLE 3-continued

Method of representing compound using symbols
R—(A₁)—Z₁— . . . —Zₙ—(Aₙ)—R'

| | |
|---|---|
| 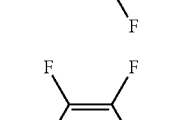 | B(F) |
| 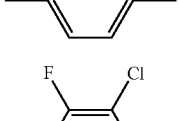 | B(2F) |
| 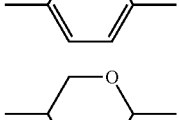 | B(2F,5F) |
| 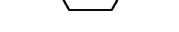 | B(2F,3F) |
| 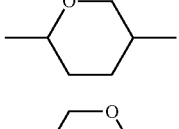 | B(2F,3Cl) |
| 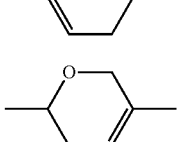 | dh |
| 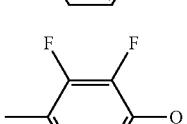 | Dh |
| 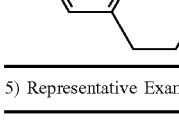 | dpr |
| 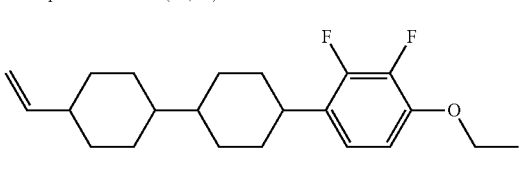 | Dpr |
|  | Cro(7F,8F) |

5) Representative Examples

Example 1 V—HHB(2F,3F)—O2

TABLE 3-continued

Method of representing compound using symbols
R—(A$_1$)—Z$_1$— ... —Z$_n$—(A$_n$)—R'

Example 2  5-DprB(2F,3F)—O2

Example 3  3-HBB-1

Example 4  AC—BB—AC

Examples of Element

1. Raw Material

A composition to which a polar compound was added was inserted into an element having no alignment film. Ultraviolet rays were emitted and vertical alignment of liquid crystal molecules in the element was then examined. First, a raw material will be described. The raw material included Compositions (M1) to (M9), Polymerizable Compounds (PC-1) to (PC-8) having a polar group, Polymerizable Compound (RM-1), and Compounds (DD-1) to (DD-4) as dichroic dyes and listed in that order.

[Composition M1]

| 3-HB (2F,3F)-O2 | (2-1) | 9% |
| 5-HB (2F,3F)-O2 | (2-1) | 11% |
| 2-HHB (2F,3F)-1 | (2-6) | 9.5% |
| 3-HHB (2F,3F)-1 | (2-6) | 10.5% |
| 3-HHB (2F,3F)-O2 | (2-6) | 10.5% |
| 5-HHB (2F,3F)-O2 | (2-6) | 9.5% |
| 2-HBB (2F,3F)-O | (2-10) | 12% |
| 3-HH-5 | (3-1) | 9.5% |
| 5-HB-3 | (3-2) | 13.5% |
| 5-HH-O1 | (3-1) | 5% |

NI=79.5° C.; Δn=0.091; Δε=−3.4; Vth=2.1 V; η=26.3 mPa·s.

[Composition M2]

| 3-HB (2F,3F)-O2 | (2-1) | 15.5% |
| 3-HHB (2F,3F)-O3 | (2-6) | 8% |
| 4-HHB (2F,3F)-O2 | (2-6) | 10% |
| 2-BB (2F,3F)B-3 | (2-9) | 8.75% |
| 2-HBB (2F,3F)-O2 | (2-10) | 5.5% |
| 3-HBB (2F,3F)-O2 | (2-10) | 11.5% |
| 2-HH-3 | (3-1) | 24.5% |
| 3-HH-4 | (3-1) | 9.25% |
| 3-HB-O2 | (3-2) | 7% |

NI=76.1° C.; Δn=0.097; Δε=−2.69; Vth=2.2 V; η=25.3 mPa·s.

[Composition M3]

| 3-HB (2F,3F)-O2 | (2-1) | 18% |
| 3-HHB (2F,3F)-O2 | (2-6) | 9% |
| 2-HBB (2F,3F)-O2 | (2-10) | 6% |
| 3-HBB (2F,3F)-O2 | (2-10) | 10% |
| 4-HBB (2F,3F)-O2 | (2-10) | 8% |
| 2-HH-3 | (3-1) | 25% |
| 3-HH-4 | (3-1) | 10% |
| 1-BB-3 | (3-3) | 5% |
| 3-HBB-2 | (3-6) | 9% |

NI=76.1° C.; Δn=0.100; Δε=−2.5; Vth=2.4 V; η=16.1 mPa·s.

[Composition M4]

| 3-HB (2F,3F)-O2 | (2-1) | 12% |
| 3-BB (2F,3F)-O2 | (2-4) | 10% |
| 5-BB (2F,3F)-O2 | (2-4) | 4% |
| 3-HDhB (2F,3F)-O2 | (2-16) | 12% |
| 3-dhBB (2F,3F)-O2 | (2-17) | 8% |
| 2-HH-3 | (3-1) | 20% |
| 3-HH-4 | (3-1) | 6% |
| 3-HB-O2 | (3-2) | 3% |
| 3-HHB-O1 | (3-5) | 3% |
| 3-HHB-1 | (3-5) | 6% |
| 3-HHB-3 | (3-5) | 6% |
| 3-HBB-2 | (3-6) | 10% |

NI=78.5° C.; Δn=0.101; Δε=−2.7; Vth=2.3 V; η=18.3 mPa·s.

| 3-BB (2F,3F)-O2 | (2-4) | 12% |
| 5-BB (2F,3F)-O2 | (2-4) | 6% |
| 2-HH1OB (2F,3F)-O2 | (2-8) | 10% |
| 3-HH1OB (2F,3F)-O2 | (2-8) | 16% |
| 2-HH-3 | (3-1) | 20% |
| 3-HH-4 | (3-1) | 8% |
| 3-HB-O2 | (3-2) | 4% |
| 1-BB-5 | (3-3) | 5% |
| 3-HHB-1 | (3-5) | 6% |
| 3-HHB-3 | (3-5) | 5% |
| 3-HBB-2 | (3-6) | 8% |

NI=76.9° C.; Δn=0.100; Δε=−2.7; Vth=2.4 V; η=16.2 mPa·s.

[Composition M6]

| 3-HB (2F,3F)-O2 | (2-1) | 18% |
| 3-HHB (2F,3F)-O2 | (2-6) | 9% |
| 5-HHB (2F,3F)-O2 | (2-6) | 4% |
| 2-BB (2F,3F)B-3 | (2-9) | 9% |
| 2-HBB (2F,3F)-O2 | (2-10) | 10% |
| 3-HBB (2F,3F)-O2 | (2-10) | 10% |
| 3-HH-V | (3-1) | 40% |

NI=74.8° C.; Δn=0.101; Δε=−2.8; Vth=2.3 V; η=14.1 mPa·s.

[Composition M7]

| V-HB (2F,3F)-O2 | (2-1) | 14% |
| V-HHB (2F,3F)-O2 | (2-6) | 9% |
| V-HHB (2F,3F)-O4 | (2-6) | 8% |
| V-HBB (2F,3F)-O2 | (2-10) | 10% |
| V-HBB (2F,3F)-O4 | (2-10) | 10% |
| 2-HH-3 | (3-1) | 25% |
| 3-HH-4 | (3-1) | 10% |
| 1-BB-3 | (3-3) | 5% |
| 3-HBB-2 | (3-6) | 9% |

NI=75.4° C.; Δn=0.100; Δε=−2.6; Vth=2.3 V; η=15.3 mPa·s.

[Composition M8]

| | | |
|---|---|---|
| 3-HB (2F,3F)-O2 | (2-1) | 17% |
| 3-HHB (2F,3F)-O2 | (2-6) | 10% |
| 2-HBB (2F,3F)-O2 | (2-10) | 6% |
| 3-HBB (2F,3F)-O2 | (2-10) | 10% |
| 4-HBB (2F,3F)-O2 | (2-10) | 8% |
| 2-HH-3 | (3-1) | 25% |
| 3-HH-4 | (3-1) | 10% |
| 7-HB-1 | (3-2) | 5% |
| 5-B(F)BB-2 | (3-7) | 9% |

NI=76.0° C.; Δn=0.101; Δε=−2.64; Vth=2.3 V; η=17.2 mPa·s.

[Composition M9]

| | | |
|---|---|---|
| 3-H2B (2F,3F)-O2 | (2-2) | 11% |
| 3-H1OB (2F,3F)-O2 | (2-3) | 8% |
| 2-HH1OB (2F,3F)-O2 | (2-8) | 12% |
| 3-HH1OB (2F,3F)-O2 | (2-8) | 14% |
| 3-HBB (2F,3F)-O2 | (2-10) | 5% |
| 5-HBB (2F,3F)-O2 | (2-10) | 6% |
| 3-HDhB (2F,3F)-O2 | (2-16) | 8% |
| 3-HH-4 | (3-1) | 6% |
| 3-HH-5 | (3-1) | 4% |
| 3-HB-O1 | (3-2) | 8% |
| 3-HHB-1 | (3-5) | 3% |
| 3-HHB-3 | (3-5) | 4% |
| 3-HBB-2 | (3-6) | 7% |
| 5-B(F)BB-2 | (3-7) | 4% |

NI=99.3° C.; Δn=0.110; Δε=−4.92; Vth=2 V; η=31.1 mPa·s.

The following Polymerizable Compounds (PC-1) to (PC-8) having a polar group were used as polymerizable compounds.

Polymerizable Compound (PC-1) was Compound (1-44-1), Polymerizable Compound (PC-2) was the compound of Formula (1-85), Polymerizable Compound (PC-3) was Compound (1-66-1), Polymerizable Compound (PC-4) was the compound of Formula (1-44), Polymerizable Compound (PC-5) was the compound of Formula (1-67), Polymerizable Compound (PC-6) was the compound of Formula (1-66), Polymerizable Compound (PC-7) was the compound of Formula (1-65), and Polymerizable Compound (PC-8) was the compound of Formula (1-67).

[Chem. 81]

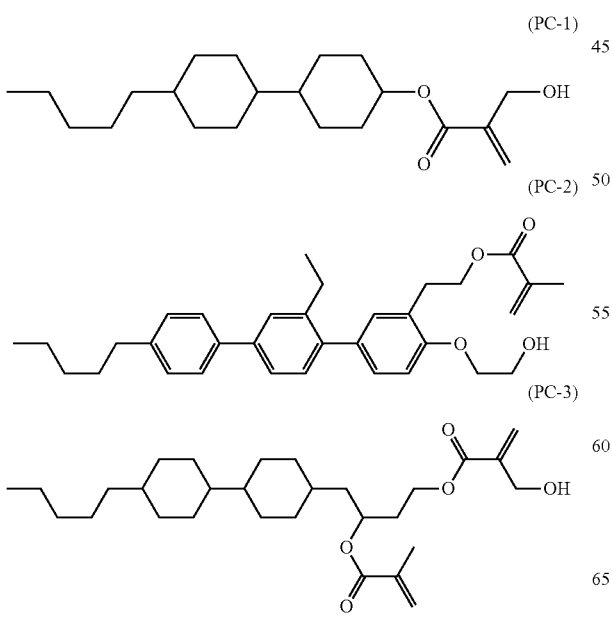

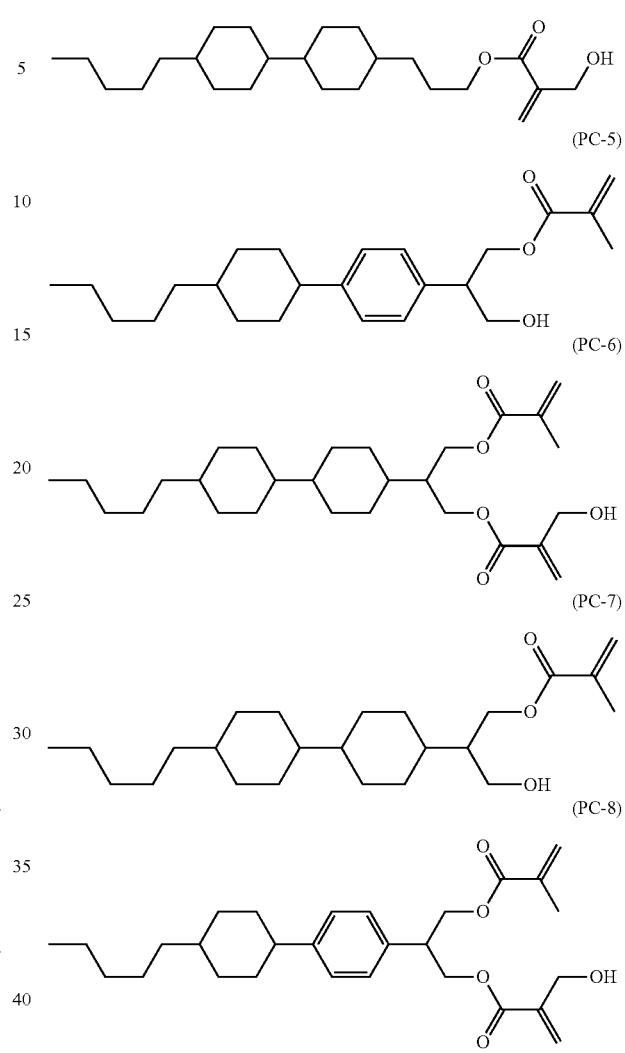

The following Polymerizable Compound (RM-1) was used as the polymerizable compound.

Polymerizable Compound (RM-1) was the compound of Formula (4-25).

[Chem. 82]

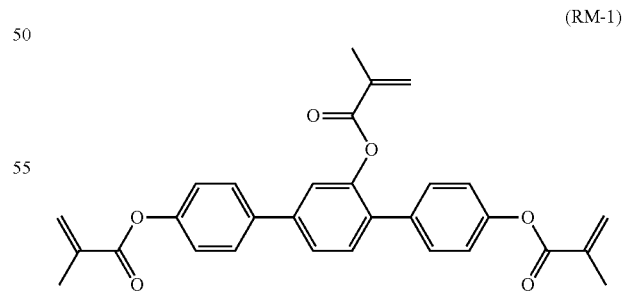

The following Compounds (DD-1) to (DD-4) were used as dichroic dyes.

Compound (DD-1) was the compound of Formula (5-1), Compound (DD-2) was the compound of Formula (5-2), Compound (DD-3) was the compound of Formula (5-3), and Compound (DD-4) was the compound of Formula (5-4).

Compounds (DD-1) to (DD-4) are commercially available from Nippon Kanko Shikiso Kenkyusho Co., Ltd. A maximum absorption wavelength of Compound (DD-1) was 425 nm. A maximum absorption wavelength of Compound (DD-2) was 537 nm. A maximum absorption wavelength of Compound (DD-3) was 619 nm, and a dichroic ratio was 8.9. A maximum absorption wavelength of Compound (DD-4) was 492 nm, and a dichroic ratio was 11.9. Here, the maximum absorption wavelength can be measured using a UV-visible spectrophotometer. The dichroic ratio (DR) can be calculated from values of an absorbance A∥ and A⊥ measured using a UV-visible spectrophotometer. The value of the dichroic ratio can be calculated from the formula DR=A∥/A⊥.

Compound (PC-1) having a polar group was polymerized. The element was placed on a backlight and it was observed whether a dichroic dye and liquid crystal molecules were vertically aligned. When the liquid crystal molecules were sufficiently aligned and light uniformly passed through the element, vertical alignment was determined as "favorable." When light that did not pass through the element was observed, vertical alignment was determined as "poor."

Examples 2 to 11 and Comparative Example 1

Elements having no alignment film were prepared using a mixture in which a composition, a dichroic dye, and a polymerizable compound were combined. Alignment was evaluated in the same method as in Example 1. The results

[Chem. 83]

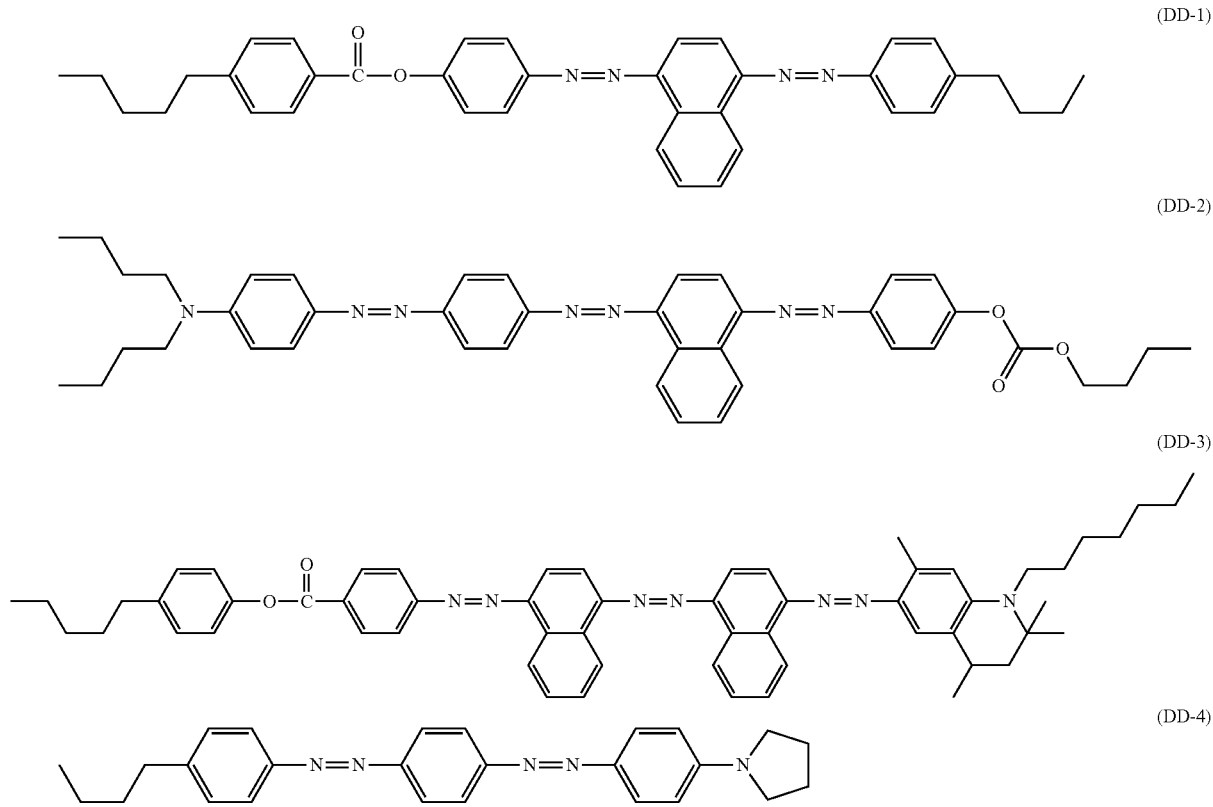

2. Alignment of Liquid Crystal Molecules

Example 1

5 parts by weight of Polymerizable Compound (PC-1) having a polar group, 2 parts by weight of Compound (DD-1), 0.75 parts by weight of Compound (DD-2), and 2.25 parts by weight of Compound (DD-3) were added at these proportions to 100 parts by weight of Composition (M4). The mixture was inserted into an element having no alignment film having an interval (cell gap) between two glass substrates of 3.5 m on a hot stage at 100° C. A voltage (10 V) was applied to the element in a normal direction of the element and ultraviolet rays were emitted (28 J) using an extra high pressure mercury lamp USH-250-BY (commercially available from Ushio Inc), and thus Polymerizable are shown in Table 4. In Examples 4, 6, 7 and 9, Polymerizable Compound (RM-1) was added at a proportion of 0.3 parts by weight. In Examples 2 and 6, when polymerizable compounds having a polar group were polymerized, no voltage was applied. Here, in Comparative Example 1, alignment was not evaluated.

3. Response of Liquid Crystal Element

Responsiveness of the elements obtained in the above examples and comparative examples was evaluated. Here, in Examples 1, 3 to 5, and 7 to 11, and Comparative Example 1, evaluation was performed using an element produced using a cell having a cell gap of 3.5 μm without a polyimide alignment film having an electrode on upper and lower substrates for a vertical electric field. Regarding the response, a voltage was applied on a backlight using a luminance meter (commercially available from Yokogawa Electric Corporation), and a transmittance on the electrode was measured. In addition, in Examples 2 and 6, evaluation was performed using an element produced using a cell having a cell gap of 3.5 μm without a polyimide alignment film having an electrode on one side substrate for a horizontal electric field. Regarding the response, a voltage was applied on a backlight using a luminance meter (commercially available from Yokogawa Electric Corporation), and a transmittance on the electrode was measured. In the other experiments, evaluation was performed using a cell for a vertical electric field.

Figure 2:
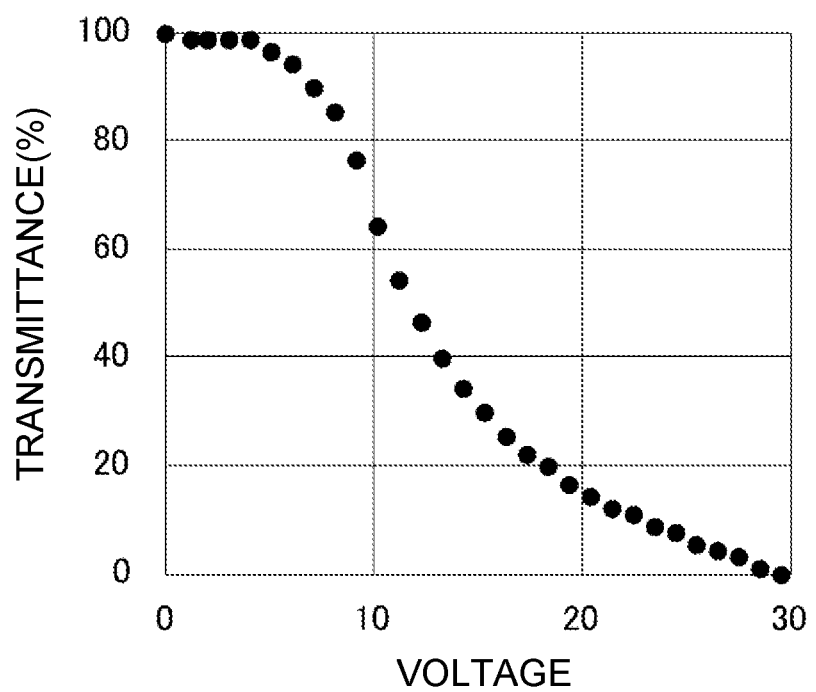
FIG. 2 is a graph showing a relationship between a voltage and a transmittance when a voltage is applied to an element obtained in Example 2.

The results are shown in Table 4. Here, in Examples 1 and 2, in this response test, a relationship between a voltage and a transmittance when a voltage was applied to the element is shown in FIG. 1 and FIG. 2.

alignment film and a polarizing plate. The liquid crystal element can be used for a smart window, electronic paper, and the like.

What is claimed is:

1. A liquid crystal composition including one or more liquid crystalline compounds, one or more polymerizable compounds, and one or more dichroic dyes, and in which the one or more polymerizable compounds includes at least one compound selected from the group of compounds represented by Formula (1):

$$R^{11}\text{-MES-Sp}^{11}\text{-P}^{11} \qquad (1)$$

in Formula (1), $R^{11}$ is an alkyl group having 1 to 15 carbon atoms, and in this alkyl group, at least one —$CH_2$— is optionally substituted with —O— or —S—, and at least one

TABLE 4

Alignment of liquid crystal molecules and response of liquid crystal element

| | Voltage is applied or not | Liquid crystal composition | Polymerizable compound having a polar group | | Polymerizable compound | | Dichroic dye | | Alignment | Response |
|---|---|---|---|---|---|---|---|---|---|---|
| | | | Compound | Amount added (parts by weight) | Compound | Amount added (parts by weight) | Compound | Amount added (parts by weight) | | |
| Example 1 | Applied | M4 | PC-1 | 3 | — | — | DD-1 | 2.00 | ○ | ○ |
| | | | | | | | DD-2 | 0.75 | | |
| | | | | | | | DD-3 | 2.25 | | |
| Example 2 | Not applied | M4 | PC-1 | 3 | — | — | DD-1 | 0.40 | ○ | ○ |
| | | | | | | | DD-2 | 0.15 | | |
| | | | | | | | DD-3 | 0.45 | | |
| Example 3 | Applied | M1 | PC-2 | 3 | — | — | DD-1 | 2.00 | ○ | ○ |
| Example 4 | Applied | M2 | PC-1 | 3 | RM-1 | 0.3 | DD-4 | 1.00 | ○ | ○ |
| Example 5 | Applied | M3 | PC-3 | 3 | — | — | DD-2 | 0.30 | ○ | ○ |
| | | | | | | | DD-3 | 0.70 | | |
| Example 6 | Not applied | M4 | PC-4 | 3 | RM-1 | 0.3 | DD-2 | 1.00 | ○ | ○ |
| Example 7 | Applied | M5 | PC-5 | 2.5 | RM-1 | 0.3 | DD-3 | 0.80 | ○ | ○ |
| Example 8 | Applied | M6 | PC-6 | 2.5 | — | — | DD-3 | 0.50 | ○ | ○ |
| | | | | | | | DD-4 | 0.30 | | |
| Example 9 | Applied | M7 | PC-7 | 2.5 | RM-1 | 0.3 | DD-2 | 5.00 | ○ | ○ |
| Example 10 | Applied | M8 | PC-8 | 3 | — | — | DD-1 | 8.00 | ○ | ○ |
| Example 11 | Applied | M9 | PC-6 | 3 | — | — | DD-1 | 0.60 | ○ | ○ |
| | | | | | | | DD-2 | 0.25 | | |
| | | | | | | | DD-3 | 0.55 | | |
| Comparative Example 1 | Applied | M4 | PC-1 | 3 | — | — | — | — | — | X |

As can be understood from Table 4, in Examples 1 to 11, the composition, types and concentrations of the dichroic dye and the polymerizable compound having a polar group were changed, but poor alignment was not observed. The results indicate that vertical alignment was favorable even if the element had no alignment film, and liquid crystal molecules were stably aligned. In Examples 4, 6, 7 and 9, while Polymerizable Compound (RM-1) was additionally added, the same results were obtained. In addition, in Examples 1 to 11, it was found that, when a voltage was applied to the element, the transmittance was changed and the responsiveness was favorable.

On the other hand, in Comparative Example 1, since no dichroic dye was used, the responsiveness was poor.

A liquid crystal composition of the disclosure can be used as a liquid crystal element in a GH mode without an —$(CH_2)_2$— is optionally substituted with —CH=CH— or —C≡C—, and in these groups, at least one hydrogen atom is optionally substituted with a halogen atom;

MES is a mesogenic group having at least one ring, and in the ring in MES, at least one hydrogen atom is optionally substituted with -Sp$^{11}$-P$^{11}$;

Sp$^{11}$ is a single bond or an alkylene group having 1 to 10 carbon atoms, and in this alkylene group, at least one —$CH_2$— is optionally substituted with —O—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom, and in these groups, at least one hydrogen atom is optionally substituted with a group selected from the groups represented by Formula (1a);

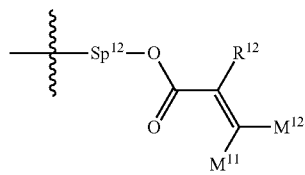
(1a)

in Formula (1a),
Sp$^{12}$ is a single bond or an alkylene group having 1 to 10 carbon atoms, and in this Sp$^{12}$, at least one —CH$_2$— is optionally substituted with —O—, —CO—, —COO—, —OCO—, or —OCOO—, at least one —(CH$_2$)$_2$— is optionally substituted with —CH=CH— or —C≡C—, and at least one hydrogen atom is optionally substituted with a halogen atom;
M$^{11}$ and M$^{12}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and
R$^{12}$ is an alkyl group having 1 to 15 carbon atoms, and in this R$^{12}$, at least one —CH$_2$— is optionally substituted with —O— or —S—, and at least one —(CH$_2$)$_2$— is optionally substituted with —CH=CH— or —C≡C—, and at least one hydrogen atom is optionally substituted with a halogen atom;
in Formula (1),
P$^{11}$ is a polymerizable group or a polar group, or a group having both polymerization and polarity, wherein
P$^{11}$ is a group represented by Formula (1 b) when none of hydrogen atoms is substituted with a group selected from the groups represented by Formula (1a) in Sp$^{11}$,

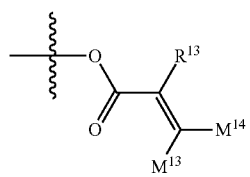
(1b)

in Formula (1b),
M$^{13}$ and M$^{14}$ independently represent a hydrogen atom, a halogen atom, an alkyl group having 1 to 5 carbon atoms, or an alkyl group having 1 to 5 carbon atoms in which at least one hydrogen atom is substituted with a halogen atom;
R$^{13}$ is a group selected from the groups represented by Formula (1c), Formula (1d), and Formula (1e);

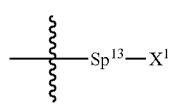
(1c)

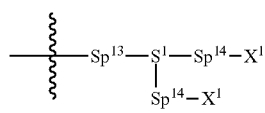
(1d)

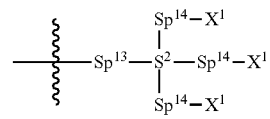
(1e)

in Formula (1c), Formula (1d), and Formula (1e),
Sp$^{13}$ and Sp$^{14}$ independently represent a single bond or an alkylene group having 1 to 10 carbon atoms, and in this alkylene group, at least one —CH$_2$— is optionally substituted with —O—, —NH—, —CO—, —COO—, —OCO—, or —OCOO—, and at least one —(CH$_2$)$_2$— is optionally substituted with —CH=CH— or —C≡C— and in these groups, at least one hydrogen atom is optionally substituted with a halogen atom;
S$^1$ is >CH— or >N—;
S$^2$ is >C< or >Si<;
X$^1$ independently represent —OH, —NH$_2$, —OR$^{14}$, —N(R$^{14}$)$_2$, a group represented by Formula (x1), —COOH, —SH, —B(OH)$_2$, or a group represented by —Si(R$^{14}$)$_3$, and here, R$^{14}$ independently represent a hydrogen atom or an alkyl group having 1 to 10 carbon atoms, and in this alkyl group, at least one —CH$_2$— is optionally substituted with —O—, at least one —(CH$_2$)$_2$— is optionally substituted with —CH=CH—, and in these groups, at least one hydrogen atom is optionally substituted with a halogen atom, and w in Formula (x1) is 1, 2, 3 or 4;

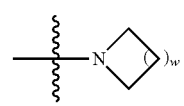
(x1)

in Formula (1),
when at least one hydrogen atom is substituted with a group selected from the groups represented by Formula (1a) in Sp$^{11}$, or when none of hydrogen atoms is substituted with a group selected from the groups represented by Formula (1a) in Sp$^{11}$ and P$^{11}$ is not a group represented by Formula (1b), P$^{11}$ is a group selected from the groups represented by Formula (1f) and Formula (1g);

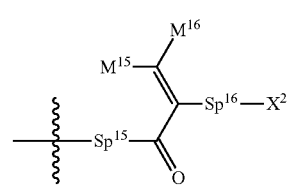
(1f)

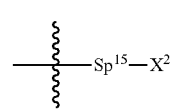
(1g)

in Formulae (1f and 1g),
Sp$^{15}$ is a single bond or an alkylene group having 1 to 10 carbon atoms, and in this Sp$^{15}$, at least one —CH$_2$— is optionally substituted with —O—, —NH—, —CO—, —COO—, —OCO—, or —OCOO—, and at least one —(CH$_2$)$_2$— is optionally substituted with —CH═CH— or —C≡C—, and in these groups, at least one hydrogen atom is optionally substituted with a halogen atom;

Sp$^{16}$ is a single bond or an alkylene group having 1 to 10 carbon atoms, and in this Sp$^{16}$, at least one —CH$_2$— is optionally substituted with —O—, —NH—, —CO—, —COO—, —OCO—, or —OCOO—, at least one —(CH$_2$)$_2$— is optionally substituted with —CH═CH— or —C≡C— and at least one hydrogen atom is optionally substituted with a halogen atom;

M$^{15}$ and M$^{16}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and X$^2$ is —OH, —NH$_2$, —OR$^{15}$, —N(R$^{15}$)$_2$, —COOH, —SH, —B(OH)$_2$, or —Si(R$^{15}$)$_3$, and here, R$^{15}$ independently represent a hydrogen atom or an alkyl group having 1 to 10 carbon atoms, and in this R$^{15}$, at least one —CH$_2$— is optionally substituted with —O—, at least one —(CH$_2$)$_2$— is optionally substituted with —CH═CH—, and at least one hydrogen atom is optionally substituted with a halogen atom;

in Formula (1), when at least one hydrogen atom in the ring in MES is substituted with -Sp$^{11}$-P$^{11}$, in the ring in MES, at least one -Sp$^{11}$-P$^{11}$ is a group selected from the groups represented by Formula (1h);

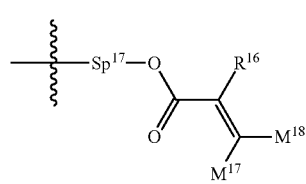

(1h)

in Formula (1h),

Sp$^{17}$ is a single bond or an alkylene group having 1 to 10 carbon atoms, and in this Sp$^{17}$, at least one —CH$_2$— is optionally substituted with —O—, —CO—, —COO—, —OCO—, or —OCOO—, at least one —(CH$_2$)$_2$— is optionally substituted with —CH═CH— or —C≡C—, and at least one hydrogen atom is optionally substituted with a halogen atom;

M$^{17}$ and M$^{18}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and R$^{16}$ is an alkyl group having 1 to 15 carbon atoms, and in this R$^{16}$, at least one —CH$_2$— is optionally substituted with —O— or —S—, at least one —(CH$_2$)$_2$— is optionally substituted with —CH═CH— or —C≡C—, and at least one hydrogen atom is optionally substituted with a halogen atom.

2. The liquid crystal composition according to claim 1, wherein the one or more polymerizable compounds include at least one compound selected from the group of compounds represented by Formula (1-1):

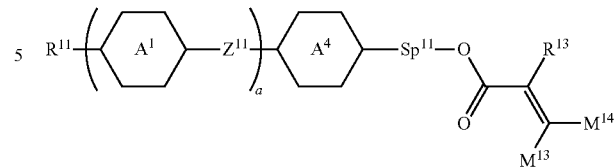

(1-1)

in Formula (1-1),

R$^{11}$ is an alkyl group having 1 to 15 carbon atoms, and in this alkyl group, at least one —CH$_2$— is optionally substituted with —O— or —S—, and at least one —(CH$_2$)$_2$— is optionally substituted with —CH═CH— or —C≡C—, and in these groups, at least one hydrogen atom is optionally substituted with a halogen atom;

ring A$^1$ and ring A$^4$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -Sp$^{11}$-P$^{11}$, and in these groups, at least one hydrogen atom is optionally substituted with a fluorine or chlorine atom;

Z$^{11}$ independently represent a single bond or an alkylene group having 1 to 10 carbon atoms, and in this alkylene group, at least one —CH$_2$— is optionally substituted with —O—, —CO—, —COO—, —OCO—, or —OCOO—, and at least one —(CH$_2$)$_2$— is optionally substituted with —CH═CH— or —C≡C—, and in these groups, at least one hydrogen atom is optionally substituted with a halogen atom;

a is 0, 1, 2, 3, or 4;

Sp$^{11}$ is a single bond or an alkylene group having 1 to 10 carbon atoms, and in this alkylene group, at least one —CH$_2$— is optionally substituted with —O—, —CO—, —COO—, —OCO—, or —OCOO—, and at least one —(CH$_2$)$_2$— is optionally substituted with —CH═CH— or and in these groups, at least one hydrogen atom is optionally substituted with a halogen atom;

M$^{13}$ and M$^{14}$ independently represent a hydrogen atom, a halogen atom, an alkyl group having 1 to 5 carbon atoms, or an alkyl group having 1 to 5 carbon atoms in which at least one hydrogen atom is substituted with a halogen atom;

R$^{13}$ is a group represented by Formula (1c) or Formula (1d),

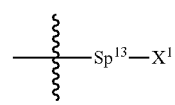

(1c)

-continued

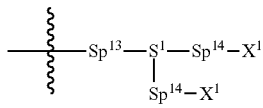
(1d)

in Formula (1c) and Formula (1d), $Sp^{13}$ and $Sp^{14}$ independently represent a single bond or an alkylene group having 1 to 10 carbon atoms, and in this alkylene group, at least one —$CH_2$— is optionally substituted with —O—, —NH—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom;

$S^1$ is >CH— or >N—; and $X^1$ independently represent —OH, —$NH_2$, —$OR^{14}$, —$N(R^{14})_2$, a group represented by Formula (x1), —COOH, —SH, —$B(OH)_2$, or a group represented by —$Si(R^{14})_3$, and here, $R^{14}$ independently represent a hydrogen atom or an alkyl group having 1 to 10 carbon atoms, and in this alkyl group, at least one —$CH_2$— is optionally substituted with —O—, at least one —$(CH_2)_2$— is optionally substituted with —CH=CH—, and in these groups, at least one hydrogen atom is optionally substituted with a halogen atom, and w in Formula (x1) is 1, 2, 3 or 4;

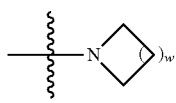
(x1)

3. The liquid crystal composition according to claim 1, wherein the one or more polymerizable compounds include at least one compound selected from the group of compounds represented by Formula (1-2),

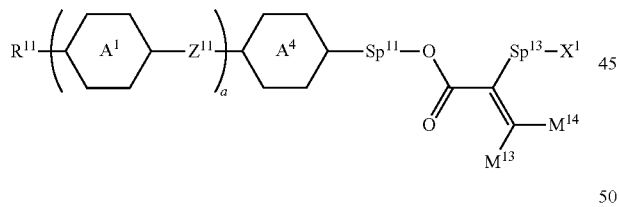
(1-2)

in Formula (1-2), $R^{11}$ is an alkyl group having 1 to 15 carbon atoms, an alkenyl group having 2 to 15 carbon atoms, an alkoxy group having 1 to 14 carbon atoms, or an alkenyloxy group having 2 to 14 carbon atoms, and in these groups, at least one hydrogen atom is optionally substituted with a fluorine or chlorine atom;

ring $A^1$ and ring $A^4$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -$Sp^{11}$-$P^{11}$, in these groups, at least one hydrogen atom is optionally substituted with a fluorine or chlorine atom;

$Z^{11}$ independently represent a single bond, —$(CH_2)_2$—, —CH=CH—, —C≡C—, —COO—, —OCO—, —$CF_2O$—, —$OCF_2$—, —$CH_2O$—, —$OCH_2$—, or —CF=CF—;

a is 0, 1, 2, 3, or 4;

$Sp^{11}$ and $Sp^{13}$ independently represent a single bond or an alkylene group having 1 to 10 carbon atoms, and in this alkylene group, at least one —$CH_2$— is optionally substituted with —O—, —COO—, or —OCO—, at least one —$(CH_2)_2$— is optionally substituted with —CH=CH—, and in these groups, at least one hydrogen atom is optionally substituted with a fluorine or chlorine atom;

$M^{13}$ and $M^{14}$ independently represent a hydrogen atom, a fluorine atom, an alkyl group having 1 to 5 carbon atoms, or an alkyl group having 1 to 5 carbon atoms in which at least one hydrogen atom is substituted with a fluorine atom; and $X^1$ is —OH, —$NH_2$, —$OR^{14}$, —$N(R^{14})_2$, a group represented by Formula (x1), —COOH, —SH, —$B(OH)_2$, or a group represented by —$Si(R^{14})_3$, and here, $R^{14}$ independently represent a hydrogen atom or an alkyl group having 1 to 10 carbon atoms, and in this alkyl group, at least one —$CH_2$— is optionally substituted with —O—, at least one —$(CH_2)_2$— is optionally substituted with —CH=CH—, and in these groups, at least one hydrogen atom is optionally substituted with a fluorine or chlorine atom, and in Formula (x1), w is 1, 2, 3 or 4,

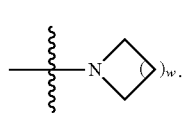
(x1)

4. The liquid crystal composition according to claim 1, wherein the one or more polymerizable compounds include at least one compound selected from the group of compounds represented by Formula (1-3) to Formula (1-6):

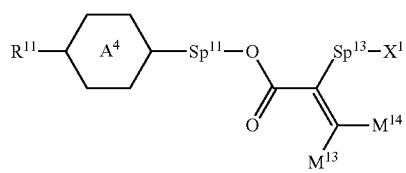
(1-3)

-continued (1-4)
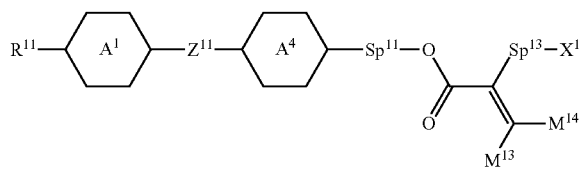

(1-5)
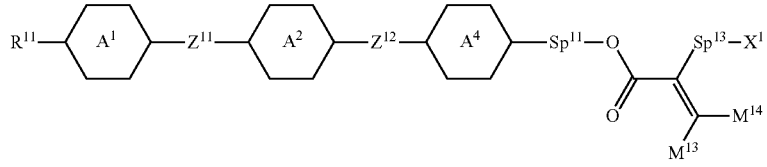

(1-6)
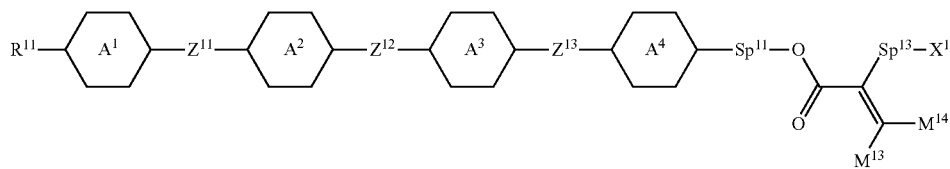

in Formula (1-3) to Formula (1-6), $R^{11}$ is an alkyl group having 1 to 15 carbon atoms, an alkenyl group having 2 to 15 carbon atoms, an alkoxy group having 1 to 14 carbon atoms, or an alkenyloxy group having 2 to 14 carbon atoms, and in these groups, at least one hydrogen atom is optionally substituted with a fluorine atom;

ring $A^1$, ring $A^2$, ring $A^3$, and ring $A^4$ independently represent 1,4-cyclohexylene, 1,4-cyclohexenylene, 1,4-phenylene, naphthalene-2,6-diyl, decahydronaphthalene-2,6-diyl, tetrahydropyran-2,5-diyl, 1,3-dioxane-2,5-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 7 carbon atoms, an alkenyl group having 2 to 7 carbon atoms, or an alkoxy group having 1 to 6 carbon atoms;

$Z^{11}$, $Z^{12}$, and $Z^{13}$ independently represent a single bond, —(CH$_2$)$_2$—, —CH=CH—, —COO—, —OCO—, —CF$_2$O—, —OCF$_2$—, —CH$_2$O—, —OCH$_2$—, or —CF=CF—;

$Sp^{11}$ and $Sp^{13}$ independently represent a single bond or an alkylene group having 1 to 7 carbon atoms, and in this alkylene group, at least one —CH$_2$— is optionally substituted with —O—, —COO—, or —OCO—, at least one —(CH$_2$)$_2$— is optionally substituted with —CH=CH—, and in these groups, at least one hydrogen atom is optionally substituted with a fluorine atom;

$M^{13}$ and $M^{14}$ independently represent a hydrogen atom, a fluorine atom, a methyl group, an ethyl group, or a trifluoromethyl group; and $X^1$ is —OH, —NH$_2$, —OR$^{14}$, —N(R$^{14}$)$_2$, or a group represented by Formula (x1) or —Si(R$^{14}$)$_3$, and here, $R^{14}$ independently represent a hydrogen atom or alkyl group having 1 to 5 carbon atoms, and in this alkyl group, at least one —CH$_2$— is optionally substituted with —O—, at least one —(CH$_2$)$_2$—is optionally substituted with —CH=CH—, and in these groups, at least one hydrogen atom is optionally substituted with a fluorine atom, and w in Formula (x1) is 1, 2, 3 or 4.

(x1)
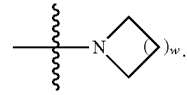

5. The liquid crystal composition according to claim 1, wherein the one or more polymerizable compounds include at least one compound selected from the group of compounds represented by Formula (1-7) to Formula (1-10), (1-7)
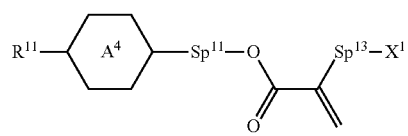

(1-8)
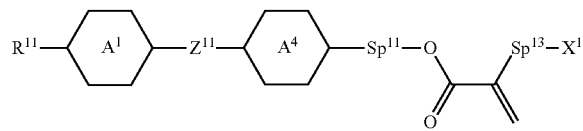

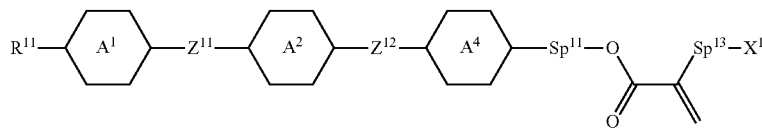

(1-9)

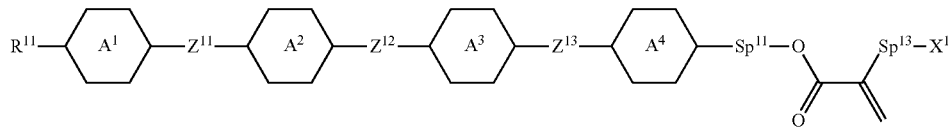

(1-10)

in Formula (1-7) to Formula (1-10), $R^{11}$ is an alkyl group having 1 to 10 carbon atoms, an alkenyl group having 2 to 10 carbon atoms, or an alkoxy group having 1 to 9 carbon atoms, and in these groups, at least one hydrogen atom is optionally substituted with a fluorine atom;

ring $A^1$, ring $A^2$, ring $A^3$, and ring $A^4$ independently represent 1,4-cyclohexylene, 1,4-cyclohexenylene, 1,4-phenylene, tetrahydropyran-2,5-diyl, 1,3-dioxane-2,5-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 5 carbon atoms, an alkenyl group having 2 to 5 carbon atoms, or an alkoxy group having 1 to 4 carbon atoms;

$Z^{11}$, $Z^{12}$, and $Z^{13}$ independently represent a single bond, —(CH$_2$)$_2$—, or —CH═CH—;

$Sp^{11}$ is a single bond or an alkylene group having 1 to 7 carbon atoms, and in this alkylene group, at least one —CH$_2$— is optionally substituted with —O—, and at least one —(CH$_2$)$_2$— is optionally substituted with —CH═CH—;

$Sp^{13}$ is an alkylene group having 1 to 7 carbon atoms, and in this alkylene group, at least one —CH$_2$— is optionally substituted with —O—; and $X^1$ is —OH, —NH$_2$, or —N(R$^{14}$)$_2$, and here, $R^{14}$ independently represent a hydrogen atom or alkyl group having 1 to 5 carbon atoms, and in this alkyl group, at least one —CH$_2$— is optionally substituted with —O—, at least one —(CH$_2$)$_2$— is optionally substituted with —CH═CH—, and in these groups, at least one hydrogen atom is optionally substituted with a fluorine atom.

6. The liquid crystal composition according to claim 1, wherein the one or more polymerizable compounds include at least one compound selected from the group of compounds represented by Formula (1-11) to Formula (1-14),

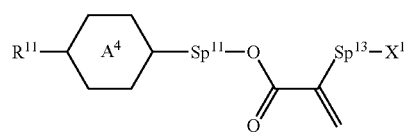

(1-11)

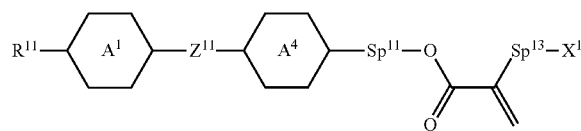

(1-12)

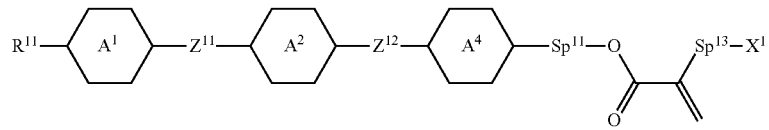

(1-13)

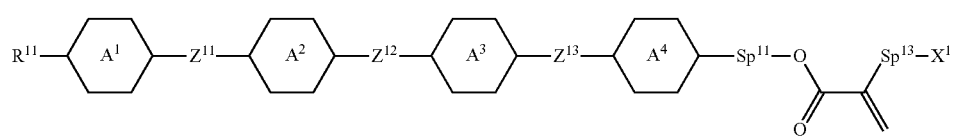

(1-14)

in Formula (1-11) to Formula (1-14), $R^{11}$ is an alkyl group having 1 to 10 carbon atoms, an alkenyl group having 2 to 10 carbon atoms, or an alkoxy group having 1 to 9 carbon atoms, and in these groups, at least one hydrogen atom is optionally substituted with a fluorine atom;

ring $A^1$, ring $A^2$, ring $A^3$ and ring $A^4$ independently represent 1,4-cyclohexylene, 1,4-phenylene, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom or alkyl group having 1 to 5 carbon atoms;

$Z^{11}$, $Z^{12}$, and $Z^{13}$ independently represent a single bond or —(CH$_2$)$_2$—;

$Sp^{11}$ is a single bond or an alkylene group having 1 to 5 carbon atoms, and in this alkylene group, at least one —CH$_2$— is optionally substituted with —O—;

$Sp^{13}$ is an alkylene group having 1 to 5 carbon atoms, and in this alkylene group, at least one —CH$_2$— is optionally substituted with —O—; and $X^1$ is —OH, —NH$_2$, or —N(R$^{14}$)$_2$, and here, $R^{14}$ independently represent a hydrogen atom or alkyl group having 1 to 5 carbon atoms, and in this alkyl group, at least one —CH$_2$— is optionally substituted with —O—, at least one —(CH$_2$)$_2$— is optionally substituted with —CH═CH—, and in these groups, at least one hydrogen atom is optionally substituted with a fluorine atom.

7. The liquid crystal composition according to claim 1, wherein the one or more polymerizable compounds include at least one compound selected from the group of compounds represented by Formula (1-15) to Formula (1-31),

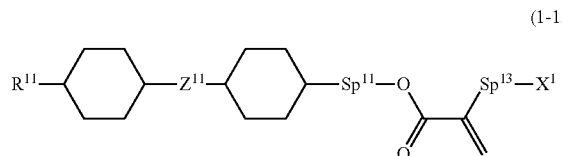
(1-15)

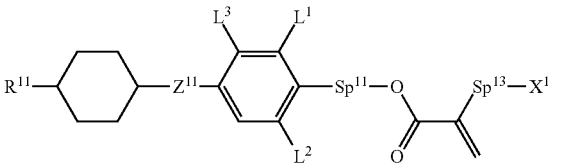
(1-16)

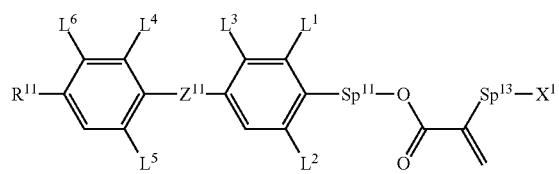
(1-17)

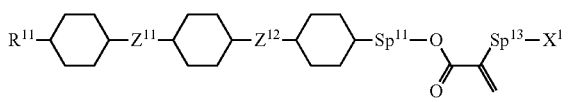
(1-18)

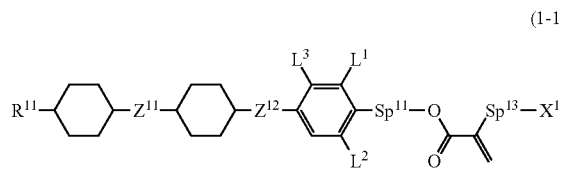
(1-19)

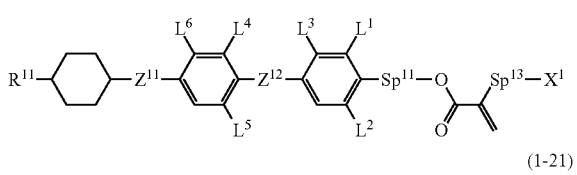
(1-20)

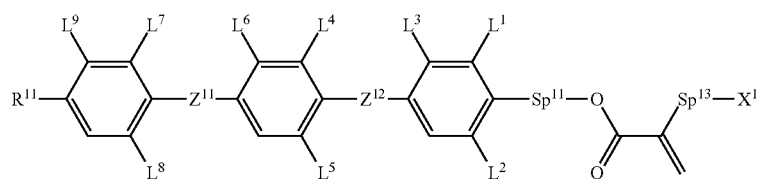
(1-21)

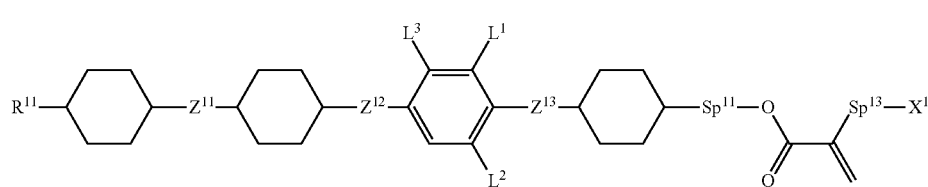
(1-22)

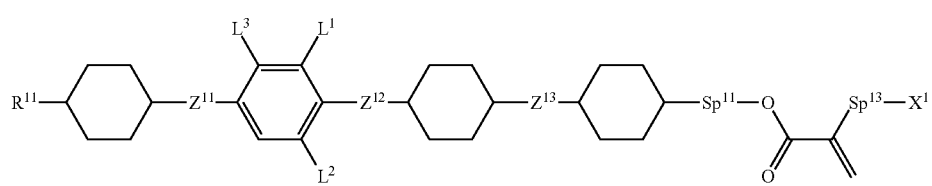
(1-23)

-continued

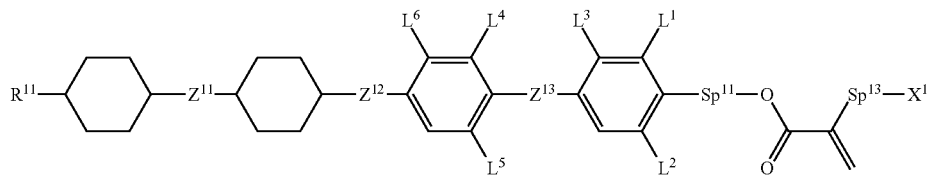
(1-24)

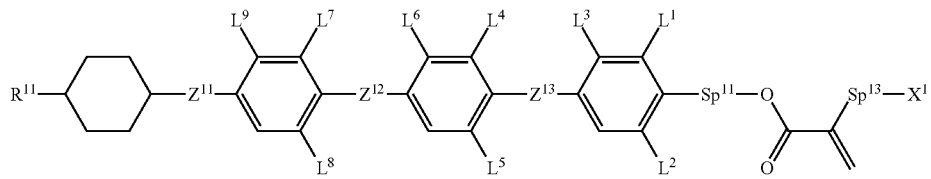
(1-25)

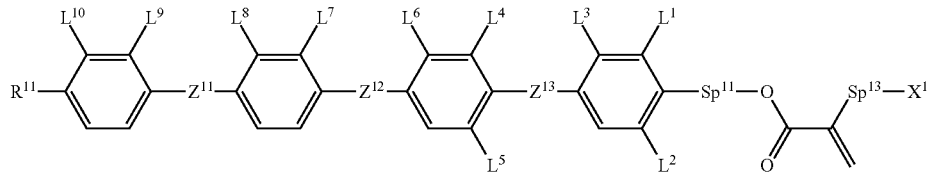
(1-26)

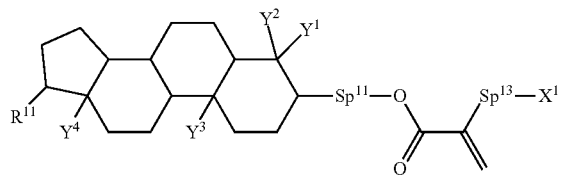
(1-27)

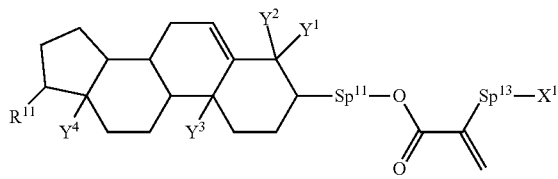
(1-28)

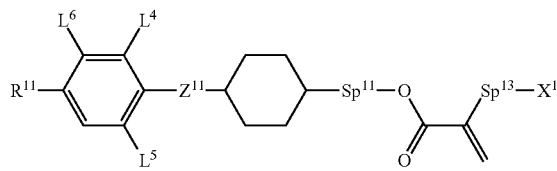
(1-29)

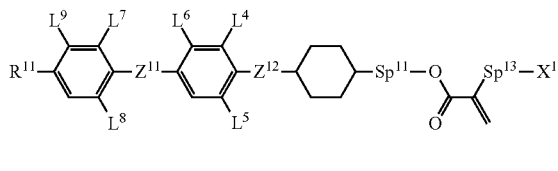
(1-30)

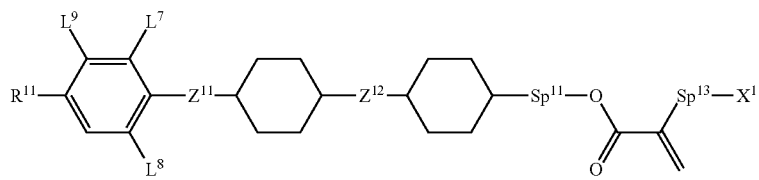
(1-31)

in Formula (1-15) to Formula (1-31), $R^{11}$ is an alkyl group having 1 to 10 carbon atoms, an alkenyl group having 2 to 10 carbon atoms, or an alkoxy group having 1 to 9 carbon atoms, and in these groups, at least one hydrogen atom is optionally substituted with a fluorine atom;

$Z^{11}$, $Z^{12}$, and $Z^{13}$ independently represent a single bond or —(CH$_2$)$_2$—;

Sp$^{11}$ is a single bond or an alkylene group having 1 to 5 carbon atoms, and in this alkylene group, at least one —CH$_2$— is optionally substituted with —O—;

Sp$^{13}$ is an alkylene group having 1 to 5 carbon atoms, and in this alkylene group, at least one —CH$_2$— is optionally substituted with —O—;

$L^1$, $L^2$, $L^3$, $L^4$, $L^5$, $L^6$, $L^7$, $L^8$, $L^9$, and $L^{10}$ independently represent a hydrogen atom, a fluorine atom, a methyl group, or an ethyl group;

$Y^1$, $Y^2$, $Y^3$, and $Y^4$ independently represent a hydrogen atom or a methyl group; and $X^1$ is —OH, —NH$_2$, or —N(R$^{14}$)$_2$, and here, R$^{14}$ independently represent a hydrogen atom or alkyl group having 1 to 4 carbon atoms, and in this alkyl group, at least one —CH$_2$— is optionally substituted with —O—, and in these groups, at least one hydrogen atom is optionally substituted with a fluorine atom.

8. The liquid crystal composition according to claim 1, wherein the one or more polymerizable compounds include at least one compound selected from the group of compounds represented by Formula (1-32) to Formula (1-43),

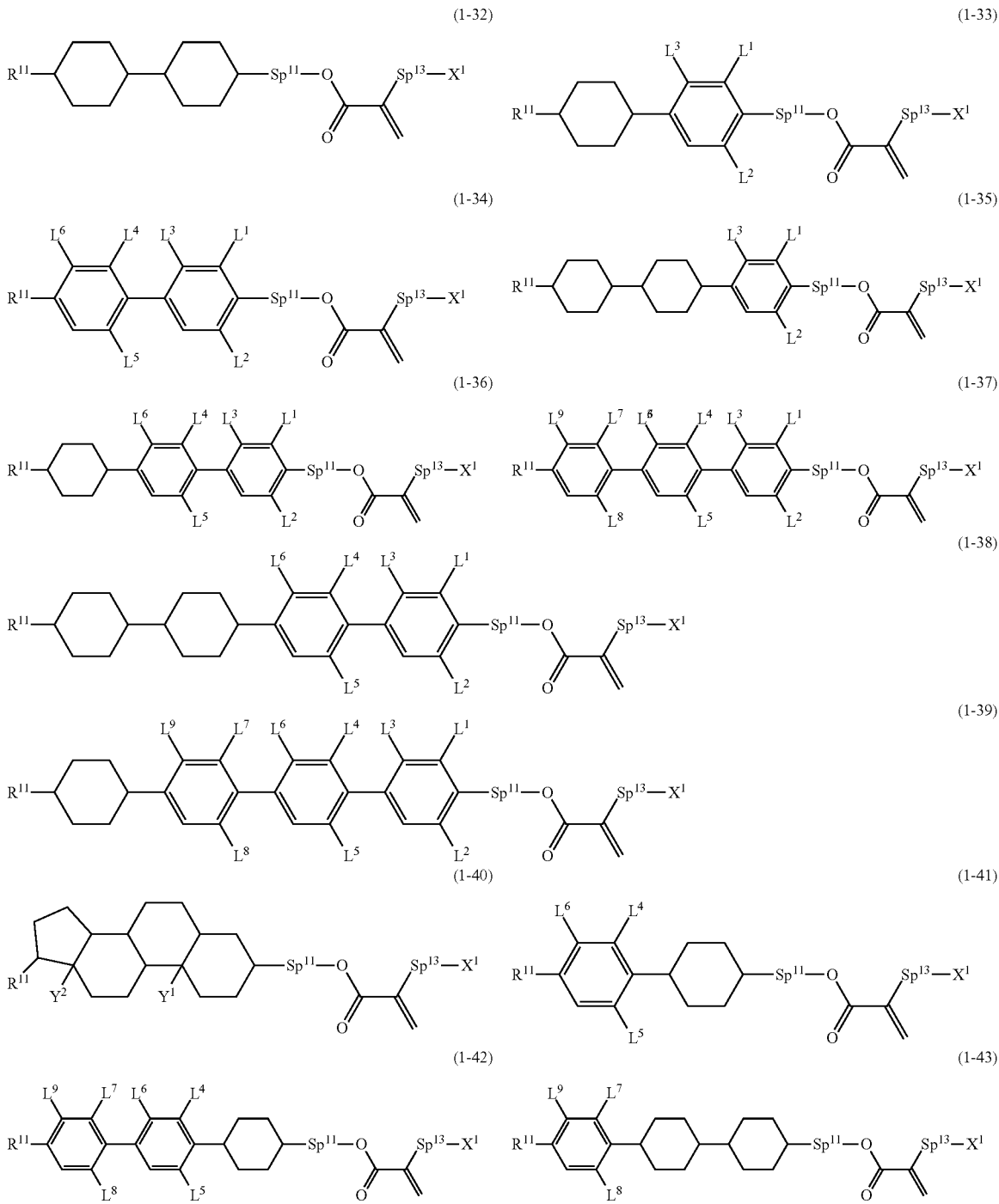

in Formula (1-32) to Formula (1-43), $R^{11}$ is an alkyl group having 1 to 10 carbon atoms;

$Sp^{11}$ is a single bond or an alkylene group having 1 to 5 carbon atoms, and in this alkylene group, at least one —$CH_2$— is optionally substituted with —O—, and in these groups, at least one hydrogen atom is optionally substituted with a fluorine atom;

$Sp^{13}$ is an alkylene group having 1 to 5 carbon atoms, and in this alkylene group, at least one —$CH_2$— is optionally substituted with —O—;

$L^1$, $L^2$, $L^3$, $L^4$, $L^5$, $L^6$, $L^7$, $L^8$, and $L^9$ independently represent a hydrogen atom, a fluorine atom, a methyl group, or an ethyl group;

$Y^1$ and $Y^2$ independently represent a hydrogen atom or a methyl group; and $X^1$ is —OH, —NH$_2$, or —N(R$^{14}$)$_2$, and here, R$^{14}$ independently represent a hydrogen atom or alkyl group having 1 to 4 carbon atoms, and in this alkyl group, at least one —CH$_2$— is optionally substituted with —O—.

9. The liquid crystal composition according to claim 1, wherein the one or more polymerizable compounds include at least one compound selected from the group of compounds represented by Formula (1-44) to Formula (1-63), (1-44)
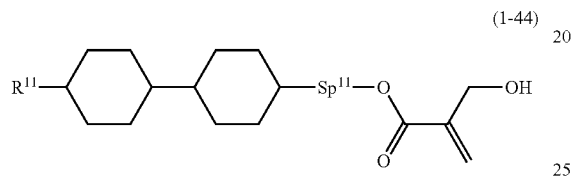

(1-45)
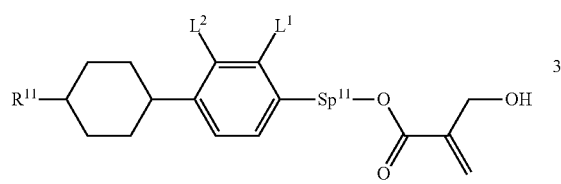

(1-46)
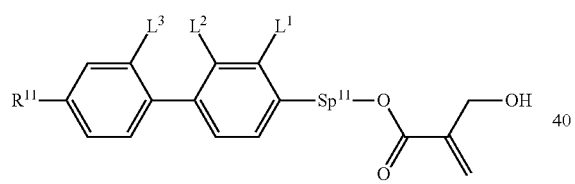

(1-47)
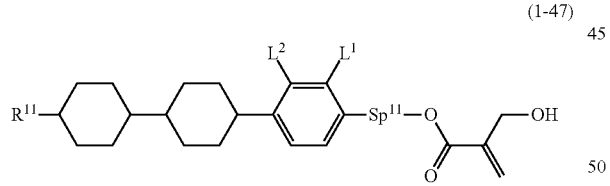

(1-48)
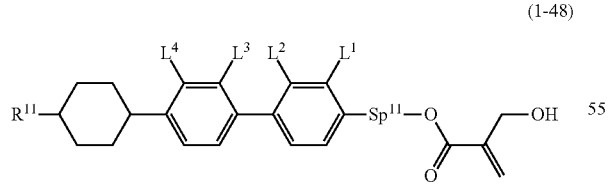

(1-49)
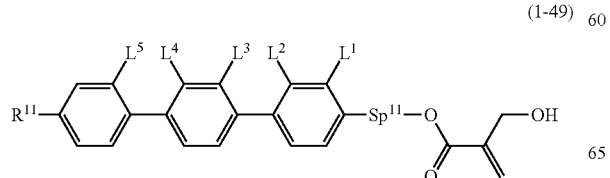

-continued (1-50)
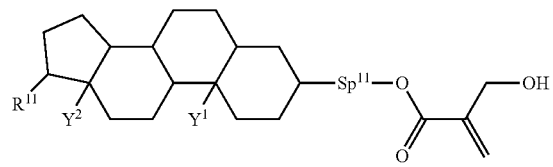

(1-51)
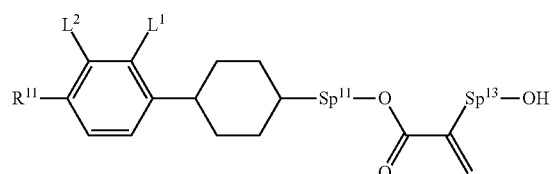

(1-52)
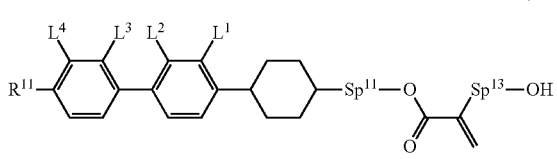

(1-53)
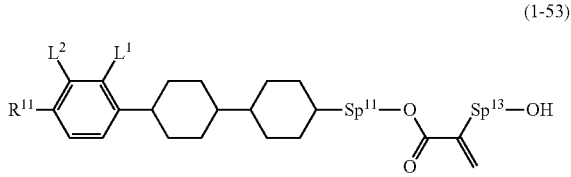

(1-54)
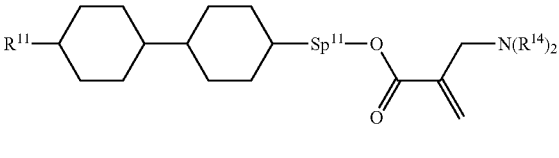

(1-55)
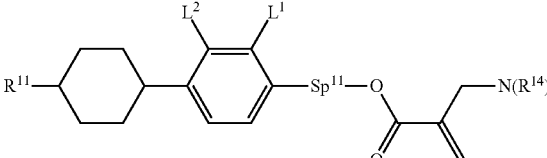

(1-56)
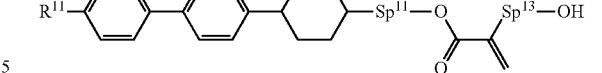

(1-57)
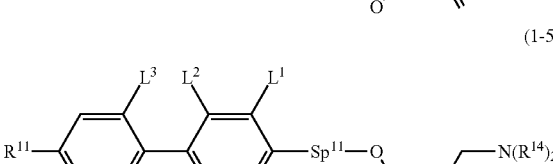

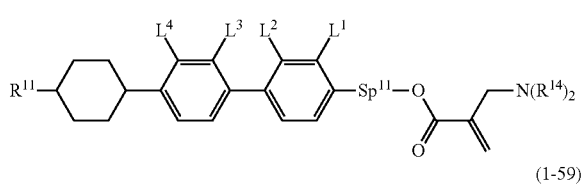
(1-58)

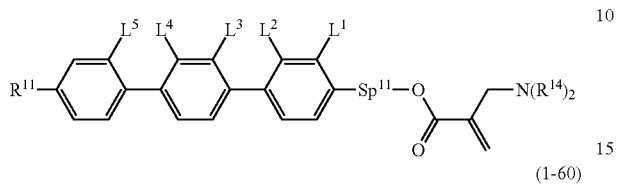
(1-59)

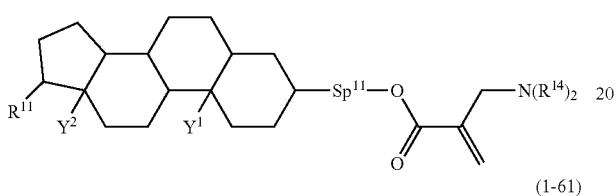
(1-60)

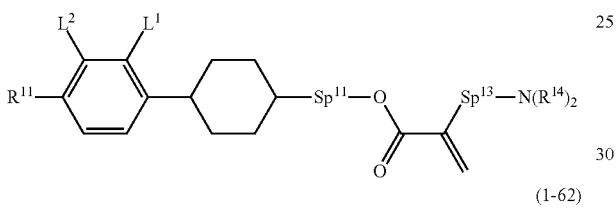
(1-61)

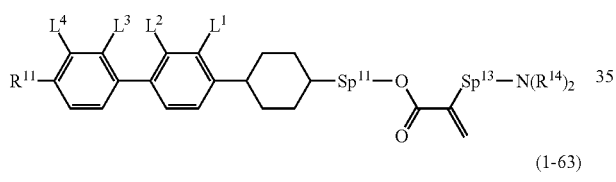
(1-62)

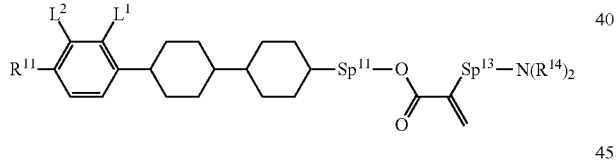
(1-63)

in Formula (1-44) to Formula (1-63),
$R^{11}$ is an alkyl group having 1 to 10 carbon atoms;
$Sp^{11}$ is a single bond or an alkylene group having 1 to 3 carbon atoms, and in this alkylene group, at least one —$CH_2$— is optionally substituted with —O—, and in these groups, at least one hydrogen atom is optionally substituted with a fluorine atom;
$Sp^{13}$ is an alkylene group having 1 to 5 carbon atoms, and in this alkylene group, at least one —$CH_2$— is optionally substituted with —O—;
$L^1$, $L^2$, $L^3$, $L^4$, and $L^5$ independently represent a hydrogen atom, a fluorine atom, a methyl group, or an ethyl group;
$Y^1$ and $Y^2$ independently represent a hydrogen atom or a methyl group; and
$R^{14}$ independently represent a hydrogen atom, a methyl group or an ethyl group.

10. The liquid crystal composition according to claim 1, wherein the one or more polymerizable compounds include at least one compound selected from the group of compounds represented by Formula (1-64),

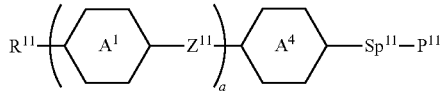
(1-64)

in Formula (1-64),
$R^{11}$ is an alkyl group having 1 to 15 carbon atoms, and in this $R^{11}$, at least one —$CH_2$— is optionally substituted with —O— or —S—, at least one —$(CH_2)_2$— is optionally substituted with —CH=CH— or —C≡C—, and at least one hydrogen atom is optionally substituted with a halogen atom;
ring $A^1$ and ring $A^4$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -$Sp^{11}$-$P^{11}$, and in these groups, at least one hydrogen atom is optionally substituted with a fluorine or chlorine atom;
a is 0, 1, 2, 3, or 4;
$Z^{11}$ independently represent a single bond or an alkylene group having 1 to 6 carbon atoms, and in this $Z^{11}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a fluorine or chlorine atom; and
$Sp^{11}$ is a single bond or an alkylene group having 1 to 10 carbon atoms, and in this $Sp^{11}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a halogen atom, and in these groups, at least one hydrogen atom is substituted with a group selected from the groups represented by Formula (1a);

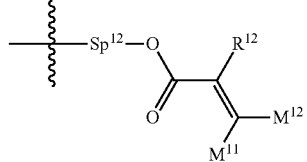
(1a)

in Formula (1a),
$Sp^{12}$ is a single bond or an alkylene group having 1 to 10 carbon atoms, and in this $Sp^{12}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a halogen atom;

$M^{11}$ and $M^{12}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and $R^{12}$ is an alkyl group having 1 to 15 carbon atoms, and in this $R^{12}$, at least one —CH₂— is optionally substituted with —O— or —S—, and at least one —(CH₂)₂— is optionally substituted with —CH=CH— or and at least one hydrogen atom is optionally substituted with a halogen atom;

in Formula (1-64), $P^{11}$ is a group selected from the groups represented by Formula (1f) and Formula (1g);

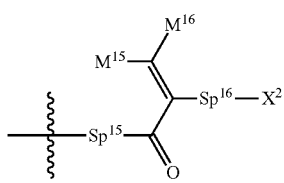
(1f)

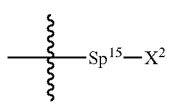
(1g)

in Formulae (1f) and (1g), $Sp^{15}$ is a single bond or an alkylene group having 1 to 10 carbon atoms, and in this $Sp^{15}$, at least one —CH₂— is optionally substituted with —O—, —NH—, —CO—, —COO—, —OCO—, or —OCOO—, and at least one —(CH₂)₂— is optionally substituted with —CH=CH— or —C≡C—, and in these groups, at least one hydrogen atom is optionally substituted with a halogen atom;

$Sp^{16}$ is a single bond or an alkylene group having 1 to 10 carbon atoms, and in this $Sp^{16}$, at least one —CH₂— is optionally substituted with —O—, —NH—, —CO—, —COO—, —OCO—, or —OCOO—, at least one —(CH₂)₂— is optionally substituted with —CH=CH— or —C≡C—, and at least one hydrogen atom is optionally substituted with a halogen atom;

$M^{15}$ and $^{16}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and $X^2$ is —OH, —NH₂, —OR¹⁵, —N(R¹⁵)₂, —COOH, —SH, —B(OH)₂, or —Si(R¹⁵)₃, and here, $R^{15}$ independently represent a hydrogen atom or an alkyl group having 1 to 10 carbon atoms, and in this $R^{15}$, at least one —CH₂— is optionally substituted with —O—, at least one —(CH₂)₂— is optionally substituted with —CH=CH—, and at least one hydrogen atom is optionally substituted with a halogen atom.

11. The liquid crystal composition according to claim 1, wherein the one or more polymerizable compounds include at least one compound selected from the group of compounds represented by Formula (1-65) to Formula (1-84),

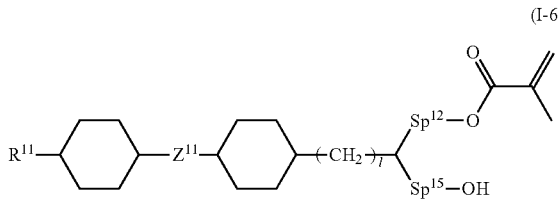
(I-65)

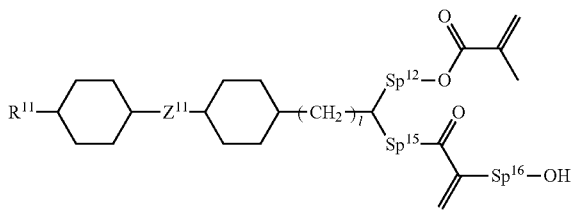
(I-66)

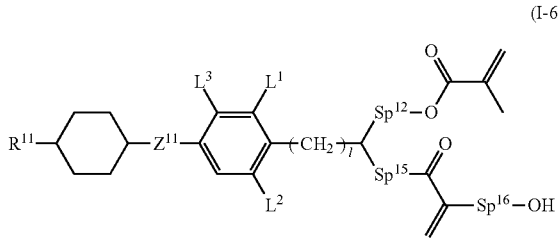
(I-67)

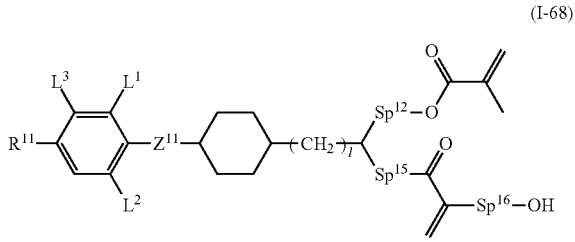
(I-68)

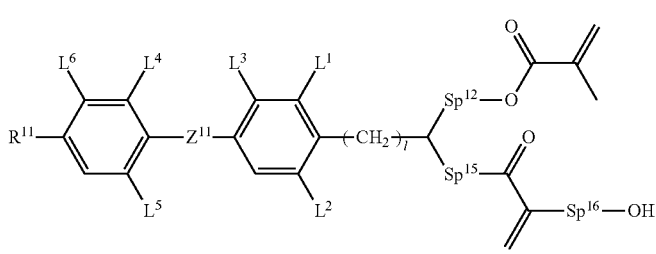
(I-69)

-continued
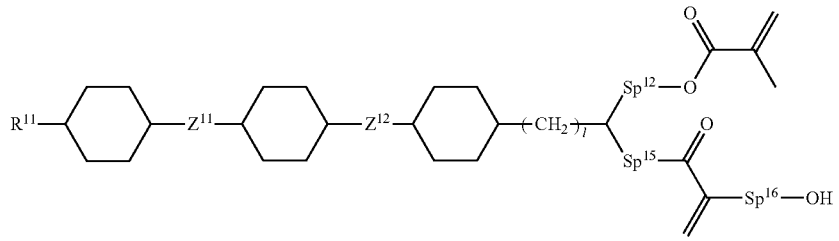
(I-70)
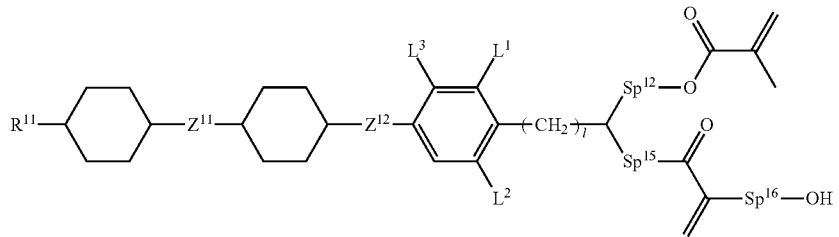
(I-71)
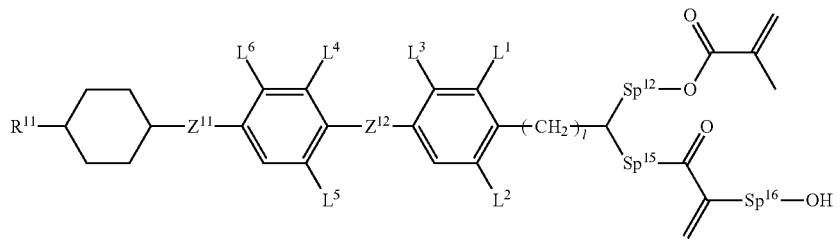
(I-72)
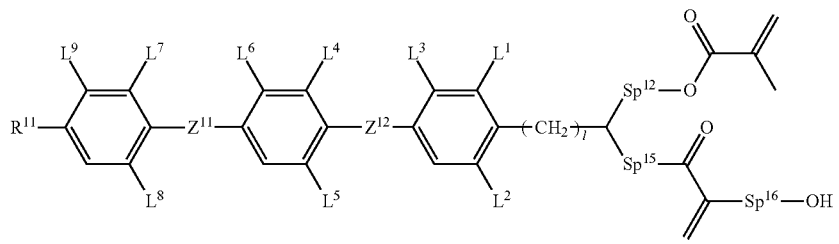
(I-73)
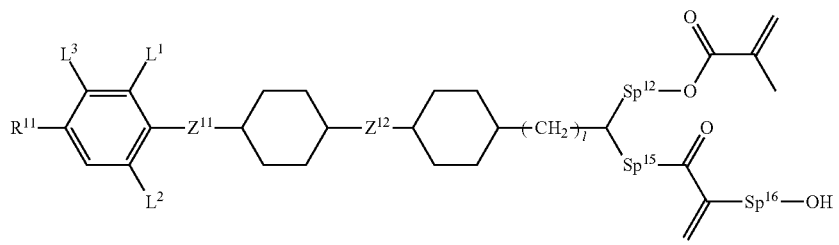
(I-74)
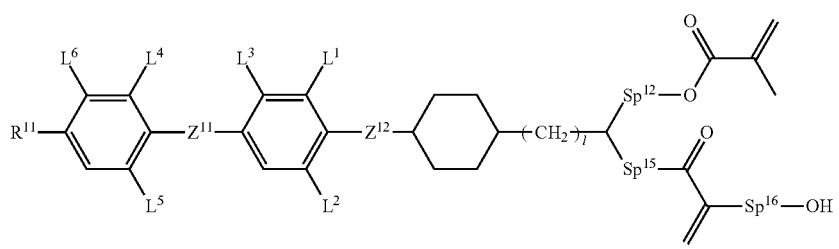
(I-75)

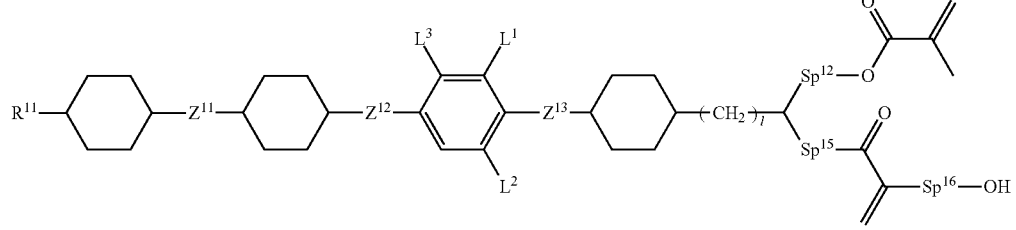
(1-76)
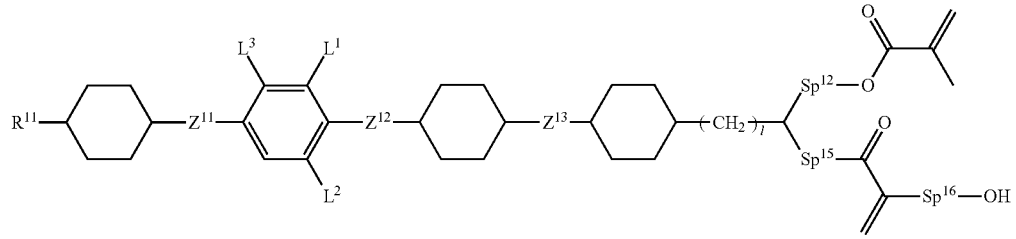
(1-77)
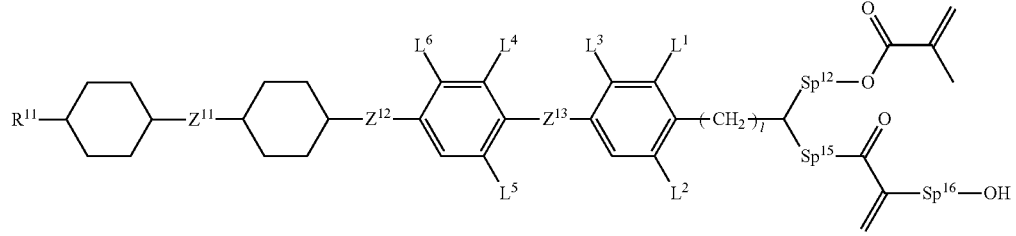
(1-78)
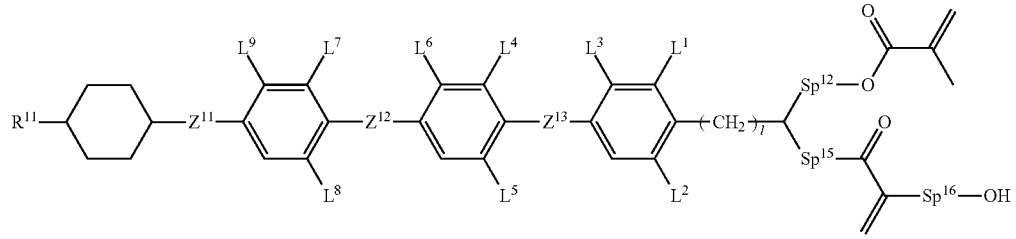
(1-79)
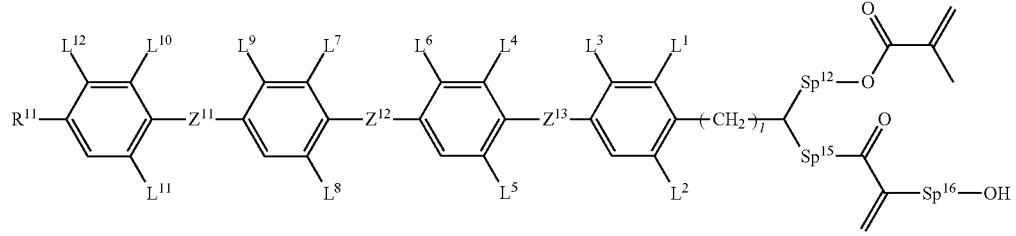
(1-80)
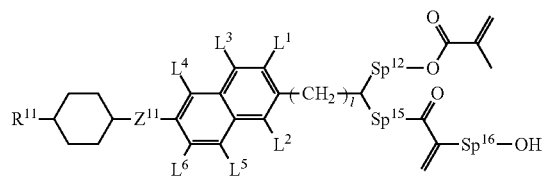
(1-81)
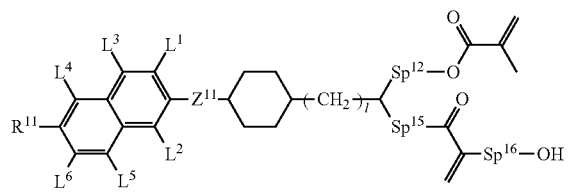
(1-82)

(1-83)

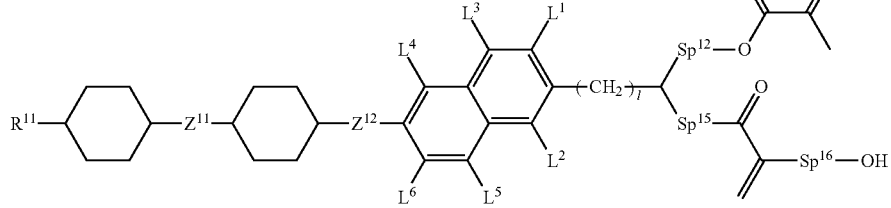

(1-84)

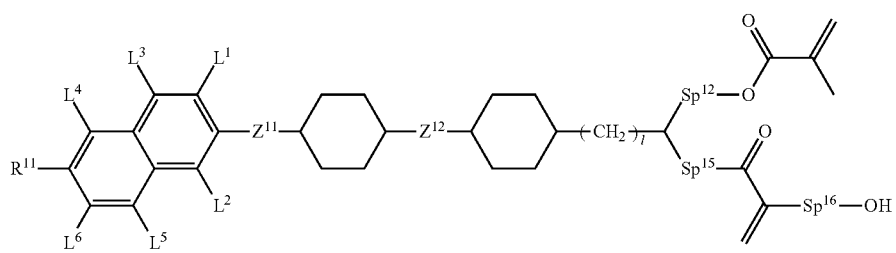

in Formula (1-65) to Formula (1-84), $R^{11}$ is an alkyl group having 1 to 10 carbon atoms;

$Z^{11}$, $Z^{12}$, and $Z^{13}$ independently represent a single bond, —(CH$_2$)$_2$—, or —(CH$_2$)$_4$—;

$Sp^{12}$, $Sp^{15}$, and $Sp^{16}$ independently represent a single bond or an alkylene group having 1 to 5 carbon atoms, and in this alkylene group, at least one —CH$_2$— is optionally substituted with —O—;

$L^1$, $L^2$, $L^3$, $L^4$, $L^5$, $L^6$, $L^7$, $L^8$, $L^9$, $L^{10}$, $L^{11}$, and $L^{12}$ independently represent a hydrogen atom, a fluorine atom, a methyl group, or an ethyl group; and l is 0, 1, 2, 3, 4, 5, or 6.

12. The liquid crystal composition according to claim 1, wherein the one or more polymerizable compounds include at least one compound selected from the group of compounds represented by Formula (1-85) and Formula (1-86), (1-85)

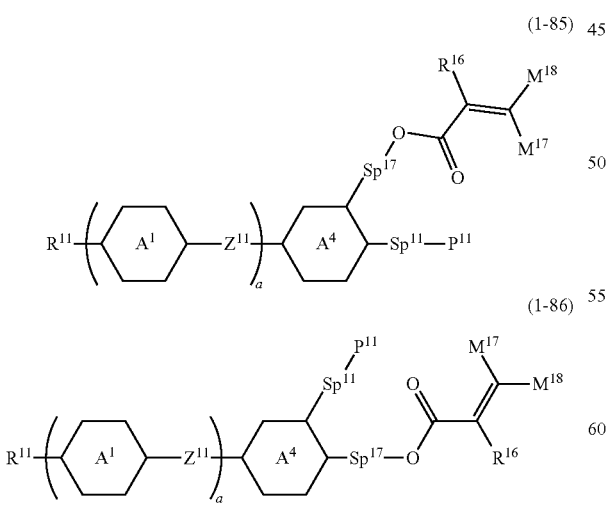

(1-86)

in Formula (1-85) and Formula (1-86), $R^{11}$ is an alkyl group having 1 to 15 carbon atoms, and in this $R^{11}$, at least one —CH$_2$— is optionally substituted with —O— or —S—, at least one —(CH$_2$)$_2$— is optionally substituted with —CH=CH— or —C≡C—, and at least one hydrogen atom is optionally substituted with a halogen atom;

ring $A^1$ independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl, or 2,3,4,7,8,9,10,11,12,13,14,15,16,17-tetradecahydrocyclopenta[a]phenanthrene-3,17-diyl, and in these rings, at least one hydrogen atom is optionally substituted with a fluorine atom, a chlorine atom, an alkyl group having 1 to 12 carbon atoms, an alkenyl group having 2 to 12 carbon atoms, an alkoxy group having 1 to 11 carbon atoms, an alkenyloxy group having 2 to 11 carbon atoms, or -$Sp^{11}$-$P^{11}$, and in these groups, at least one hydrogen atom is optionally substituted with a fluorine or chlorine atom;

a is 0, 1, 2, 3, or 4;

ring $A^4$ is a benzene ring or a cyclohexane ring;

$Z^{11}$ independently represent a single bond or an alkylene group having 1 to 6 carbon atoms, and in this $Z^{11}$, at least one —CH$_2$— is optionally substituted with —O—, —CO—, —COO—, —OCO—, or —OCOO—, at least one —(CH$_2$)$_2$— is optionally substituted with —CH=CH— or —C≡C—, and at least one hydrogen atom is optionally substituted with a fluorine or chlorine atom; and $Sp^{11}$ is a single bond or an alkylene group having 1 to 10 carbon atoms, and in this $Sp^{11}$, at least one —CH$_2$— is optionally substituted with —O—, —CO—, —COO—, —OCO—, or —OCOO—, at least one —(CH$_2$)$_2$— is optionally substituted with —CH=CH— or —C≡C—, and at least one hydrogen atom is optionally substituted with a halogen atom; and $P^{11}$ is a group selected from the groups represented by Formula (1f) and Formula (1g);

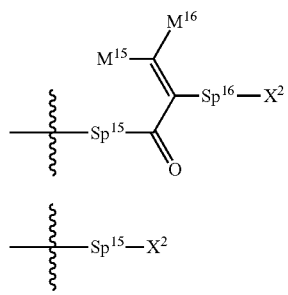

(1f)

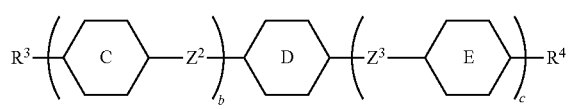

(1g)

in Formulae (1f) and (1g), $Sp^{15}$ is a single bond or an alkylene group having 1 to 10 carbon atoms, and in this $Sp^{15}$, at least one —$CH_2$— is optionally substituted with —O—, —NH—, —CO—, —COO—, —OCO—, or —OCOO—, and at least one —$(CH_2)_2$— is optionally substituted with —CH=CH— or —C≡C—, and in these groups, at least one hydrogen atom is optionally substituted with a halogen atom;

$Sp^{16}$ is a single bond or an alkylene group having 1 to 10 carbon atoms, and in this $Sp^{16}$, at least one —$CH_2$— is optionally substituted with —O—, —NH—, —CO—, —COO—, —OCO—, or —OCOO—, at least one —$(CH_2)_2$— is optionally substituted with —CH=CH— or —C≡C—, and at least one hydrogen atom is optionally substituted with a halogen atom;

$M^{15}$ and $M^{16}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and $X^2$ is —OH, —$NH_2$, —$OR^{15}$, —$N(R^{15})_2$, —COOH, —SH, —$B(OH)_2$, or —$Si(R^{15})_3$, and here, $R^{15}$ independently represent a hydrogen atom or an alkyl group having 1 to 10 carbon atoms, and in this $R^{15}$, at least one —$CH_2$— is optionally substituted with —O—, at least one —$(CH_2)_2$— is optionally substituted with —CH=CH—, and at least one hydrogen atom is optionally substituted with a halogen atom;

in Formula (1-85) and Formula (1-86), $Sp^{17}$ is a single bond or an alkylene group having 1 to 10 carbon atoms, and in this $Sp^{17}$, at least one —$CH_2$— is optionally substituted with —O—, —CO—, —COO—, —OCO—, or —OCOO—, at least one —$(CH_2)_2$— is optionally substituted with —CH=CH— or —C≡C—, and at least one hydrogen atom is optionally substituted with a halogen atom;

$M^{17}$ and $M^{18}$ independently represent a hydrogen atom, a halogen atom, an alkyl group having 1 to 5 carbon atoms, or an alkyl group having 1 to 5 carbon atoms in which at least one hydrogen atom is substituted with a halogen atom; and $R^{16}$ is an alkyl group having 1 to 15 carbon atoms, and in this $R^{16}$, at least one —$CH_2$— is optionally substituted with —O— or —S—, at least one —$(CH_2)_2$— is optionally substituted with —CH=CH— or —C≡C—, and at least one hydrogen atom is optionally substituted with a halogen atom.

13. The liquid crystal composition according to claim 1, wherein, based on a weight of the liquid crystal composition excluding additives, a proportion of the compound represented by Formula (1) is in a range of 0.05 parts by weight to 10 parts by weight.

14. The liquid crystal composition according to claim 1, wherein the one or more liquid crystalline compounds include at least one compound selected from the group of compounds represented by Formula (2) as a first component,

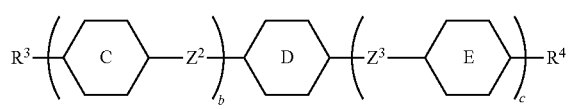

(2)

in Formula (2), $R^3$ and $R^4$ independently represent an alkyl group having 1 to 12 carbon atoms, an alkoxy group having 1 to 12 carbon atoms, an alkenyl group having 2 to 12 carbon atoms, or an alkenyloxy group having 2 to 12 carbon atoms;

ring C and ring E independently represent 1,4-cyclohexylene, 1,4-cyclohexenylene, 1,4-phenylene, 1,4-phenylene in which at least one hydrogen atom is substituted with a fluorine or chlorine atom, or tetrahydropyran-2,5-diyl;

ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl, or 7,8-difluorochroman-2,6-diyl;

$Z^2$ and $Z^3$ independently represent a single bond, —$(CH_2)_2$—, —$CH_2O$—, —$OCH_2$—, —COO—, or —OCO—; and b is 1, 2, or 3, c is 0 or 1, and a sum of b and c is 3 or less.

15. The liquid crystal composition according to claim 14, wherein the one or more liquid crystalline compounds include at least one compound selected from the group of compounds represented by Formula (2-1) to Formula (2-22) as the first component,

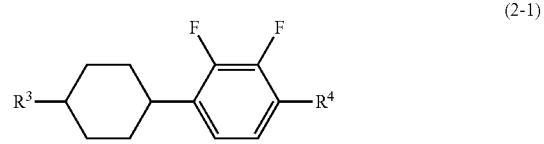

(2-1)

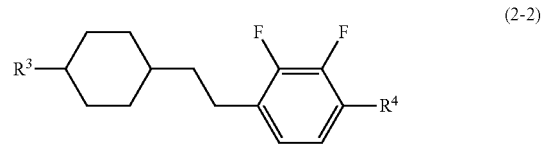

(2-2)

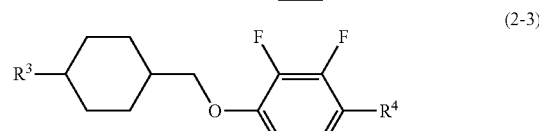

(2-3)

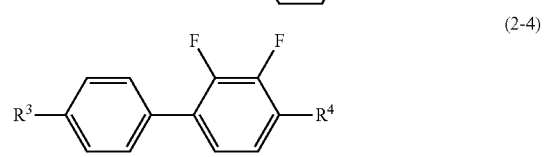

(2-4)

-continued

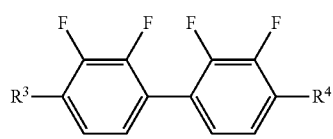
(2-5)

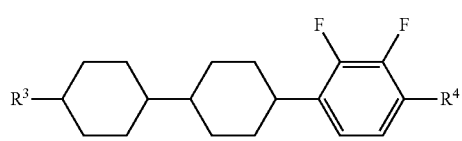
(2-6)

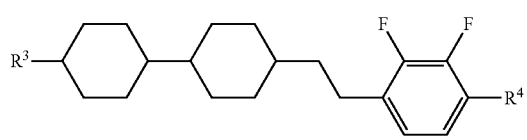
(2-7)

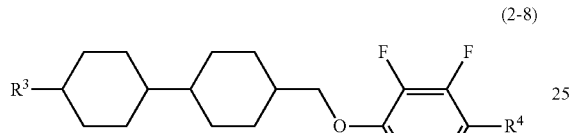
(2-8)

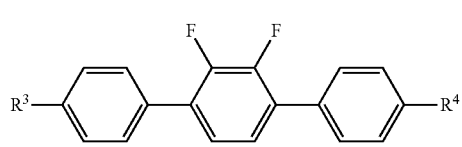
(2-9)

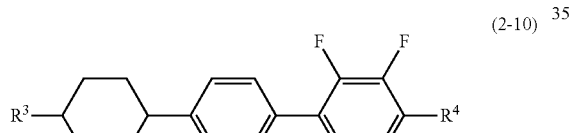
(2-10)

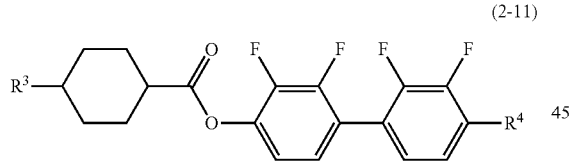
(2-11)

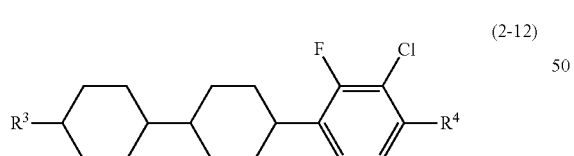
(2-12)

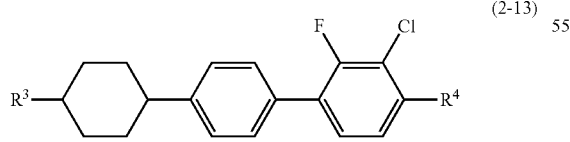
(2-13)

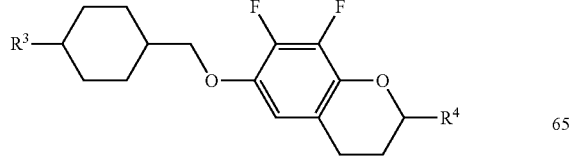
(2-14)

-continued

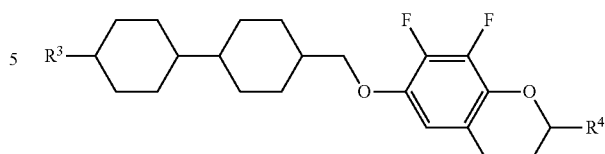
(2-15)

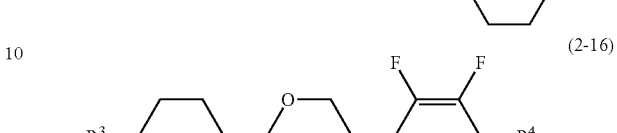
(2-16)

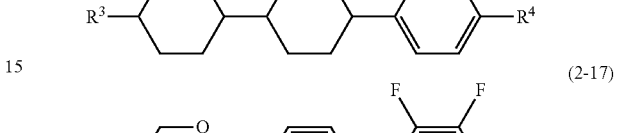
(2-17)

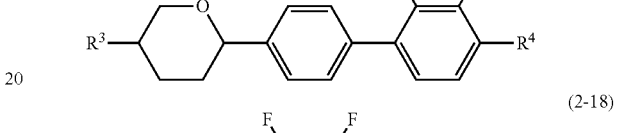
(2-18)

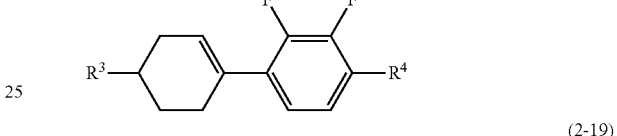
(2-19)

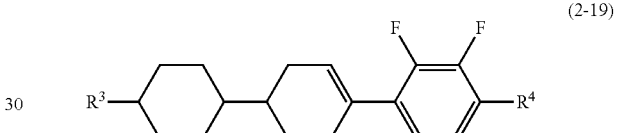
(2-20)

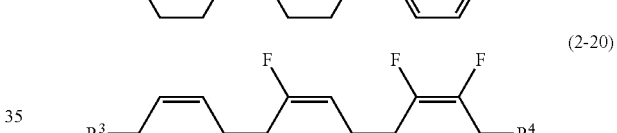
(2-21)

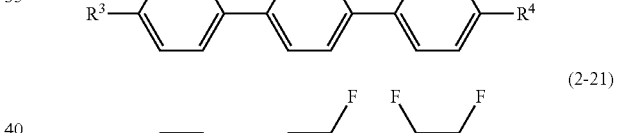
(2-22)

in Formula (2-1) to Formula (2-22), $R^3$ and $R^4$ independently represent an alkyl group having 1 to 12 carbon atoms, an alkoxy group having 1 to 12 carbon atoms, an alkenyl group having 2 to 12 carbon atoms, or an alkenyloxy group having 2 to 12 carbon atoms.

16. The liquid crystal composition according to claim 14, wherein, based on a weight of the liquid crystal composition excluding additives, a proportion of the first component is in a range of 10 weight % to 90 weight %.

17. The liquid crystal composition according to claim 1, wherein the one or more liquid crystalline compounds include at least one compound selected from the group of compounds represented by Formula (3) as a second component,

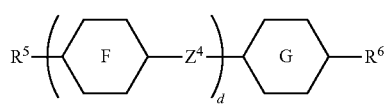
(3)

in Formula (3),

R⁵ and R⁶ independently represent an alkyl group having 1 to 12 carbon atoms, an alkoxy group having 1 to 12 carbon atoms, an alkenyl group having 2 to 12 carbon atoms, an alkyl group having 1 to 12 carbon atoms in which at least one hydrogen atom is substituted with a fluorine or chlorine atom, or an alkenyl group having 2 to 12 carbon atoms in which at least one hydrogen atom is substituted with a fluorine or chlorine atom;

ring F and ring G independently represent 1,4-cyclohexylene, 1,4-phenylene, 2-fluoro-1,4-phenylene, or 2,5-difluoro-1,4-phenylene;

$Z^4$ independently represent a single bond, —(CH$_2$)$_2$—, —CH$_2$O—, —OCH$_2$—, —COO—, or —OCO—; and d is 1, 2, or 3.

18. The liquid crystal composition according to claim 17, wherein the one or more liquid crystalline compounds include at least one compound selected from the group of compounds represented by Formula (3-1) to Formula (3-13) as the second component,

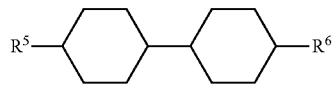
(3-1)

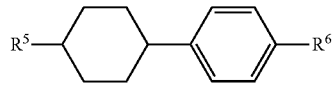
(3-2)

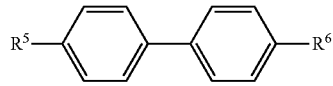
(3-3)

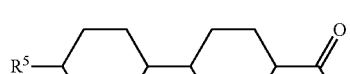
(3-4)

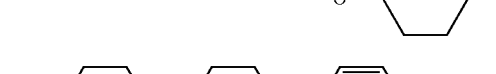
(3-5)

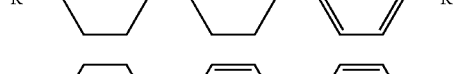
(3-6)

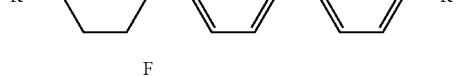
(3-7)

(3-8)

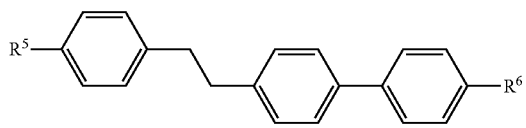
(3-9)

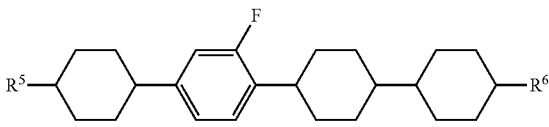
(3-10)

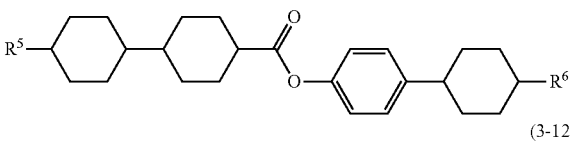
(3-11)

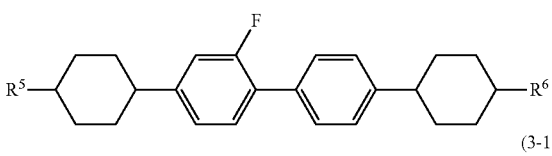
(3-12)

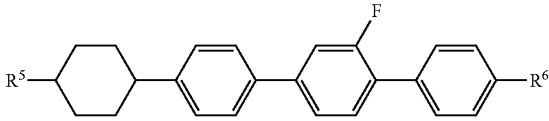
(3-13)

in Formula (3-1) to Formula (3-13),

R⁵ and R⁶ independently represent an alkyl group having 1 to 12 carbon atoms, an alkoxy group having 1 to 12 carbon atoms, an alkenyl group having 2 to 12 carbon atoms, an alkyl group having 1 to 12 carbon atoms in which at least one hydrogen atom is substituted with a fluorine or chlorine atom, or an alkenyl group having 2 to 12 carbon atoms in which at least one hydrogen atom is substituted with a fluorine or chlorine atom.

19. The liquid crystal composition according to claim 17, wherein, based on a weight of the liquid crystal composition excluding additives, a proportion of the second component is in a range of 10 weight % to 90 weight %.

20. The liquid crystal composition according to claim 1, wherein the one or more polymerizable compounds further include at least one compound selected from the group of compounds represented by Formula (4),

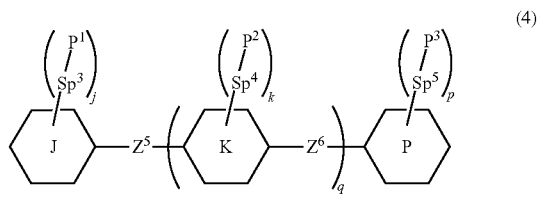
(4)

in Formula (4), ring J and ring P independently represent cyclohexyl, cyclohexenyl, phenyl, 1-naphthyl, 2-naphthyl, tetrahydropyran-2-yl, 1,3-dioxan-2-yl, pyrimidin-2-yl, or pyridin-2-yl, and in these rings, at least one hydrogen atom is optionally substituted with a fluorine atom, a chlorine atom, an alkyl group having 1 to 12 carbon atoms, an alkoxy group having 1 to 12 carbon atoms, or an alkyl group having 1 to 12 carbon atoms in which at least one hydrogen atom is substituted with a fluorine or chlorine atom;

ring K independently represent 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, or pyridine-2,5-diyl, and in these rings, at least one hydrogen atom is optionally substituted with a fluorine atom, a chlorine atom, an alkyl group having 1 to 12 carbon atoms, an alkoxy group having 1 to 12 carbon atoms, or an alkyl group having 1 to 12 carbon atoms in which at least one hydrogen atom is substituted with a fluorine or chlorine atom;

$Z^5$ and $Z^6$ independently represent a single bond or an alkylene group having 1 to 10 carbon atoms, and in these $Z^5$ and $Z^6$, at least one —CH$_2$— is optionally substituted with —O—, —CO—, —COO—, or —OCO—, at least one —(CH$_2$)$_2$— is optionally substituted with —CH=CH—, —C(CH$_3$)=CH—, —CH=C(CH$_3$)—, or —C(CH$_3$)=C(CH$_3$)—, and at least one hydrogen atom is optionally substituted with a fluorine or chlorine atom;

$P^1$, $P^2$, and $P^3$ independently represent a polymerizable group;

$Sp^3$, $Sp^4$, and $Sp^5$ independently represent a single bond or an alkylene group having 1 to 10 carbon atoms, and in $Sp^3$, $Sp^4$, and $Sp^5$, at least one —CH$_2$— is optionally substituted with —O—, —COO—, —OCO—, or —OCOO—, and at least one —(CH$_2$)$_2$— is optionally substituted with —CH=CH— or —C≡C—, and at least one hydrogen atom is optionally substituted with a fluorine or chlorine atom;

q is 0, 1, or 2;

j, k, and p independently represent 0, 1, 2, 3, or 4, and a sum of j, k, and p is 1 or more.

21. The liquid crystal composition according to claim 20, wherein, in Formula (4), $P^1$, $P^2$, and $P^3$ independently represent a polymerizable group selected from the groups represented by Formula (P-1) to Formula (P-5),

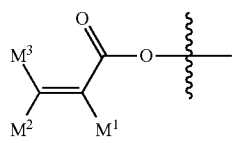

(P-1)

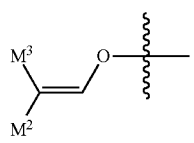

(P-2)

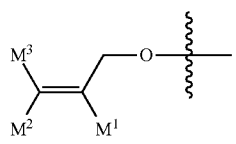

(P-3)

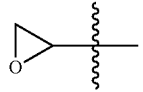

(P-4)

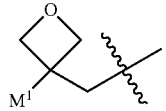

(P-5)

in Formula (P-1) to Formula (P-5), $M^1$, $M^2$, and $M^3$ independently represent a hydrogen atom, a fluorine atom, an alkyl group having 1 to 5 carbon atoms, or an alkyl group having 1 to 5 carbon atoms in which at least one hydrogen atom is substituted with a fluorine or chlorine atom.

22. The liquid crystal composition according to claim 20, wherein the one or more polymerizable compounds include at least one compound selected from the group of compounds represented by Formula (4-1) to Formula (4-29),

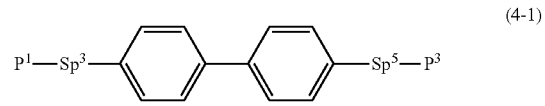

(4-1)

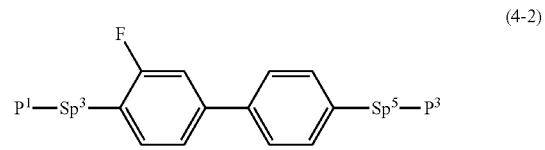

(4-2)

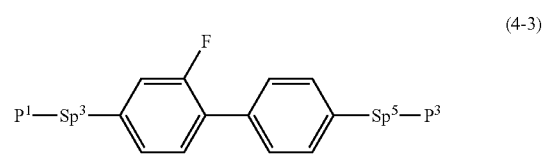

(4-3)

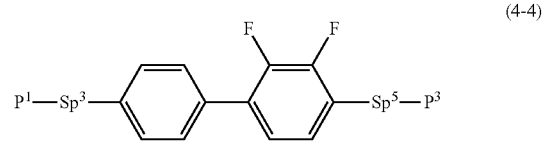

(4-4)

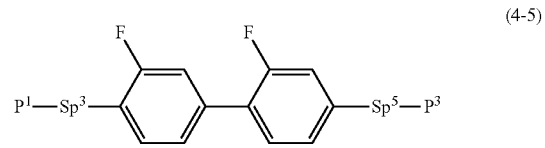

(4-5)

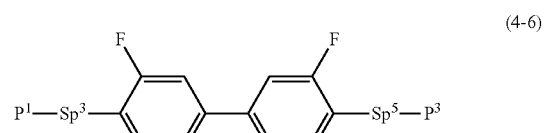

(4-6)

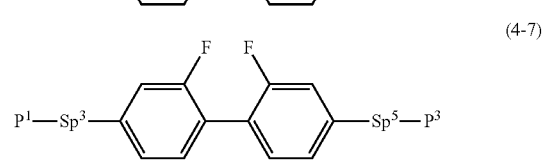

(4-7)

(4-8) 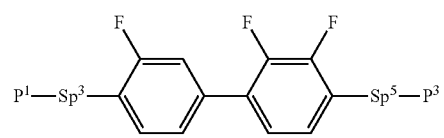
(4-9) 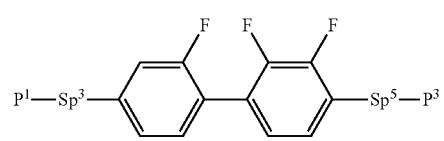
(4-10) 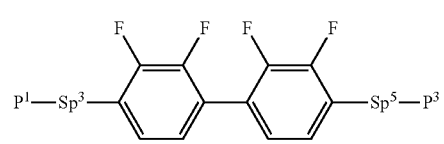
(4-11) 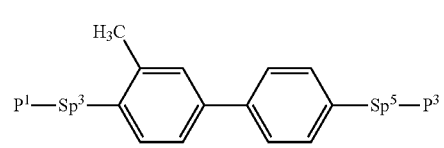
(4-12) 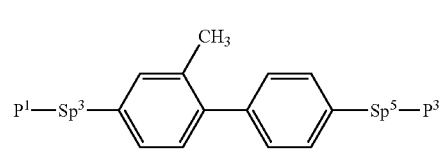
(4-13) 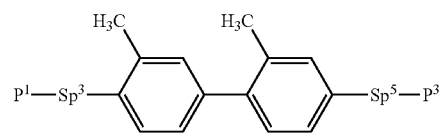
(4-14) 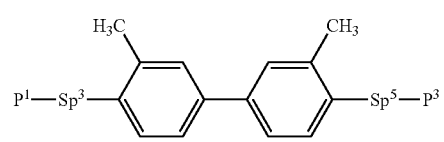
(4-15) 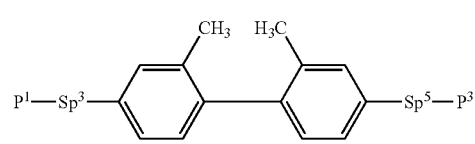
(4-16) 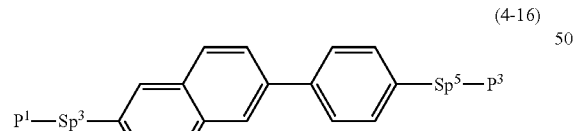
(4-17) 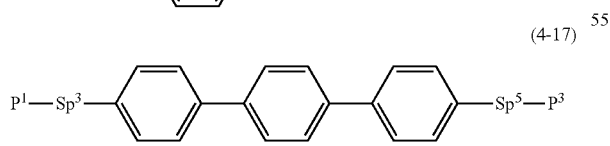
(4-18) 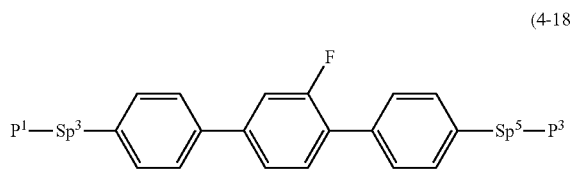
(4-19) 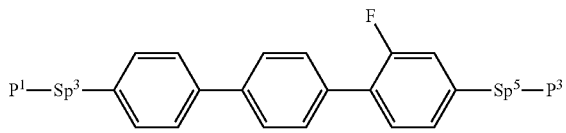
(4-20) 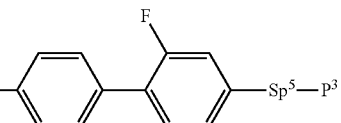
(4-21) 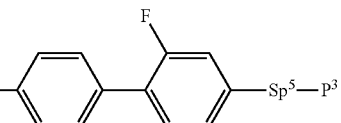
(4-22) 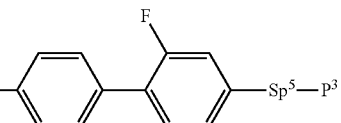
(4-23) 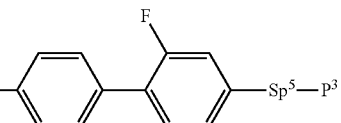
(4-24) 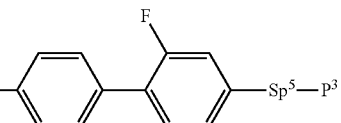
(4-25)
(4-26)

-continued (4-27)
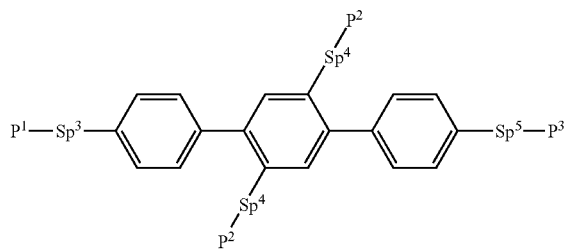

(4-28)
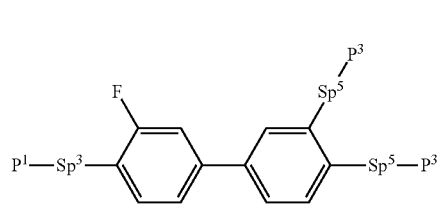

(4-29)
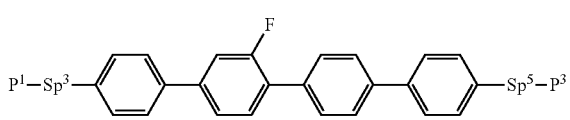

in Formula (4-1) to Formula (4-29), $P^1$, $P^2$, and $P^3$ independently represent a polymerizable group selected from the groups represented by Formula (P-1) to Formula (P-3) and here, $M^1$, $M^2$, and $M^3$ independently represent a hydrogen atom, a fluorine atom, an alkyl group having 1 to 5 carbon atoms, or an alkyl group having 1 to 5 carbon atoms in which at least one hydrogen atom is substituted with a fluorine or chlorine atom;

(P-1)
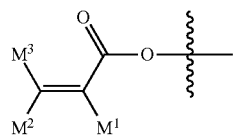

(P-2)
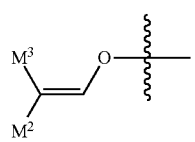

(P-3)
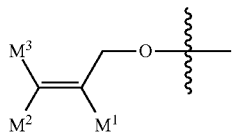

$Sp^3$, $Sp^4$, and $Sp^5$ independently represent a single bond or an alkylene group having 1 to 10 carbon atoms, and in $Sp^3$, $Sp^4$, and $Sp^5$, at least one —$CH_2$— is optionally substituted with —O—, —COO—, —OCO—, or —OCOO—, and at least one —$(CH_2)_2$— is optionally substituted with —CH=CH— or —C≡C—, and at least one hydrogen atom is optionally substituted with a fluorine or chlorine atom.

23. The liquid crystal composition according to claim 20, wherein, based on a weight of the liquid crystal composition excluding additives, a proportion of the compound represented by Formula (4) is in a range of 0.03 parts by weight to 10 parts by weight.

24. The liquid crystal composition according to claim 1, wherein the one or more dichroic dyes include a compound represented by Formula (5), (5)
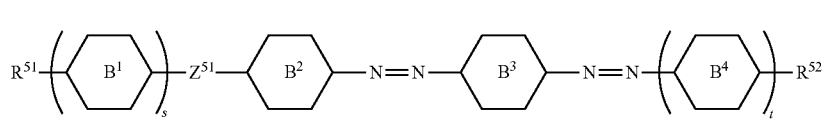

in Formula (5), $R^{51}$ and $R^{52}$ independently represent an alkyl group having 1 to 15 carbon atoms or a group represented by Formula (5a), and in this alkyl group, at least one —$CH_2$— is optionally substituted with —O—, —COO—, —OCO—, or —OCOO—, and at least one —$(CH_2)_2$— is optionally substituted with —CH=CH— or —C≡C—, and here, $R^{53}$ and $R^{54}$ in Formula (5a) independently represent a hydrogen atom, or an alkyl group having 1 to 10 carbon atoms, $R^{53}$ and $R^{54}$ and may be bonded to each other to form a ring;

(5a)
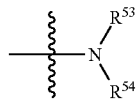

ring $B^1$ independently represent 1,4-cyclohexylene, 1,4-cyclohexenylene, 1,4-phenylene, naphthalene-2,6-diyl, decahydronaphthalene-2,6-diyl, tetrahydropyran-2,5-diyl, 1,3-dioxane-2,5-diyl, or a group represented by Formula (5b), and in these rings, at least one hydrogen atom is optionally substituted with a fluorine or chlorine atom, and here, $Z^{52}$ in Formula (5b) is —N=N—, —COO—, or —OCO—;

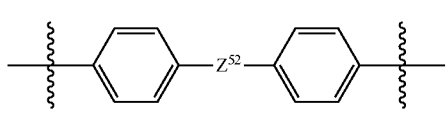
(5b)

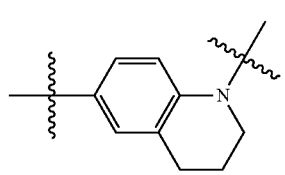
(5c)

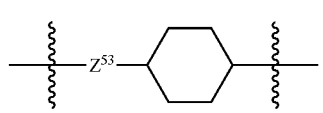
(5d)

ring $B^2$ and ring $B^3$ independently represent 1,4-phenylene, or naphthalene-2,6-diyl, and in these rings, at least one hydrogen atom is optionally substituted with a fluorine or chlorine atom;

ring $B^4$ independently represent 1,4-cyclohexylene, 1,4-cyclohexenylene, 1,4-phenylene, naphthalene-2,6-diyl, decahydronaphthalene-2,6-diyl, tetrahydropyran-2,5-diyl, 1,3-dioxane-2,5-diyl, a group represented by Formula (5c), or a group represented by Formula (5d), and in these rings, at least one hydrogen atom is optionally substituted with a methyl group, a fluorine or chlorine atom, and here, $Z^{53}$ in Formula (5d) is —NH—CH$_2$—, —N=N—, —COO—, or —OCO—;

$Z^{51}$ is a single bond, —N=N—, —COO—, or —OCO—;
s is 0, 1, 2, 3, or 4;
t is 1, 2, 3, or 4.

25. The liquid crystal composition according to claim 24, wherein the one or more dichroic dyes include at least one compound selected from the group of compounds represented by Formula (5-1) to Formula (5-8),

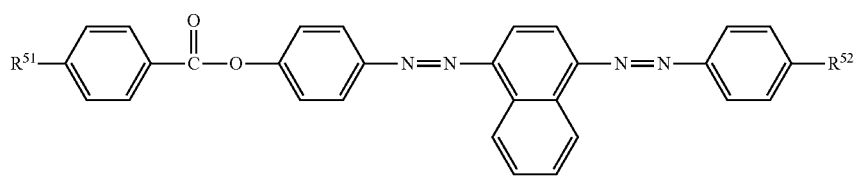
(5-1)

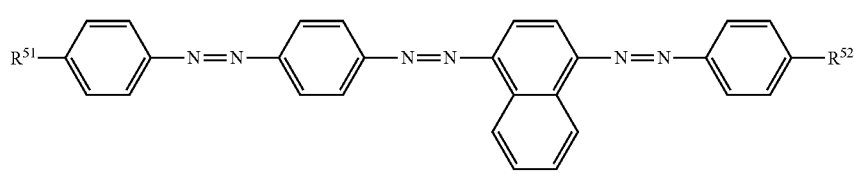
(5-2)

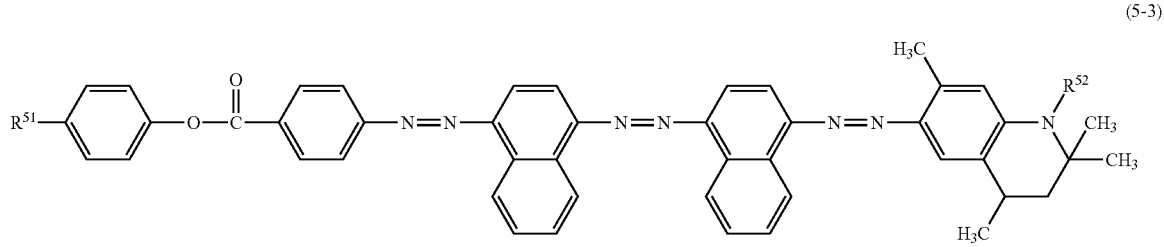
(5-3)

(5-4)

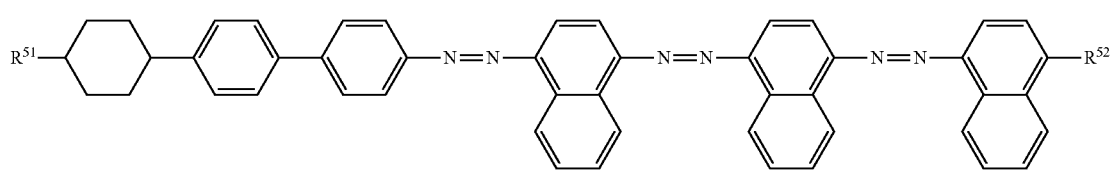
(5-5)

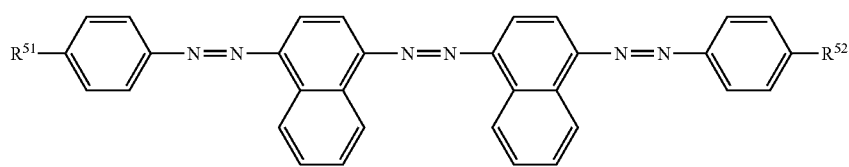
(5-6)

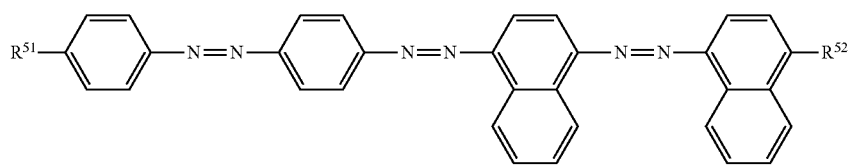

(5-7)

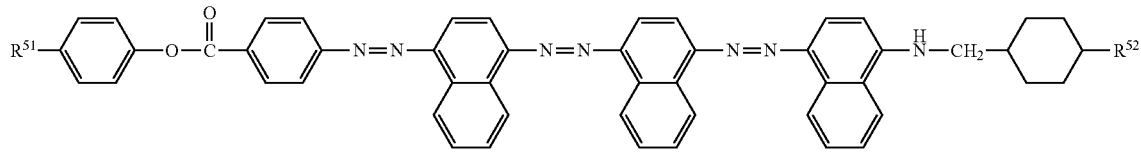

(5-8)

in Formula (5-1) to Formula (5-8), $R^{51}$ and $R^{52}$ independently represent an alkyl group having 1 to 15 carbon atoms or a group represented by Formula (5a), and in this alkyl group, at least one —CH$_2$— is optionally substituted with —O—, —COO—, —OCO—, or —OCOO—, and at least one —(CH$_2$)$_2$— is optionally substituted with —CH=CH— or —C≡C—, and here, $R^{53}$ and $R^{54}$ in Formula (5a) independently represent a hydrogen atom, or an alkyl group having 1 to 10 carbon atoms, and $R^{53}$ and $R^{54}$ may be bonded to each other to form a ring,

(5a)

26. The liquid crystal composition according to claim 24, wherein, based on a weight of the liquid crystal composition excluding additives, a proportion of the compound represented by Formula (5) is in a range of 0.01 parts by weight to 10 parts by weight.

27. A liquid crystal element including the liquid crystal composition according to claim 1.

28. The liquid crystal element according to claim 27, wherein an operation mode of the liquid crystal element is an IPS mode, a VA mode, an FFS mode, or an FPA mode.

29. The liquid crystal element according to claim 27, wherein the liquid crystal element is in a guest host (GH) mode.

30. A polymer sustained alignment type liquid crystal element including the liquid crystal composition according to claim 1 and in which the one or more polymerizable compounds in the liquid crystal composition is/are polymerized.

31. A liquid crystal element without an alignment film including the liquid crystal composition according to claim 1 and in which the one or more polymerizable compounds in the liquid crystal composition is/are polymerized.

\* \* \* \* \*